United States Patent [19]

Shimoda et al.

[11] Patent Number: 5,404,248
[45] Date of Patent: Apr. 4, 1995

[54] VIDEO DATA RECORDING/REPRODUCING APPARATUS WITH EFFICIENT ERROR CORRECTION

[75] Inventors: Kenji Shimoda; Yoshihisa Sakazaki, both of Yokohama; Hideo Tsurufusa, Tokyo; Minoru Yoneda; Takao Inoh, both of Yokohama; Teruo Itami, Tokyo, all of Japan

[73] Assignee: Kabushiki Kaisha Toshiba, Kawasaki, Japan

[21] Appl. No.: 274,365

[22] Filed: Jul. 13, 1994

Related U.S. Application Data

[63] Continuation of Ser. No. 893,083, Jun. 3, 1992, abandoned.

[30] Foreign Application Priority Data

Jun. 4, 1991 [JP] Japan .................................. 3-132996

[51] Int. Cl.$^6$ .............................................. G11B 5/09
[52] U.S. Cl. ...................................... 360/48; 360/27; 360/53; 360/61; 358/335
[58] Field of Search ................ 369/47, 48, 59; 360/32, 360/53, 33.1, 61, 19.1, 20, 55, 18, 27, 39, 43, 46, 29, 28, 49; 358/342, 335, 135, 136, 310

[56] References Cited

U.S. PATENT DOCUMENTS

| | | | |
|---|---|---|---|
| 4,156,880 | 5/1979 | Yamada | 358/135 X |
| 4,985,784 | 1/1991 | Tsuboi et al. | 369/59 X |
| 5,150,432 | 9/1992 | Ueno et al. | 358/136 |
| 5,198,940 | 3/1993 | Nagasawa et al. | 360/9.1 |
| 5,212,600 | 5/1993 | Kanota | 360/32 |

OTHER PUBLICATIONS

Toshiba Review, vol. 46, No. 9, pp. 755-758, 1991 CCITT-Standard Video Codec for ISDN, H. Yamaura et al.

NHK CTIKEN R & D (NHK Technical Lab. R & D) No. 17, vol. 12, pp. 26-36, 1991, Y. Ooba et al., Dec. 15, 1991.

M. Kusunoki et al., "Peak Shift Characteristics for Barium Ferrite Flexible Disk Drive", 1987 Digests of the Intermag Conference, AB-04.

"CCIR Digital Television 4:2:2 Interface:, Television Institution Papers", vol. 40, No. 6, 1986, p. 442-448.

*Primary Examiner*—Andrew L. Sniezek
*Assistant Examiner*—Thang Van Tran
*Attorney, Agent, or Firm*—Cushman Darby & Cushman

[57] ABSTRACT

A video data recording/reproducing apparatus is designed to effect the high density recording for low bit rate coded data, correct the error with high reliability and reproduce only the main signal. For this purpose, an error correction circuit corrects the error in a transmission path by use of a parity code added by a parity adding circuit on the transmission side. A switch selects one of outputs of the parity adding circuit and error correction circuit according to whether the parity code is contained in the transmission data or not. A recording/reproducing circuit causes an output of the switch to be recorded. At the time of reproducing operation, the error correction circuit corrects the error in the recording/reproducing operation by use of the parity code contained in the reproduced signal.

20 Claims, 37 Drawing Sheets

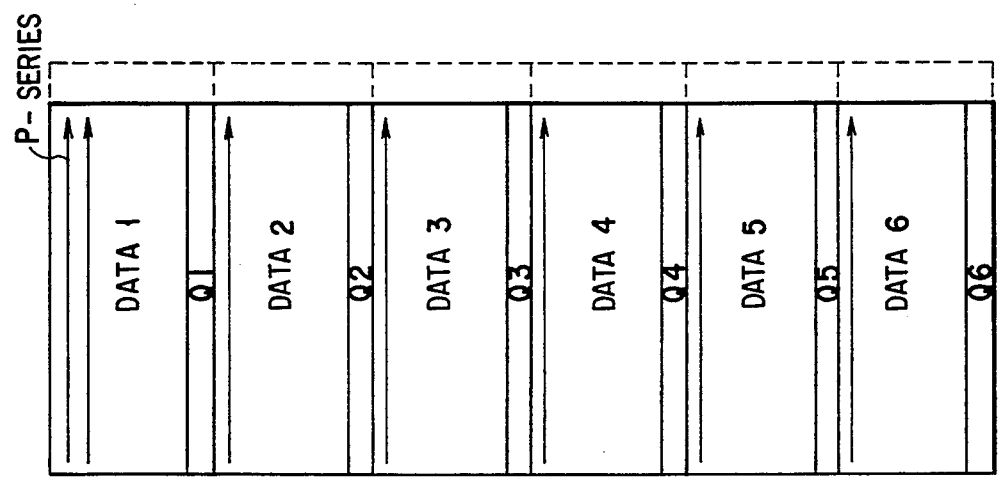
FIG. 8C
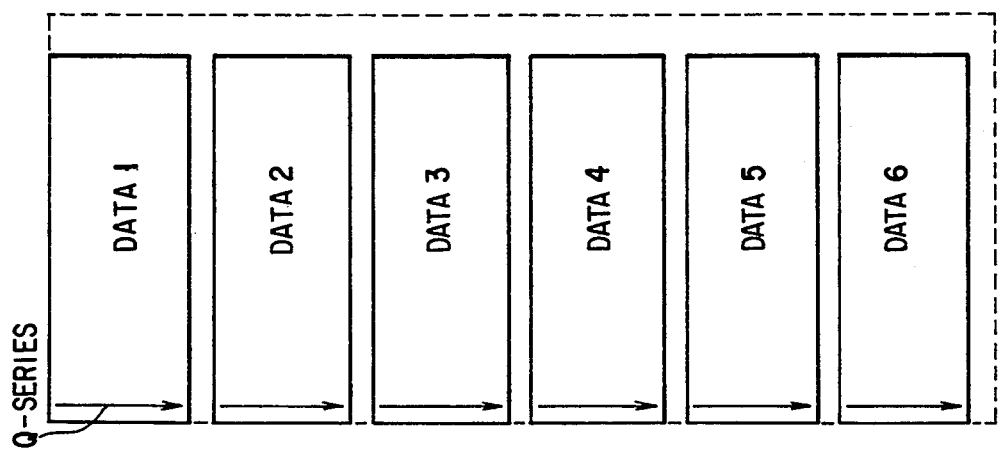
FIG. 8B
FIG. 8A

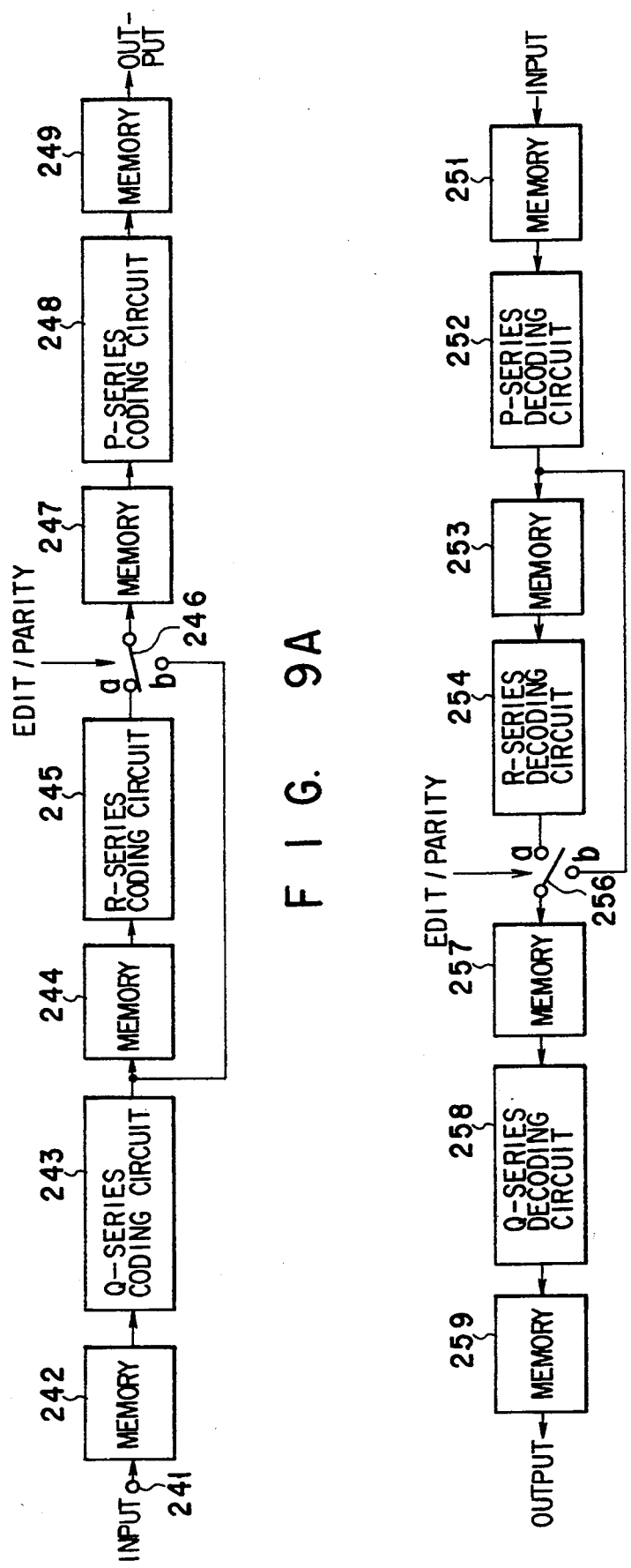
F I G. 9A
F I G. 9B

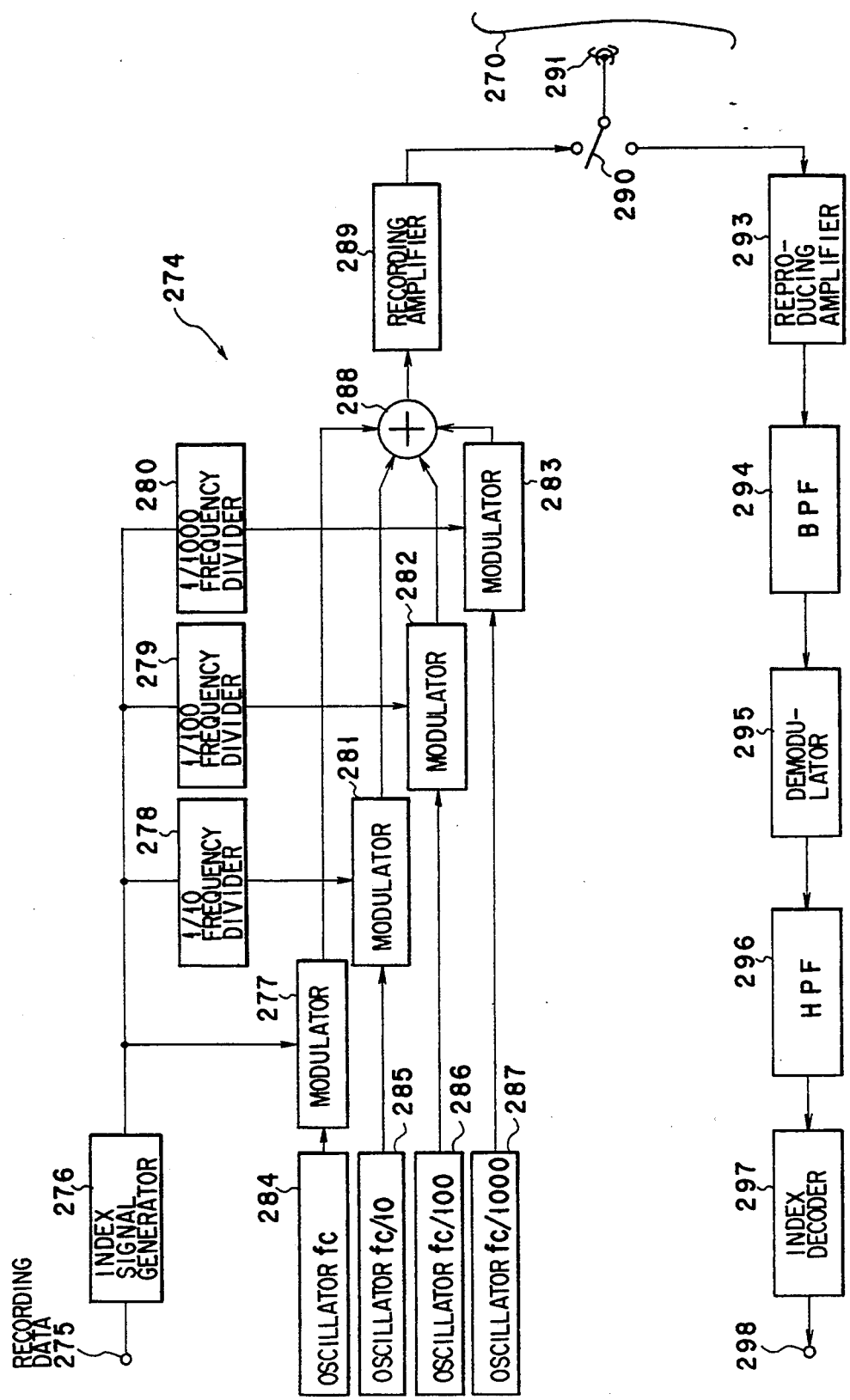
F I G. 12

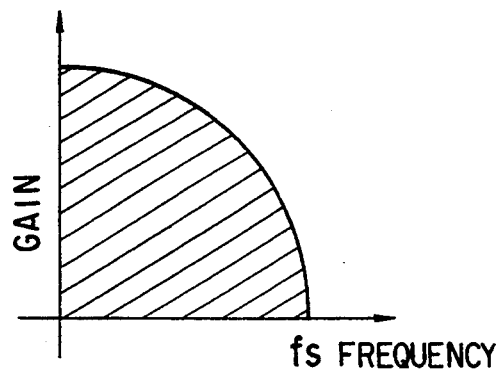
F I G. 14
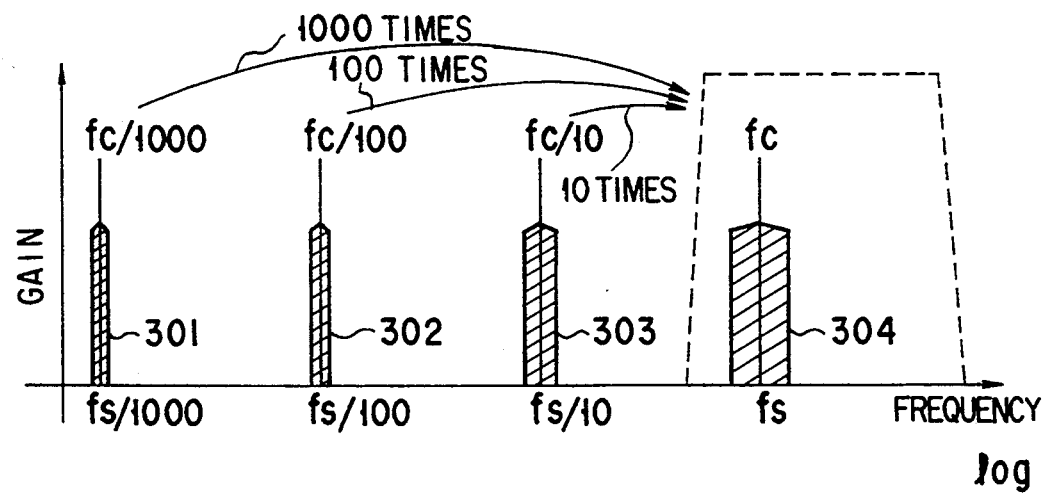
F I G. 15

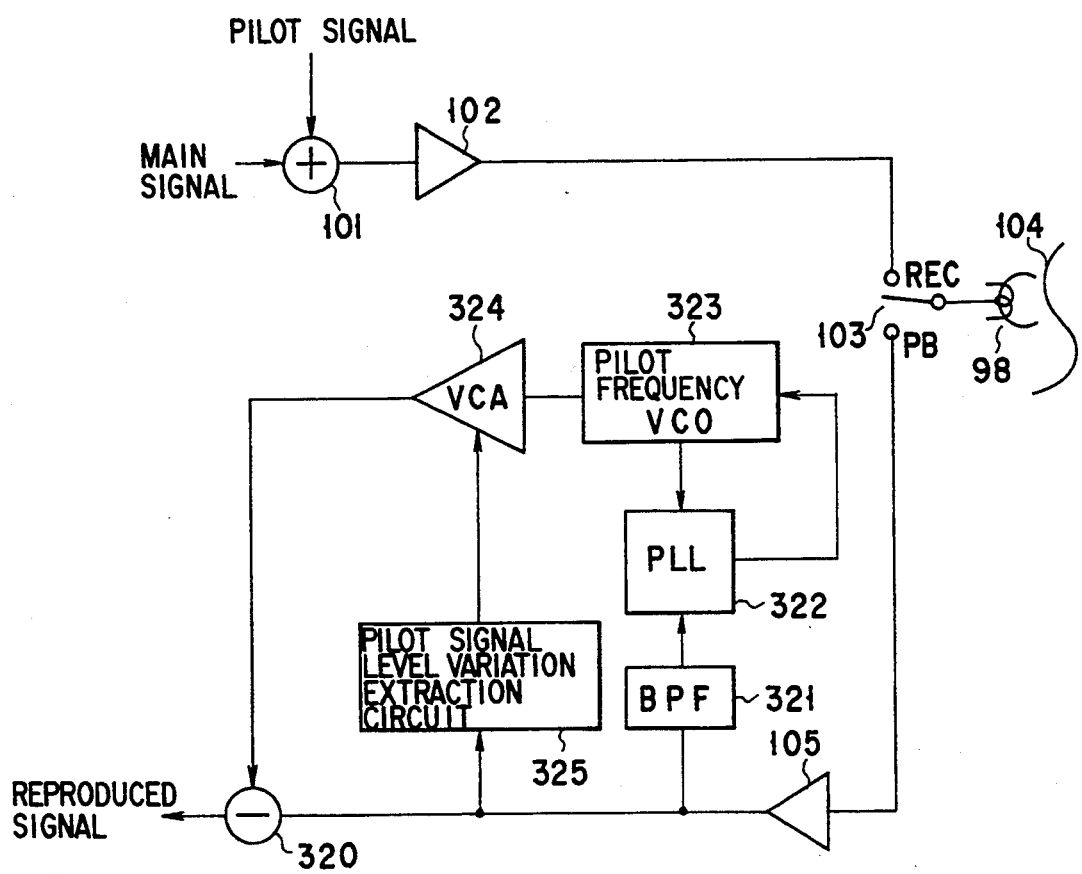
F I G. 18

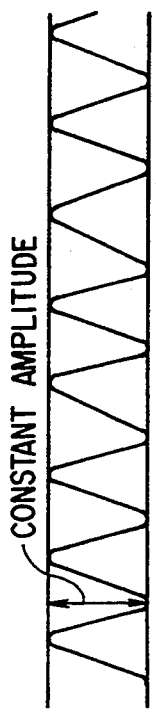
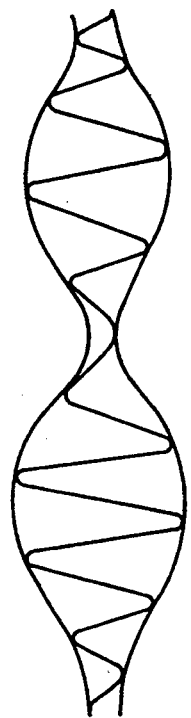
FIG. 19A  PILOT SIGNAL
FIG. 19B  PILOT FREQUENCY BAND COMPONENT OF MAIN SIGNAL
FIG. 19C  RECORDED SIGNAL OF PILOT FREQUENCY BAND
FIG. 19D  RECORDED SIGNAL OF ENTIRE BAND

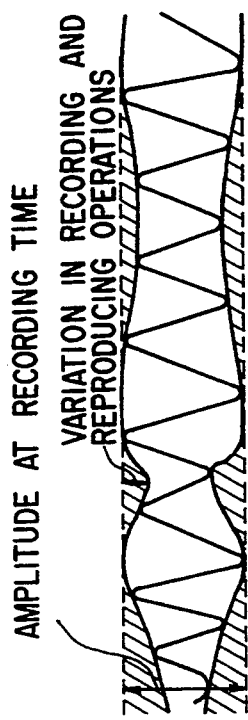
FIG. 20A REPRODUCED PILOT SIGNAL
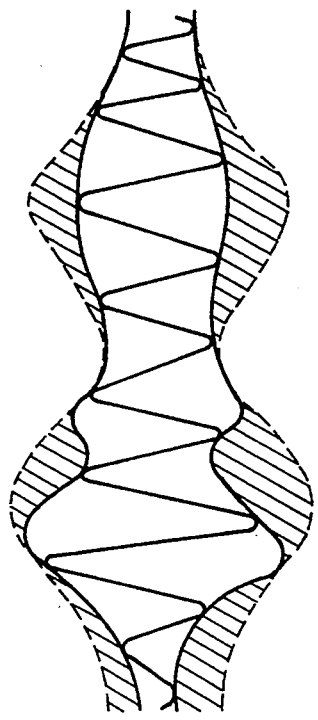
FIG. 20B PILOT FREQUENCY BAND COMPONENT IN REPRODUCED SIGNAL
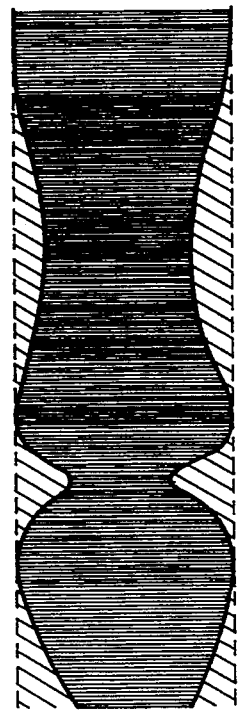
FIG. 20C REPRODUCED SIGNAL OF ENTIRE BAND

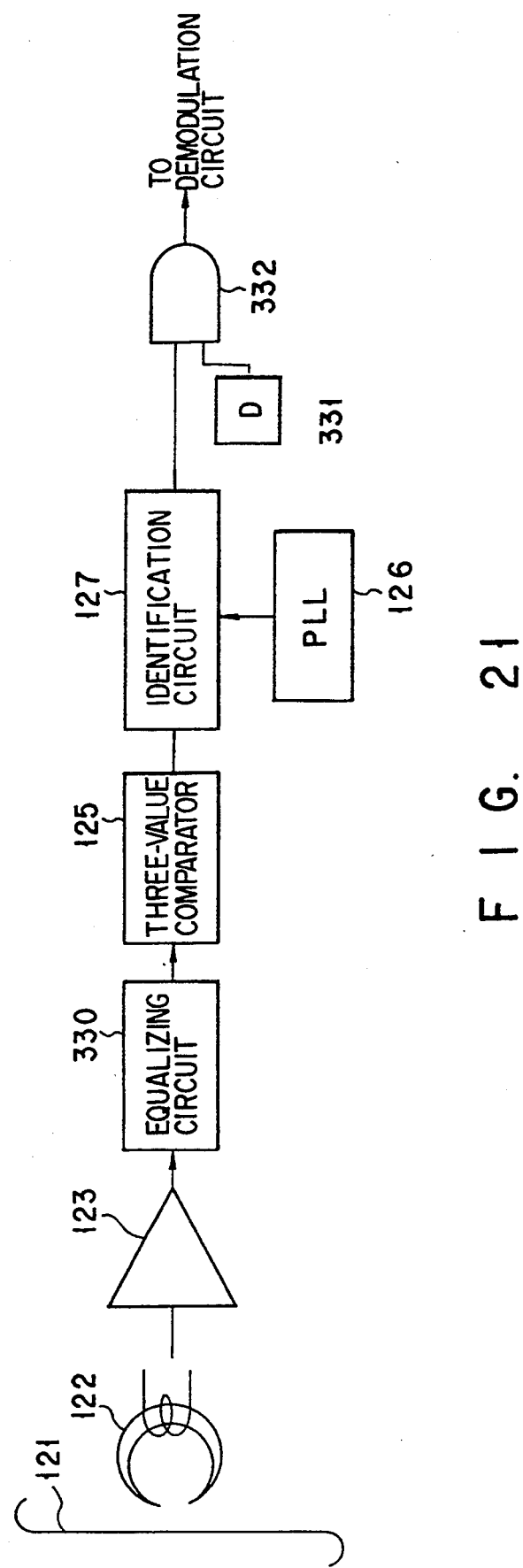
F I G. 21

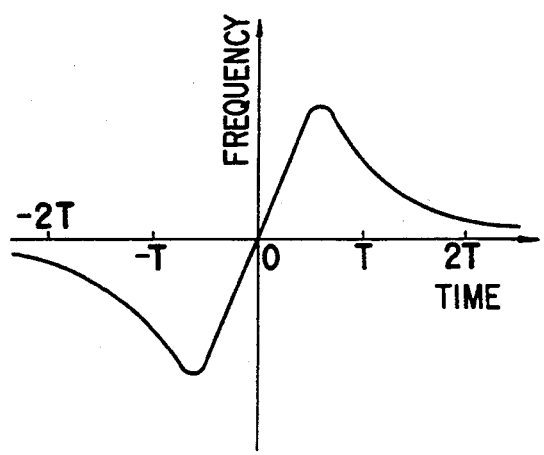
F I G. 23A
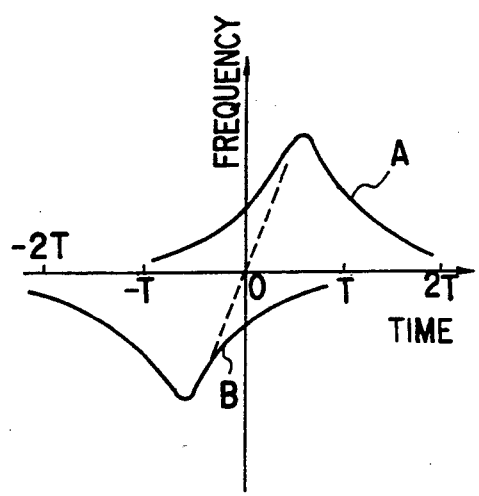
F I G. 23B
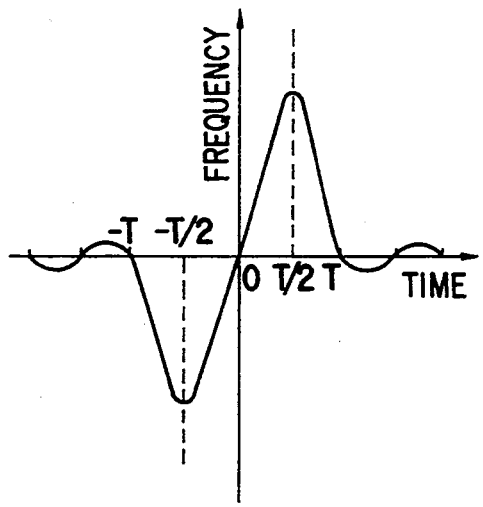
F I G. 23C
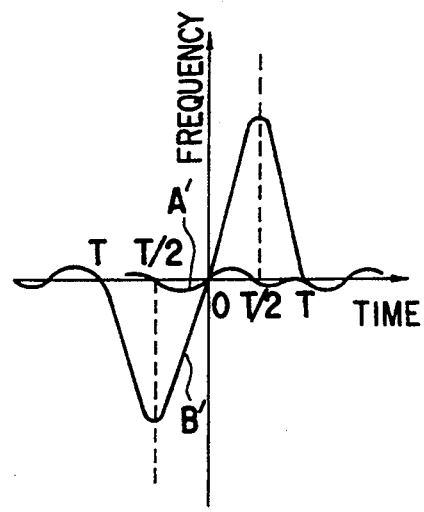
F I G. 23D

| T | A0 | P | EG | E | A1 | P | EG | E | V | P | EG | E | A2 | P | EG | E | A3 | P | a : 2.06°~5.0°
b : 26.32°
c : 2.06°
d : 2.62°

VIDEO DATA RECORDING/REPRODUCING APPARATUS WITH EFFICIENT ERROR CORRECTION

This is a continuation of application Ser. No. 07/893,083, filed on Jun. 3, 1992, now abandoned.

BACKGROUND OF THE INVENTION

1. Field of the Invention

The present invention relates to a video data recording/reproducing apparatus, and more particularly to a video data recording/reproducing apparatus for subjecting information signals to the low bit rate coding process and then recording and reproducing the same with respect to a predetermined recording medium.

2. Description of the Related Art

In the prior art, as a method of magnetically recording and reproducing an audio signal or video signal, an analog signal recording system such as a bias recording system or FM (frequency modulation) system has been used. As an apparatus for magnetically recording analog signals, various types of VTRs (video tape recorders) meeting the requirements of standards of VHS, β and 8-mm are provided. Recently, in order to attain the high quality sound and high quality image, apparatuses of digital recording system causing less signal deterioration at the time of recording or reproducing operation are commercialized. As an apparatus for magnetically recording digital signals, a DAT (digital audio tape) for recording audio signals and broadcasting D-1, D-2 VTRs for recording video signals are provided.

FIG. 25 is a block diagram showing a conventional video data recording/reproducing apparatus constructed by the above-described digital VTR. Unlike the broadcasting VTR such as the D-1, D-2 VTR, the apparatus shown in FIG. 25 is formed for use in the industrial-consumer field (home use) and the amount of information is reduced by the low bit rate coding process to attain the long-time recording operation.

An analog input video signal is converted into digital data in an analog/digital (A/D) converter 1 and then supplied to a format conversion circuit 2. The format conversion circuit 2 converts the input interlace signal into a non-interlace signal, converts the signal into a preset processing unit (for example, for each block structure of 8 pixels × 8 scanning lines) and outputs the same. Data from the format conversion circuit 2 is input to a compression circuit 3 for each processing unit and subjected to the low bit rate coding process.

The amount of data output from the compression circuit 3 is a fraction to several thousandths of the input data amount. A parity code is added to data from the compression circuit 3 in an error correction code adding circuit 4. The parity code is set to correspond to random error and burst error by taking the error generation state of the magnetic recording medium into consideration. The parity added data is input to a modulation circuit 5, converted into a code which is suitable for recording and then supplied to an adder 6.

Like the video recording system, an audio signal recording circuit 7 subjects an input audio signal to the A/D conversion and low bit rate coding process, adds an error correction parity to data, records, modulates and outputs the data to the adder 6. The video and audio data items are multiplexed on the time base by means of the adder 6 and then supplied to a recording amplifier 8. The recording amplifier 8 supplies data to a video head 9 which in turn magnetically records the data on a magnetic tape 10.

At the time of reproducing operation, data read out from the magnetic tape 10 by a video head 11 is distributed to the video circuit system and audio circuit system via a reproducing amplifier 12. A reproducing equalization/synchronization circuit 14 of the video circuit system equalizes the reproduced output and restores the output to digital data of synchronizing signal unit. The digital data is demodulated in a demodulation/TBC (time base correction) circuit 15 and output after the time base thereof is corrected.

The demodulated output is supplied to an error correction circuit 16 which in turn corrects an error included in the reproduced demodulated output and then outputs the output to an expansion circuit 17. The expansion circuit 17 demodulates (expands) an input low bit rate code to restore a signal of original data rate. The thus decoded signal is restored into a format suitable for output form such as display output form in a format conversion circuit 18, converted into an analog signal by a digital/analog (D/A) converter and output.

A reproduced signal from the reproducing amplifier 12 is also input to an audio signal reproducing circuit 13 of the audio circuit system. The audio signal reproducing circuit 13 has substantially the same construction as that of the video circuit system and functions to decode the reproduced signal, expand the signal so as to restore a signal of original data rate, and then convert the signal into an analog signal and output the same.

In FIG. 25, data is transferred between analog input and output terminals via the A/D converter 1 and D/A converter 19. In this case, the signal is deteriorated by the A/D conversion and D/A conversion. Therefore, in the Japanese Electronic Industries Association Standards CP-340, the digital interface standard "digital audio interface" in the audio system is defined. The above standard is adopted in the DAT, CD (compact disk) and the like. Therefore, a digital signal can be transferred without passing through A/D and D/A converters and data can be edited without deteriorating the signal when the data is edited while dubbing the tape.

FIG. 26 is a diagram for illustrating a format of the above standard.

In the above standard, the format sampling frequency, input/output connectors and the like are specified. As shown in FIG. 26, one word is constructed by 32 bits, a maximum number of 24 bits including 4-auxiliary bits are used for audio data and 20 bits are normally used therefor, and the bits are transferred starting from the LSB (least significant bit) side. The other portion is constructed by a 4-bit synchronizing signal and respective bits of V, U, C and P. The V bit is a validity flag and indicates the presence or absence of an error of data. The U bit is a user bit and is used to transfer subcode information inherent to respective devices. The C bit is a channel status bit and defines the quality of data in transmission. The P bit is a parity bit and is inserted to detect an error of data in transmission and always hold the synchronizing signal on the same polarity side.

Signals of L and R channels are transmitted while the signals on the L and R channels are being alternately multiplexed in a time-divided manner. The two-channel signals constitute one frame by use of three types of synchronizing patterns. Data of 192 frames constitutes one block.

The sampling frequency, quantization number, effective sampling number, multiplexing method for Y, Cr and Cb signals and the like are defined with respect to the video signal according to CCIR (Comite Consultatif International des Radiocommunication), Rec. 656 (SMPTE, RP-125) (described in Television Institution Papers Vol. 40 No. 6, 1986 p442 to p448 "CCIR Digital Television 4:2:2 Interface").

Thus, on the transmission side, to-be-transferred data is reconstructed in a preset format and then transmitted. As an error correction code in the transmission path, only a code of simple configuration can be used. On the other hand, on the reception side of the magnetic recording apparatus, an error correction code is constructed to correct the recording error. That is, it is necessary to form an error correction system on the reception side irrespective of the transmission side. Thus, an error correction code different from that on the transmission side is constructed on the reception side and the data rate is different from that on the transmission side, thus making the apparatus extremely irrational.

For the low bit rate coding process for television conferences and television telephones using a 64-Kbps circuit of ISDN (Integrated Services Digital Network), a CCIR H.261 recommendation is reported. FIG. 27 is a view for illustrating the conventional video data recording/reproducing apparatus used in the television (TV) conference. The apparatus of FIG. 27 uses a DT640 coding/decoding unit (made by TOSHIBA).

A camera 21 for photographing participants and a monitor TV 22 for displaying the state of a TV conference hall B are installed in a TV conference hall A. An output signal of the camera 21 is input to a coding/decoding unit 23 (VIDEO CODEC DT64), subjected to the low bit rate coding process and then output from a transmission/reception circuit 24 (MK-6000). As a transmission path, a high-speed digital circuit 25 or communication satellite 26 may be used.

On the side of the conference hall B, data received in a transmission/reception circuit 27 (MK-6000) is decoded by a coding/decoding unit 28 and then displayed by a large projector 29, monitor TV 30 and the like. Thus, the state of the conference hall A can be observed in the conference hall B. Further, the state of the conference hall B is photographed by a camera 31 and displayed on the monitor TV 22 in the conference hall A via a path in a direction opposite to that described above. As a result, a conference can be held between the conference halls A and B which are located in the remote areas. Further, the audio signal can be transferred in the same manner as the video signal.

When a photographed video image is recorded, a signal decoded by the coding/decoding unit 23 or 28 is restored to the base band signal and then supplied to a VTR. In this case, only a video image photographed by one of the cameras can be supplied to a corresponding one of the VTRs. Therefore, at least two VTRs are necessary in order to record the states of the conference halls A and B. Further, as the number of cameras is increased, the number of VTRs for recording video images from the cameras must be increased, and it is necessary to operate the camera and VTR in synchronism with each other. Since a large number of tapes are used to record the proceedings of the conference, the running cost will be increased.

As described before, in a digital VTR for recording and reproducing digital information, an error correction code is added thereto to correct an error caused in the recording/reproducing operation and then the digital information is recorded. Generally, a product code of Reed-Solomon (which is hereinafter referred to as an RS code) is used as the error correction code.

FIG. 28 is a diagram showing the construction of the RS code.

As shown in FIG. 28, in the above correction system, a first correction series (P series) 37 constructed by a data series 35 and checking-code series 36, a data series 38 having data items in the P series as constituents and defined by different series and a second correction series (Q series) 40 constructed by a checking code series 39 are created in the same data space (product code block) and recorded. At the time of reproducing operation, the P series is first used to detect and correct errors and then the Q series is used to correct errors of data which cannot be corrected by use of the P series. In this case, a high correction ability can be attained at the time of correction for the Q series by use of error detection information of the P series.

Recently, the high-definition broadcasting is now on the point of starting. In the high-definition broadcasting, an amount of information to be transmitted is extremely larger than that in the present NTSC (National Television System Cominitee) broadcasting. Therefore, in order to record information in both of the systems, it is considered to variably change the inclination angle of the tracks so as to change the length of the track according to the system. FIGS. 29A to 29D are diagrams used for illustrating recording tracks of this type of conventional video data recording/reproducing apparatus.

FIGS. 29A to 29D respectively show the recording tracks for NTSC signal, EDTV (Extended definition Television) signal and HD (High Definition Television) signal and the recording capacity thereof. If the track length of one of recording tracks 41 of the HD signal shown in FIG. 29C, the track lengths of recording tracks 42 and 43 of the EDTV and NTSC signals are L/2 and L/3. Thus, the recording capacity for each track is changed by changing the inclination angle of the track to change the track length.

However, since the recording capacity of the recording tracks 42 and 43 for NTSC and EDTV signals is smaller than that of the recording track 41, the Q-series signal cannot be completely recorded on the tracks 42 and 43 (refer to FIG. 28) when the RS code is constructed according to the amount of information of the HD signal. Then, when the NTSC and EDTV signals are reproduced, the error correction is effected only in the P series and the correction ability is significantly degraded. Further, when RS signals are constructed for respective formats which are different for respective systems, the circuit scale becomes extremely large.

In the D-2 digital VTR system and the like, a recording format shown in FIG. 30 is used.

As shown in FIG. 30, in the D-2 format, data is constructed by a 62-byte track preamble T, 6-sink block (=1140 bytes) audio sectors A0 to A3, 6-byte postamble P, 156-byte editing gap EG, 28-byte editing gap preamble E and 204-sink block (=38760 bytes) video sector v.

FIG. 31 is a block diagram showing the recording side of the conventional video data recording/reproducing apparatus using the above-described D-2 format.

An input audio signal input via an analog/digital interface 45 is divided into blocks by an audio datablock forming circuit 46 and then supplied to an external code forming circuit 47. The external code forming circuit 47 adds an external code (Q code) to the input data and then supplies the same to an audio data shuffling circuit 48 which in turn shuffles the audio data and outputs the same to a data multiplexing circuit 53. An input video signal is supplied to a channel distribution circuit 50 via an analog/digital interface 49 and divided into blocks for each channel. An external code (Q code) is added to data divided into blocks in an external code forming circuit 51 and then the data is shuffled in an in-sector shuffling circuit 52 and output to a data multiplexing circuit 53. The data multiplexing circuit 53 is supplied with a synchronizing signal and ID signal from a synchronizing ID circuit 54, and the audio and video signals which are separately processed are subjected to the time-division multiplexing process in the data multiplexing circuit 53. Further, an internal code (P code) is added to the data in an internal code forming circuit 55 and then the data is subjected to the channel-coding process in a channel coding circuit 56 and output to a recording amplifier 57. The recording amplifier 57 amplifies the input data and records the data on the helical track for each channel.

As shown in FIG. 30, editing gaps E are provided between the audio and video signals and between the audio signals. The editing gap E permits the audio and video sectors to be independently edited and the preamble P and post-amble P lying before and after the editing gap E are used to make the pull-in and reproduction of a bit synchronization clock easy. In a digital VTR of D-1 format, the audio and video signals are separately processed and external codes are added thereto and they are commonly processed for the internal code. The D-1 and D-2 formats are provided for business use and no audio multi-track format is provided.

FIG. 32 is a diagram for illustrating the format of a multi-track system used in an 8-mm VTR. As shown in FIG. 32, in the PCM (pulse code modulation) audio multi-track system, first to sixth audio tracks are formed in one track by use of the format of PCM audio part. In this case, the video part is FM-recorded and has no relation with respect to the format of the audio part.

Thus, the video and audio signals which are separately processed are separately recorded with the editing gaps on a tape and are subjected to different signal processings. Since the audio and video signals are subjected to different signal processings, the circuit scale must be made large. Further, when a plurality of only audio signals are recorded on one track in the format of audio part, the formats of the audio and video parts are different from each other and different formats will be present on the tape. Therefore, those of the ID and sub-code portions to be referred at the searching time or the like which can be reproduced is limited.

In a recording/reproducing device having a large recording capacity, the searching function is an indispensable additional function. The searching operation is required to be effected with high precision and high operation speed. For example, in a VTR, in order to enhance the searching precision, the searching operation is effected for each frame or field unit instead of each unit of minute or second. Further, in order to enhance the operation speed, that is, move the head to a preset tape position in the shortest possible time, means for correctly detecting an index signal must be provided in addition to means for feeding the tape at a high speed.

FIGS. 33A and 33B are diagrams showing track patterns used in a DAT. FIG. 33A shows the locus of a head at the time of high searching operation and FIG. 33B shows the output waveform of an RF signal at the time of high searching operation.

In a DAT having no fixed head, a sub-code track area is provided in the inclined track and a sub-code in the sub-code area is read out by use of a rotating head at the time of high-speed searching operation. As shown in FIG. 33A, the head traces several tracks by one scanning operation. As shown by signs of + and − in FIG. 33A, the azimuth angle varies for each track. When the head azimuth is +, the reproduced envelope shown in FIG. 33B is obtained. As shown in FIG. 33B, the reproduced envelope takes a form corresponding to a series of beads of a Japanese abacus and the period thereof is determined by the number of tracks scanned by one head scanning operation.

In order to derive a sub-code from the reproduced signal, it is only necessary to set the period of a portion of the reproduced envelope which is kept higher than a preset level to be equal to or longer than time required for the reproduction of the sub-code. As the searching speed becomes higher, the number of tracks to be scanned by one head scanning operation increases and the period of the reproduced envelope becomes shorter. Therefore, the searching speed of high-speed searching operation up to approx. 400 times the normal speed is considered to be the upper limit as is disclosed in "RADIO TECHNOLOGY" (APR.1987) when taking the pull-in of PLL (phase locked loop) for synchronization into consideration.

In order to reproduce the index signal at the time of high-speed searching operation, it is necessary to set the rotation speed of the drum to a preset value so as to set the frequency band of the reproduced signal equal to that obtained in the normal reproducing operation. It is necessary to set the rotation speed at the time of high-speed searching operation in a wider range (1000 to 3000 rpm) in comparison with that of the rotation speed (2000 rpm) in the normal reproducing operation. The rotation speed of the drum is changed by detecting and setting a point at which the clock PLL is locked.

Thus, it is necessary to change the rotation speed of the drum in a wide range in order to effect the high-speed searching operation. Further, the searching operation cannot be started until the pull-in of the PLL is detected, and therefore, when taking the signal processing time for the index signal into consideration, the index signal cannot be reproduced if an envelope output which is higher than the preset level cannot be obtained for a relatively long period of time. As a result, it becomes impossible to effect the searching operation of ultra-high speed which is 1000 times higher than the normal operation speed, for example.

There is also provided a system in which a linear track is provided in another area on the tape and an index signal is recorded in this area. However, since the reproduced signal band varies in proportion to the tape feeding speed, it becomes necessary to set the signal processing system for operation in the high frequency band in order to effect the high-speed searching operation, and in this case, the SN ratio is lowered. Further, when the tape feeding speed is significantly changed, a sufficiently large output may not be obtained because of the characteristic of the tape head system.

In the digital recording system, it is only necessary to identify "1" and "0" at the time of reproducing operation. Therefore, a reproduced signal of higher SN ratio in comparison with a case of the analog recording system in which the SN ratio of the reproduced signal from the magnetic medium influences the SN ratio of the final output can be obtained by use of the error correction technique based on the coding theory.

In the digital recording system, an analog signal is converted into parallel digital data, subjected to various processings, converted into serial data and then recorded. In this case, synchronizing data is inserted in order to identify the boundary portion of each parallel data at the time of reproducing operation. The synchronizing data is constructed by a pattern of several bits which can be separated from the pattern of main signal data and is generally inserted and recorded at regular intervals of several parallel data items.

The synchronizing data is first detected at the time of reproducing operation and is used to sequentially divide the main signal data according to the detected timing. Since the synchronizing data is added for every several parallel data items, the main signal of the several parallel data items cannot be detected when the synchronizing data cannot be detected and the possibility of an error to occur in the main signal data is high. However, unlike the main signal data, an error correction code for correcting an error of the reproduced data cannot be added to the synchronizing data. Therefore, when the synchronizing data is detected, a method for comparing the pattern of the reproduced data with the synchronizing pattern and determining that the synchronizing pattern is detected if a difference therebetween is smaller than a preset number of bits is sometimes used. Further, the synchronizing data is inserted at regular intervals, a method of interrupting the detecting operation for a preset period of time after detection of the synchronizing pattern may be used to prevent the synchronizing pattern from being erroneously detected.

In the digital recording operation, the necessary recording band is wider than that in the analog recording operation. Therefore, in the analog recording VTR, a video signal of one field is recorded on one track, but in the digital recording VTR, it is necessary to record a video signal of one field separately on several tracks. For this reason, in the digital recording operation, consumption of the magnetic tape for each unit period of time is larger than that in the analog recording operation. However, the track width can be made smaller as the magnetic head and magnetic tape are improved, and it becomes possible to provide a necessary recording time.

However, when the recording track width is reduced, the tolerance for the tracking error which is the relative position of the magnetic head with respect to the recording track is reduced. In particular, reduction in the tolerance becomes significant in the recording/reproducing operation of different devices, that is, in the compatible reproducing operation, and in this case, it is difficult to attain a high SN ratio. Therefore, the tracking control of high precision is necessary in the high-density recording operation.

FIGS. 34 and 35 are diagrams for illustrating the tracking control operation. FIG. 34 shows a case of recording operation and FIG. 35 shows a case of reproducing operation. In the drawing, oblique lines indicate the azimuth recording operation. In a system for recording and reproducing data on the magnetic tape by use of a rotating head like the VTR, the traveling locus (recording track 92) of a rotating head 91 on a magnetic tape 90 at the time of recording operation is determined by the traveling speed of the magnetic tape 90 and the rotation speed of the rotating head 91 (FIG. 34). At the time of reproducing operation, as shown by broken lines in FIG. 35, the tracking control is effected so that the rotating head 91 may correctly trace the recording track 92. That is, the tracking control is effected to set up, in the reproducing operation, the same relation between the tape traveling and the head rotation as that set up in the recording operation.

In the prior art, many systems for effecting the tracking control method are proposed. For example, as a system practiced in the helical scanning VTR, the control system used in the D or VHS system is provided. In this system, exclusive tracks are provided in the longitudinal direction of the magnetic tape to record control signals and control and set the phase of the reproduction controlling signal to a preset value. However, since the exclusive track is used, the recording density is low, and since the fixed head is used, the traveling condition of the magnetic tape tends to vary. Further, the tracking error signal cannot be created in the main signal recording track width direction and it is not suitable for the precise positioning control in the high-density recording operation.

A so-called hill-climbing control system which is used together with the above control system to control and set the amplitude of the reproduced main signal to the maximum value may be sometimes used. However, this system can be used in the analog recording VTR in which preset frequency signals are recorded at regular intervals, but cannot be used in the digital recording operation in which the amplitude of the reproduced signal cannot be set constant.

On the other hand, in the 8-mm system which is a relatively high-density recording system among the analog recording system, a pilot system for recording the tracking pilot signal on the main signal on the frequency multiplexing basis, comparing the levels of pilot signals reproduced from the adjacent tracks with each other in the reproducing operation and effecting the position control to set the levels equal to each other. This system is suitable for the high-density recording since the tracking signal is recorded on the same track as the main signal so that the recording density will not be lowered and the tracking error signal can be created in the main signal recording track width direction.

In the 8-mm system, pilot signals are reproduced from adjacent tracks with different azimuth angles. Therefore, it is necessary to select low frequencies with relatively small azimuth-loss effect as the frequency of the pilot signal. For this reason, as shown in FIG. 36, the pilot signal frequency is set to be lower than that of the FM-modulated luminance signal and low-frequency band conversion color signal which are the main signal.

FIG. 37 is a block diagram showing a separation circuit for separating signals in the VTR of 8-mm system.

A reproduced signal from a magnetic head 61 is supplied to a low-pass filter (LPF) 63, band-pass filter (BPF) 64 and high-pass filter (HPF) 65 via a preamplifier 62. The LPF 63 deals with the bandwidth of the tracking pilot signal as the pass band thereof, the BPF 64 deals with the bandwidth of the low-frequency conversion color signal as the pass band thereof, and the HPF 65 deals with the bandwidth of the FM-modulated luminance signal as the pass band thereof. Therefore, the pilot signal, low-frequency conversion color signal and FM-modulated luminance signal respectively shown in FIGS. 36B to 36D are derived from output terminals 66 to 68.

FIG. 38 is a block diagram showing a digital VTR using the tracking pilot signal.

A video signal is input to an input terminal 71. An A/D converter 72 converts the input video signal into a digital signal and outputs the digital signal to an error correction code adding circuit 73 which in turn adds an error correction code to the main signal and outputs the same to a digital modulation circuit 74. In the digital recording operation, the digital conversion circuit 74 effects the data re-arranging process to reduce the amplitude of the D.C component to low frequency component of the frequency spectrum of the recording signal as shown in FIGS. 39A and 39B since the D.C. transmission cannot be effected in the electromagnetic conversion system. Synchronizing data is added to the output of the digital modulation circuit 74 in a synchronizing data adding circuit 75, a pilot signal from a pilot generation circuit 77 is further added to the output in a recording circuit 76 and then the output is magnetically recorded on a tape 78.

At the time of reproducing operation, the FM luminance signal of the reproduced signal is separated by the HPF 65 and supplied to a reproducing circuit 82. An output of the reproducing circuit 82 is supplied to a PLL 81 and time-base correction circuit 83 to correct the time base and then supplied to a synchronizing data detection circuit 84. The synchronizing data detection circuit 84 detects the synchronizing data and a digital demodulation circuit 85 effects the inverted process of the operation effected by the digital modulation circuit 74 in the recording operation so as to demodulate the video signal. An error correction circuit 86 uses a correction signal to correct the error of the demodulated data and a D/A converter 87 converts the digital signal into an analog signal and outputs the same to an output terminal 88. Further, the reproduced signal is also supplied to the LPF 63 which in turn separates the tracking pilot signal from the reproduced signal and outputs the same to a tracking control circuit (not shown).

As shown in FIG. 39B, the pilot signal is recorded on the video signal on the frequency-multiplexing basis. As described before, the digital modulation circuit 74 reduces the amplitude of the low-frequency band component by effecting the modulation process, but the level of the low-frequency band component is relatively high in comparison with a case of the analog recording operation. Therefore, when the pilot signal is separated by the LPF 63 in the reproducing operation, the low-frequency component of the video signal is removed and the SN ratio of the reproduced main signal is lowered.

Even in this case, as described before, the error correction code is added to the main signal data, and even if an error occurs in the reproduced signal as the result of reduction in the SN ratio, the error can be corrected to some extent. However, since no correction code is added to the synchronizing data, the synchronizing data may not be detected if the number of reproduction errors is increased as the result of reduction in the SN ratio caused by separation of the tracking pilot signal. Then, an error may occur in the main signal data of several parallel data items, the error correction ability thereof is exceeded and the reproduced signal is extremely deteriorated.

In FIGS. 34 and 35, the recording track 92 is formed in a linear configuration. However, in practice, the recording track 93 on the tape 90 snakes as shown in FIG. 40 by the influence of the lead configuration of the rotation cylinder and the like. When the recording and reproducing operations are effected in the same device, no particular problem will be caused by the snaking of the recording track 93 since the traveling loci of the rotating head in the recording and reproducing operations coincide with each other.

However, in the compatible reproducing operation in which the reproducing operation is effected in a device different from the recording device, the traveling loci of the rotating head in the recording and reproducing operations will not coincide with each other as shown by broken lines in FIG. 41 by the influence caused by a difference in the lead configuration and the like. Therefore, it is impossible to correctly trace the recording track 93 by simply setting the relation between the tape traveling and the head rotation in the recording operation equal to that in the reproducing operation. Such a tracing deviation gives more serious influence as the track width is made smaller, and a sufficient reproduced envelope may not be sometimes obtained.

In order to solve the above problem, in the prior art, a video data recording/reproducing apparatus in which the tracking can be correctly effected by use of a movable head is proposed. FIG. 42 is a block diagram showing a dynamic tracking following (DTF) circuit used in the above apparatus and FIG. 43 is a diagram showing a head portion.

As shown in FIG. 43, a piezoelectric element 97 is mounted on an upper cylinder so as to be freely rocked and a rotating head 98 is attached to the end portion of the piezoelectric element 97. The piezoelectric element 97 can be displaced in a direction perpendicular to the rotation direction of the cylinder 95 as shown by an arrow in FIG. 43, thereby making it possible to move the head 98 in the track width direction.

As shown in FIG. 42, an adder 101 superposes a pilot signal of preset frequency on the main signal to be recorded. An output of the adder 101 is amplified by an amplifier 102 and then supplied to the head 98 via a selection switch 103. The head 98 records the main signal having the pilot signal superposed thereon on a magnetic tape 104. As described before, the pilot signal is constructed by a low-frequency band component.

At the time of reproducing operation, a reproduced signal from the head 98 is supplied to a preamplifier 105 via the selection switch 103 and amplified. An output of the preamplifier 105 is supplied to a reproducing circuit (not shown) as a reproduced signal and at the same time the pilot signal is separated from the reproduced signal by a BPF 106. A detector circuit 107 detects the pilot signal to detect the level thereof. The detector circuit 107 supplies an output which may cause the maximum detected level to a drive circuit 108 and displaces the piezoelectric element 97. As a result, the head 98 moves in the track width direction to correctly trace the recording track 93.

Thus, in the DTF circuit, deviation of the rotating head is detected according to the detected level of the pilot signal and the piezoelectric element is driven based on the result of detection so as to cause the rotating head to follow the recording track.

However, in the DTF circuit in which the analog pilot is multiplexed, the track deviation of the rotating head can be prevented, but since a pilot signal component is mixed into the reproduced signal, the final error rate will be degraded. Further, when signal components of frequencies lower than the pilot frequency are removed from the reproduced signal by use of the HPF or signal components of frequencies nearly equal to the pilot frequency are removed from the reproduced signal by use of the BPF so as to prevent the pilot signal component from being mixed into the reproduced signal, the recording main signal of frequencies lower than or nearly equal to the pilot frequency will also be removed. Further, the phase of the reproduced signal of frequency near the cut-off frequency of the above filter will be varied.

In the prior art, when a digital signal is recorded or reproduced on a recording medium such as a magnetic tape, a longitudinal recording method for creating a magnetic pattern parallel to the recording medium is used. Assume now that a digital signal which varies in a step form is recorded on the magnetic tape. Also, in this case, magnetic inversion of the tape cannot take an ideal step form. Therefore, the waveform of the reproduced digital signal projects upwardly at the central portion and spreads out towards both end portions as shown in FIG. 44.

The reproduced waveform is called a solitary reproduced waveform, and it can be considered to be substantially symmetrical in the case of longitudinal recording and the waveform can be approximated by the Lorentz function expressed by the following equation (1).

$$f = a/(a^2 + t^2) \quad (1)$$

where t indicates time, and a indicates a pulse width coefficient and is expressed by $a = W50/2T$. T is a bit interval and W50 is the half-width of a pulse.

In the digital recording operation, the condition that the data series can be identified without causing interference between codes can be obtained if the amplitude of the solitary reproduced waveform in the identification point of another code is "0" as shown in FIG. 45. For this reason, an equivalent circuit is used to eliminate the interference of adjacent pulses in the identification point. That is, the equivalent circuit is constructed to output an output waveform h(nT) satisfying the following equation (2) at a timing nT when assuming that the bit interval is T.

$$h(nT) = 0, \quad |n| \geq 1$$

$$h(0) = 1, n = 0 \quad (2)$$

As the above equivalent circuit, a transversal filter shown in FIG. 46 or the like is used.

An input signal from an input terminal 111 is supplied to a delay line group 112 constructed by delay lines each having a delay time of the bit interval T. The input signal and outputs of the respective delay lines are supplied to a gain controller group 113 constructed by tapped gain controllers. The input signal is sequentially delayed by time T by means of the delay lines and a plurality of copy signals are input to the respective gain controllers. The gain controllers are supplied with tap gains, add the tap gains to the respective copy signals, and then supply them to an analog adder 114. The analog adder 114 adds the input signals together in an analog manner and outputs the result of addition to an output terminal 115. As a result, an output created based on the tap gain is derived from the output terminal 115. Thus, the equalization operation is effected by delaying an input signal to generate copy signals of the same waveform as that of the input signal, adding the tap gain to the copy signals and then adding them together. Therefore, when the solitary reproduced signal which is an input signal is asymmetrical, it becomes difficult to effect the equalizing process.

As described above, the signal can be identified by equalizing the reproduced signal. As the signal detection system, various systems are provided according to the method of equalizing the reproduced signal in a case where a solitary pulse "00100" is used as a recording signal.

FIGS. 47 and 48 are circuit diagrams of recording and reproducing systems using a PR (1, −1) system as the signal detection system and FIG. 49 is a timing chart for illustrating the operations thereof (a) to (e) in FIG. 49 indicate the waveforms of signals on respective points (a) to (e) in FIGS. 47 and 48.

An input signal shown in (a) of FIG. 49 is supplied to a pre-coder 116. The pre-coder 116 is constructed by a 1-bit delay circuit 117 and an adder 118 and supplies an output corresponding to the exclusive-OR of the input signal and the output signal of the 1-bit delay circuit 117. That is, the pre-coder 116 effects the operation of mod2 with respect to the input signal to derive a recording signal shown in (b) of FIG. 49. An output of the pre-coder 116 is amplified by a recording amplifier 119 and recorded on a magnetic tape 121 by means of a ring head 120.

At the time of reproducing operation, a reproduced signal reproduced by a ring head 122 is amplified by a preamplifier 123 and supplied to an equalizing circuit 124. The equalizing circuit 124 effects the above-described waveform equalization for the reproduced signal to output an equalized signal shown in (c) of FIG. 49. A three-value comparator effects the three-value detection for the equalized signal and outputs an identification signal shown in (d) of FIG. 49 to a PLL 126 and identification circuit 127. The PLL 126 extracts a clock from the identification signal and supplies the same to the identification circuit 127 which in turn uses the clock to identify the identification signals "1" and "−1" as "1". Thus, a reproduced signal shown in (e) of FIG. 49 is derived from the identification circuit 127. Since the the reproduced signal is identified as "001-100" with respect to the recording signal "00100", this system is called PR(1, −1) system.

It is considered that the recording density is further enhanced. However, if the recording frequency is enhanced to attain the high-density recording, the reproduced amplitude is reduced, the interference between codes increases and the SN ratio is degraded by the waveform equalization. Thus, the longitudinal recording is not suitable for the high-density recording.

FIG. 50 is a diagram for illustrating the above problem and shows a magnetic pattern in the longitudinal recording in a case where the wavelength of the recording signal is $\lambda$.

A magnetic pattern 132 having a length of $\lambda/2$ and a thickness of $\delta$ is formed in a horizontal direction by a head 133 on the recording medium surface on a base 131 of a recording medium 130. The magnetic pattern 132 is formed with the same magnetic poles of adjacent segments set to face each other, and when the recording wavelength $\lambda$ is reduced, the self-demagnetization factor N [$\propto \delta/(\lambda/2)$] becomes large and the demagnetization force Hd ($= N \times M$) in a direction opposite to that of the magnetization M also becomes large. That is, as the recording density becomes higher, the self-demagnetization becomes stronger, making it difficult to effect the recording operation. Further, since the bit interval T is reduced by the high-density recording, the pulse width coefficient a becomes larger, and as a result, the solitary reproduced waveform more widely spreads towards the end portions thereof, thereby further degrading the SN ratio by equalization.

The apparatus is further miniaturized and the diameter of the rotation cylinder is reduced. Therefore, the operation of the tape feeding system becomes unstable and air may be inserted between the rotation cylinder and the tape. Then, the tape floats to cause a large space loss. The space loss Lsp has a relation expressed by the following expression (3) if the space amount is s and the recording wavelength is $\lambda$.

$$\text{Lsp} \propto \exp(-s/\lambda) \qquad (3)$$

As indicated by the expression (3), the space loss rapidly increases when the recording wavelength becomes shorter. For the above reason, in the digital recording in the longitudinal recording operation, it is considered that a signal having the wavelength of approx. 0.5 $\mu$m may be the limit for recording.

When the vertical recording method shown in FIG. 51 is used, the high-density recording can be effected.

In the vertical recording, as shown in FIG. 51, a magnetic pattern 139 having a length kept at $\delta$ is formed on the recording medium surface on a base 136 of a recording medium 135 by use of a main magnetic pole 137 and an auxiliary magnetic pole 138. In this case, the self-demagnetization factor is expressed by N [$\propto (\lambda/2)/\delta$] and the demagnetization becomes smaller as $\lambda$ becomes smaller, thus making the recording state stable. That is, a large reproduced output can be derived in the high-density recording. Further, since the inversion of the magnetization can be rapidly effected, an output signal is obtained in the form of a pulse waveform of narrow width and this is effective for the high-density recording.

In order to effect the vertical recording, it is necessary to use a head for creating the distribution of vertical magnetic field whose intensity is high and which rapidly varies. For example, as shown in FIG. 51, a head having the main magnetic pole 137 and the auxiliary magnetic pole 138 facing each other with a recording medium disposed therebetween may be used. However, it cannot be used in a VTR or the like using a rotation cylinder to effect the recording/reproducing operation.

Even a ring head used in the VTR has a strong vertical magnetic field component created at the gap edge, and if the recording medium has the vertical orientation property, substantially the vertical recording can be effected. This is called the quasi-vertical recording and Co-Cr, Ba-ferrite or the like is used as the recording medium. Particularly, when Ba-ferrite is used, the conventional coating technique can be used and the vertical orientation degree can be easily controlled, and therefore, it is highly expected to be used as the high-density recording medium.

Thus, in order to effect the vertical recording by use of the ring head, it is necessary to use a recording medium of high vertical orientation degree. However, as is disclosed in "PEAK SHIFT CHARACTERISTICS FOR BARIUM FERRITE FLEXIBLE DISK DRIVE" (1987 DIGEST OF THE 'INTER MAG CONFERENCE' AB-04) (reference document 1), when the vertical orientation degree of the recording medium increases, the degree of asymmetry of the solitary waveform becomes larger. As described before, in the equalization and signal detection, the waveform equalization is effected to set "0" at the adjacent identification point on the assumption that the solitary reproduced waveform is substantially symmetrical, but it is extremely difficult to equalize the solitary reproduced waveform of large degree of asymmetry into an identifiable waveform. Further, the SN ratio is degraded with an increase in the amount of waveform equalization.

Thus, in the above-described conventional video data recording/reproducing apparatus, it is necessary to construct an error correction system irrespective of the transmission side on the receiving side. For this reason, an error correction code different from that on the transmission side is constructed on the reception side and the data rate becomes different from that on the transmission side, thus making the apparatus extremely irrational.

When a video image photographed in a TV conference or the like is recorded, a decoded signal is restored to the base band signal and then recorded, and therefore, recording devices of a number corresponding to the number of the cameras must be used and the running cost increases.

If the recording capacity of one track is variable, the product code of error correction will not be completed in a mode different from the mode in which the recording capacity is maximum and thus the error correction ability will be extremely degraded. Further, if the product code is constructed for each system, the circuit scale will be extremely increased.

When video and audio signals separately edited are separately recorded on the tape with an edition gap disposed therebetween, different signal processings are effected for the video and audio signals. When different signal processings are effected for the video and audio signals, the circuit scale must be made large. Further, when a plurality of audio signals are recorded in the format of audio section on one track, the formats of the video part and the audio part become different from each other so that portions of different formats will be present on the tape. Therefore, a reproducible part of the ID and sub-code portion referred to in the searching operation will be limited.

In order to effect the high-speed searching operation, the rotation speed of the drum must be varied in a wide range. Further, the searching operation cannot be started until the pull-in of PLL is determined, and the index signal cannot be reproduced unless an envelope output is kept higher than a preset level for a relatively long period of time when taking the signal processing time for the index signal into consideration. Therefore, it is impossible to effect the searching operation of ultra-high speed which is 1000 times the normal speed, for example.

In the conventional video data recording/reproducing apparatus, since the tracking pilot signal is frequency-multiplexed on the video signal, the SN ratio of the reproduced signal is lowered by separation of the tracking pilot signal so that the synchronizing data may not be reproduced and the main signal may not be decoded.

Further, in the DTF circuit in which an analog pilot signal is multiplexed, the problem of track deviation of the rotation head can be solved, but the pilot signal component is mixed into the reproduced signal so that the final error rate will be lowered. Further, when an HPF is used to remove components of frequencies lower than the pilot frequency from the reproduced signal or a band elimination filter (BEF) is used to remove the signal component of frequencies near the pilot frequency in order to prevent the pilot signal component from being mixed into the reproduced signal, the recording main signal of frequency band lower than or near the pilot frequency will also be removed. Further, the phase of the reproduced signal of the frequency near the cut-off frequencies of the above filters will vary.

Further, in the conventional video data recording/reproducing apparatus, if the vertical recording is effected by means of a ring-shaped head using a vertical orientation recording medium in order to effect the high-density digital recording, the solitary reproduced waveform becomes asymmetrical, thus making it extremely difficult to identify the reproduced waveform.

SUMMARY OF THE INVENTION

This invention has been made in view of the above problems and an object of this invention is to provide a video data recording/reproducing apparatus in which the same error correction system as that constructed on the transmission side is constructed on the reception side and a recording error can also be corrected by use of an error correction code from the transmission side.

Another object of this invention is to provide a video data recording/reproducing apparatus in which a plurality of low bit rate coded signals can be simultaneously recorded by one apparatus.

Another object of this invention is to provide a video data recording/reproducing apparatus in which index signals can be continuously reproduced and a sufficiently high SN ratio can be obtained for a wide range of searching speeds.

According to a first aspect of this invention, there is provided a video data recording/reproducing apparatus comprising a first error correction circuit for receiving transmission data to which an error correction code is added in a format set based on the error generation state of a recording/reproducing medium, correcting an error occurring in transmission by use of the error correction code and outputting the transmission data without removing the error correction code; an error correction code adding circuit for adding an error correction code based on the error generation state of the recording/reproducing medium to the transmission data and outputting the same when the transmission data does not contain the error correction code; switching means for selecting one of the outputs of the first error correction circuit and the error correction code adding circuit according to whether the error correction code is contained in the transmission data or not; recording means for recording an output of the switching means on the recording/reproducing medium; reproducing means for reproducing data recorded on the recording/ reproducing medium; and a second error correction circuit for receiving an output of the reproducing means, correcting the error occurring at the time of recording/reproducing operation according to the error correction code and outputting the corrected data.

According to a second aspect of this invention, there is provided a video data recording/reproducing apparatus comprising determination means for receiving at least one coded data item and determining the transmission rate of the input coded data and the number of input coded data items; multiplexing processing means for receiving the at least one coded data item and arranging the input coded data items based on the result of determination made by the determination means to record the input coded data in a multiplexing manner and repeatedly record the same; a coding circuit for forming a sub-code indicating the multiplexing method and the number of repetitions of the multiplexing processing means and multiplexing the same on an output of the multiplexing processing means; recording means for recording an output of the coding circuit on a predetermined recording medium; reproducing means for reproducing data recorded on the recording medium and outputting a reproduced signal; sub-code decoding means for extracting the sub-code from the reproduced signal to determine the multiplexing method and the number of repetitions; canceling means for canceling the repetition and multiplexing of the coded data from the reproduced signal based on an output of the sub-code decoding means; and decoding means for decoding an output of the canceling means.

According to a third aspect of this invention, there is provided a video data recording/reproducing apparatus comprising an index signal generator for generating an index signal based on recorded data; a frequency divider for dividing the frequency of the index signal; modulation means for modulating a plurality of carriers having different frequencies by index signals of a plurality of frequency bands output from the index signal generator and frequency divider; recording means for mixing and recording the plurality of modulation signals on a predetermined recording medium; reproducing means for reproducing the modulation signal recorded on the recording medium at a preset reproducing speed and outputting a reproduced signal; bandwidth limiting means for limiting the bandwidth of the reproduced signal by a bandwidth corresponding to the bandwidths of the index signal and the carriers; and index decoding means for demodulating an output of the bandwidth limiting means to reproduce the index signal.

In the first aspect of this invention, the error correction code added to the transmission data is based on the error generation state of the recording/reproducing medium. The first error correction circuit corrects an error in the transmission path by use of the error correction code added to the transmission data. The switching means selects an output of the first error correction circuit or an output of the error correction code adding circuit when the error correction code is not added to the transmission data, and supplies the selected output to the recording means. Thus, data having an error correction code added thereto is recorded on the recording medium. The second error correction circuit corrects an error which is contained in data reproduced from the recording medium by the reproducing means and which occurs at the time of recording/reproducing operation by use of the error correction code. The error correction efficiency is enhanced by using the error correction code on the transmission side.

In the second aspect of this invention, the determination means determines the number of the multiplexing operations and repetitions of input coded data in the multiplexing processing means according to the transmission rate and the number of inputs of the input coded data. Data is arranged by the multiplexing processing means based on the result of determination and recorded on the recording medium by the recording means. A subcode indicating the multiplexing method and the number of repetitions is multiplexed on to-be-recorded data by the coding circuit and the sub-code decoding means decodes the sub-code from the reproduced signal and determines the multiplexing method and the number of repetitions of the coded data. The canceling means cancels the repetition and the multiplexing of the decoded data from an output of the sub-code decoding means to derive a plurality of input coded data items. Thus, a plurality of input coded data items can be recorded and reproduced by a single apparatus.

In the third aspect of this invention, the frequency divider divides the frequency of the index signal to generate a plurality of index signals of different frequency bands. The index signals are modulated by the modulation means using carriers of different frequencies and recorded on the recording medium by the recording means. The reproducing means reproduces the modulation signal of the recording medium at a preset reproducing speed. The bandwidth limiting means limits the bandwidth of the reproduced signal by a bandwidth corresponding to the bandwidths of the index signal and the carries. The carrier frequency of the modulation signal is relatively changed according to the reproducing speed and the bandwidth thereof is also changed. As a result, one of the index modulation signals of the reproduced signal can always be output from the bandwidth limiting means, and since the bandwidth thereof is kept constant, the index signal can be reproduced irrespective of the reproducing speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitutes a part of the specification, illustrate presently preferred embodiments of the invention and, together with the general description given above and the detailed description of the preferred embodiments given below, serve to explain the principles of the invention.

FIGS. 8A to 8C are explanatory diagrams for illustrating the embodiment of FIGS. 7A and 7B;

FIGS. 9A and 9B are block diagrams showing another embodiment of this invention;

FIG. 12 is a block diagram showing another embodiment of this invention;

FIG. 14 is an explanatory diagram for illustrating the embodiment of FIG. 12;

FIG. 15 is an explanatory diagram for illustrating the embodiment of FIG. 12;

FIG. 18 is a block diagram showing another embodiment of this invention;

FIGS. 19A to 19D are explanatory diagrams for illustrating the embodiment of FIG. 18;

FIGS. 20A to 20C are explanatory diagrams for illustrating the embodiment of FIG. 18;

FIG. 21 is a block diagram showing another embodiment of this invention;

FIGS. 23A to 23D are explanatory diagrams for illustrating the embodiment of FIG. 21;

DETAILED DESCRIPTION OF THE PREFERRED EMBODIMENTS

Figure 1:
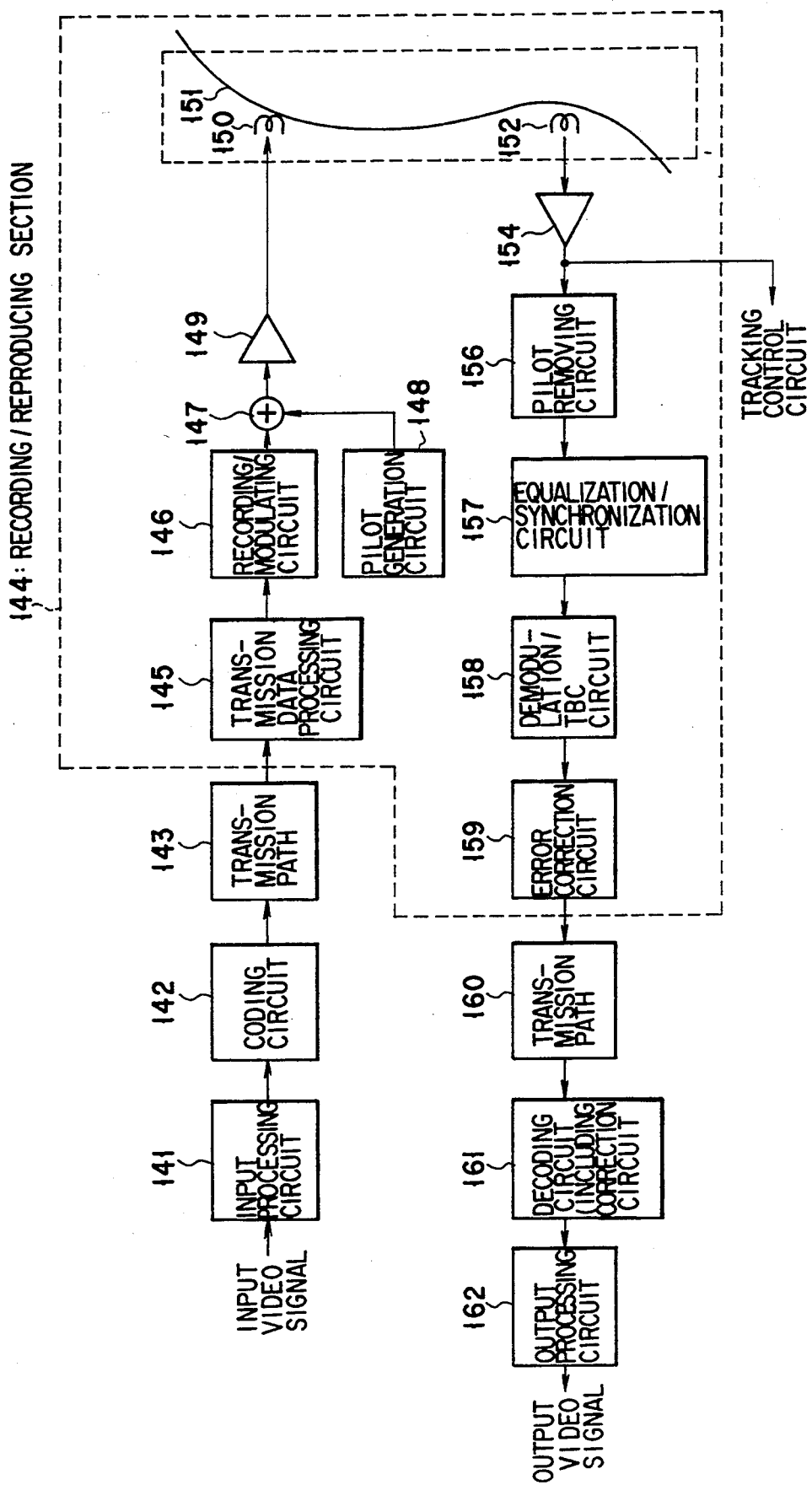
FIG. 1 is a block diagram showing one embodiment of a video recording/reproducing apparatus according to this invention.

Reference will now be made in detail to the presently preferred embodiments of the invention as illustrated in the accompanying drawings, in which like reference characters designate like or corresponding parts throughout the several drawings.

There will now be described an embodiment of this invention with reference to the accompanying drawings. FIG. 1 is a block diagram showing one embodiment of a video data recording/reproducing apparatus according to this invention.

In FIG. 1, a video signal output from a camera or the like is input to an input processing circuit 141. The input processing circuit 141 converts an input signal into a signal form which can be adequately processed in the succeeding stages. For example, the input processing circuit 141 separates the input signal into a luminance signal Y and color signals Cr and Cb, and the luminance signal Y and color signals Cr and Cb are respectively sampled at sampling frequencies of 13.513.5 MHz and 13.5/2 MHz and converted into digital data which is then output for each block of 8 pixels × 8 scanning lines. A coding circuit 142 effects the low bit rate coding process suitable for the input signal and recording/reproducing section 144 and effects an operation of adding an error correction parity to the input data and the like.

The coded signal is transmitted to the recording/reproducing section 144 via a transmission path 143 constructed by a transmission circuit, transmission cable and reception circuit. A transmission data processing circuit 145 of the recording/reproducing section 144 effects the correction of an error in the transmission data and outputs the corrected data to a recording/modulating circuit 146. The recording/modulating circuit 146 converts the input data into a code which can be adequately recorded on the recording medium, and at the same time, adds a synchronizing signal or the like to the input data and outputs the same to an adder circuit 147.

A pilot generation circuit 148 outputs a preset pilot signal to the adder circuit 147. The adder circuit 147 superposes the pilot signal on the recording data and then supplies the data to a recording amplifier 149. The recording amplifier 149 amplifies the input data and supplies the data to a video head 150 so as to magnetically record the data on a tape 151.

At the time of reproducing operation, data recorded on the tape 151 is reproduced by a video head 152. A preamplifier 154 amplifies a reproduced signal from the head 152 and supplies the same to a pilot removing circuit 156. The pilot removing circuit 156 removes the pilot signal component of the reproduced data and then outputs the thus obtained data to an equalization/synchronization circuit 157. The equalization/synchronization circuit 157 reproduces and equalizes only the information signal such as the video and audio signals and separates and outputs a synchronizing signal to a demodulation/TBC circuit 158. The demodulation/TBC circuit 158 effects an inverted process of the modulating operation effected at the time of recording operation to demodulate the reproduced signal and corrects the time base and outputs the thus obtained signal to an error correction circuit 159. The error correction circuit 159 corrects the error by use of the error correction code contained in the reproduced signal and outputs the corrected signal. An output of the recording/reproducing section 144 is supplied to a decoding circuit 161 via a transmission path 160 constructed by a transmission circuit, transmission cable and reception circuit. The pilot signal contained in the reproduced signal from the preamplifier 154 is supplied to a tracking control circuit (not shown).

The decoding circuit 161 includes an error correction circuit, and corrects an error of the received data and effects an inverted process of the operation effected by the coding circuit 142 to decode the low bit rate code and restore the same to an original signal. An output processing circuit 162 converts the signal from the decoding circuit 161 from the low bit rate coding processing unit to the original video and audio signals and time-sequentially outputs the thus converted signals.

Figure 2:
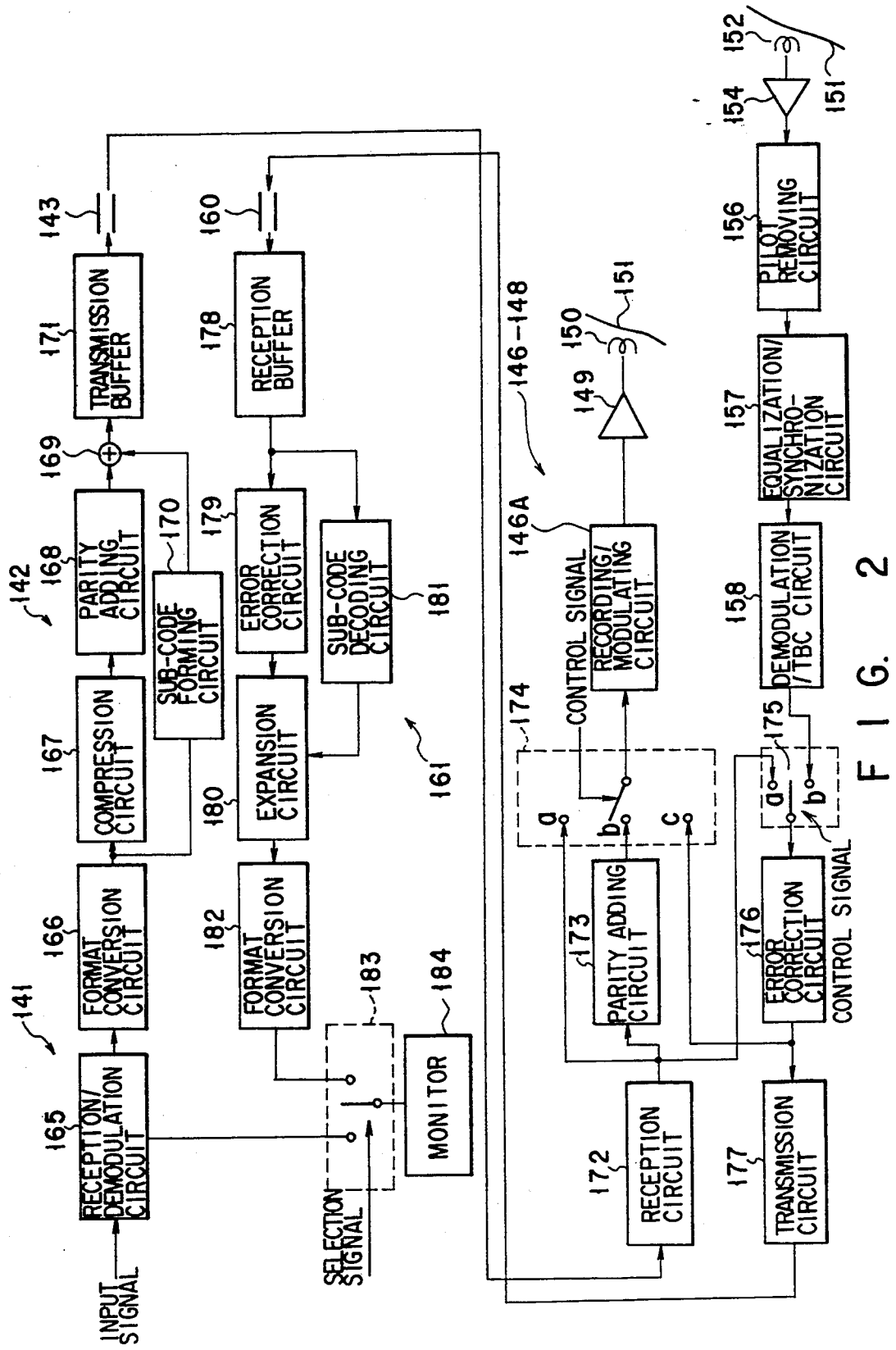
FIG. 2 is a block diagram showing the concrete construction of FIG. 1.

FIG. 2 is a block diagram showing the detail construction of the apparatus shown in FIG. 1. In FIG. 2, portions which are the same as those of FIG. 1 are denoted by the same reference numerals and the explanation therefor is omitted.

A broadcasting signal or an input signal from a camera or the like is supplied to a reception/demodulation circuit 165. The reception/demodulation circuit 165 constitutes the input processing circuit 141 of FIG. 1 in cooperation with a format conversion circuit 166. The reception/demodulation circuit 165 restores the input signal to the base band signal and the format conversion circuit 166 converts a received signal to a digital signal and outputs the digital signal to a preset data compression circuit 167 in the unit of 8×8 blocks, for example.

The compression circuit 167 effects the low bit rate coding process suitable for the recording operation of the recording/reproducing section 144 and the type of input signal to compress the input data and outputs the compressed data to a parity adding circuit 168. The compression circuit 167, parity adding circuit 168, adder circuit 169 and sub-code forming circuit 170 are combined to constitute the coding circuit 142 of FIG. 1. The parity adding circuit 168 adds an error correction parity, the sub-code forming circuit 170 forms a sub-code indicating the type of a signal, and the adder circuit 169 adds the sub-code to the coded output and then supplies the resultant data to a transmission buffer 171.

An output from the transmission buffer 171 is supplied to a reception circuit 172 of the recording/reproducing section 144 via the transmission path 143. An output of the reception circuit 172 is supplied to a parity adding circuit 173, a terminal a of a switch 174 and a terminal a of a switch 175. The parity adding circuit 173 adds a recording parity code to the reception data and supplies the resultant data to a terminal b of the switch 174. The common terminal of the switch 175 is connected to an error correction circuit 176, and the error correction circuit 176 corrects the error by use of the parity code and outputs the data to a terminal c of the switch 174 and a transmission circuit 177 without removing the parity code.

The switch 174 is controlled by a control signal, and when no parity is added on the transmission side, it selects the terminal b so as to permit data to which a recording parity is added by the parity adding circuit 173 to be supplied to a recording/modulating circuit 146A and when a parity is added on the transmission side, it selects the terminal c so as to permit an output of the error correction circuit 176 to be supplied to the recording/modulating circuit 146A. The switch 175 is controlled by a control signal, and selects the terminal a in the recording operation and the terminal b in the reproducing operation. The error correction circuit 176 corrects the error of the received data by use of the parity code and outputs the corrected data to the terminal c of the switch 174, and corrects the error of the reproduced data and outputs the corrected data to the transmission circuit 177.

The recording/modulating circuit 146A constitutes the recording/modulating circuit 146, adding circuit 147 and pilot generation circuit 148 of FIG. 1 and is designed to modulate the received data, add a pilot signal to the data and outputs the thus obtained data. Further, reproduced data from the demodulation/TBC circuit 158 on the reproducing side is supplied to the transmission circuit 177 via the terminal c of the switch 175 and error correction circuit 176. The transmission circuit 177 outputs the reproduced data to an output system via the transmission path 160.

Data from the transmission path 160 is input to an error correction circuit 179 and sub-code decoding circuit 181 via a reception buffer 178. The error correction circuit 179 effects the error correction by use of a parity code contained in the received data and supplies the corrected data to an expansion circuit 180. A sub-code decoding circuit 181 decodes a sub-code contained in the received data and outputs the decoded data to the expansion circuit 180. The expansion circuit 180 effects an inverted process of the operation effected by the compression circuit 167 by use of the sub-code to decode data. The error correction circuit 179, sub-code decoding circuit 181 and expansion circuit 180 are combined to constitute the decoding circuit 161 of FIG. 1. A format conversion circuit 182 restores the output format to the original format and outputs the same to a switch 183. An output of the reception/demodulation circuit 165 is input to the switch 183 and the switch 183 permits one of the input signals to be output to a monitor 184 according to a selection signal. Thus, the direct input signal and reproduced signal are displayed on the monitor 184.

Next, the operation of the above video recording/reproducing apparatus is explained.

An input signal received by the reception/demodulation circuit 165 is sampled at a preset sampling frequency, for example, in the format conversion circuit 166 and separated into the luminance signal Y and color signals Cr and Cb. The format conversion circuit 166 converts the received signal into a block construction of 8 pixels×8 scanning lines and outputs the converted data to the compression circuit 167. The compression circuit 167 effects the low bit rate coding process and the parity adding circuit 168 adds a parity code to the coded data. The adding circuit 169 adds a sub-code to an output of the parity adding circuit 168 and outputs the thus obtained data to the transmission buffer 171.

An output of the transmission buffer 171 is input to the reception circuit 172 of the recording/reproducing section 144 via the transmission path 143. Data received by the reception circuit 172 is supplied to the error correction circuit 176 via the terminal a of the switch 175. The error correction circuit 176 corrects the error of the received data generated from the transmission path 143 or the like by use of the parity code added by the parity adding circuit 168 and then outputs the corrected data to the terminal c of the switch 174. In this case, the switch 174 is controlled by a control signal to select the terminal c so as to permit an output of the error correction circuit 176 to be supplied to the recording/demodulating circuit 146A.

The recording/demodulating circuit 146A converts the received data to a code suitable for recording, superposes a pilot signal on the code and supplies the same to the recording amplifier 149. The recording amplifier 149 amplifies and supplies the input to the video head 150 to record the same on the tape 151.

At the time of reproducing operation, recorded data is reproduced from the tape 151 by means of the video head 152, amplified by the preamplifier 154 and supplied to the pilot removing circuit 156. The pilot removing circuit 156 separates and supplies the pilot signal to a tracking control circuit (not shown) and supplies the reproduced signal to the equalization/synchronization circuit 157. In the equalization/synchronization circuit 157, only the information signal such as the video and audio signals is reproduced and equalized and the synchronizing signal is separated. Further, the reproduced signal is restored to the original signal series by the demodulation/TBC circuit 158 and supplied to the terminal c of the switch 175.

At the time of reproducing operation, the switch 175 selects the terminal b and permits the reproduced signal to be supplied to the error correction circuit 176. The error correction circuit 176 outputs the reproduced signal to the switch 174 without removing the error correction code at the time of recording operation, corrects the error in the recording and reproducing operations by use of the error correction code contained in the reproduced signal, and outputs the corrected data to the transmission circuit 177. The transmission circuit 177 outputs the reproduced data to an output system via the transmission path 160.

Data input via the reception buffer 178 of the output system is supplied to the error correction circuit 179. The error correction circuit 179 corrects the error caused in the transmission path 160 by use of the error correction code added by the parity adding circuit 168 and supplies the corrected data to the expansion circuit 180. The expansion circuit 180 decodes the received data to the original data by use of a sub-code from the sub-code decoding circuit 181. Further, the received data is restored to the original video signal and audio signal in the format conversion circuit 182 and then supplied to the switch 183. The switch 183 selects one of data from the reception/demodulation circuit 165 and the received data according to a selection signal and supplies the selected data to the monitor 184 for display.

When data having no parity code added thereto is input via the reception circuit 172, the switch 174 of the recording/reproducing section 144 permits data having a parity added by the parity adding circuit 173 to be supplied to the recording/modulating circuit 178. In this case, the error correction circuits 176 and 179 effect the error correction by use of the parity code from the parity adding circuit 173.

Thus, in this embodiment, the same error systems are constructed on the transmission side and on the recording/reproducing section 177 (reception side), data is recorded without removing the parity code for error correction after the error correction is effected by the error correction circuit 176 of the recording/reproducing section 177, and the error caused in the transmission paths 143 and 160 and in the recording/reproducing operation can be corrected by means of the error correction circuits 176 and 179 by use of the parity added on the transmission side.

As the correction strategy for the error correction circuit 176 of the recording/reproducing section 177 and the error correction circuit 179 of the output system, strategy suitable for the recording medium and transmission path may be used. Further, since the signal is input to the expansion circuit 180 via the two error correction circuits 176 and 179, the amount of correcting operation may be reduced by providing a correction circuit in the expansion circuit 180.

Figure 3:
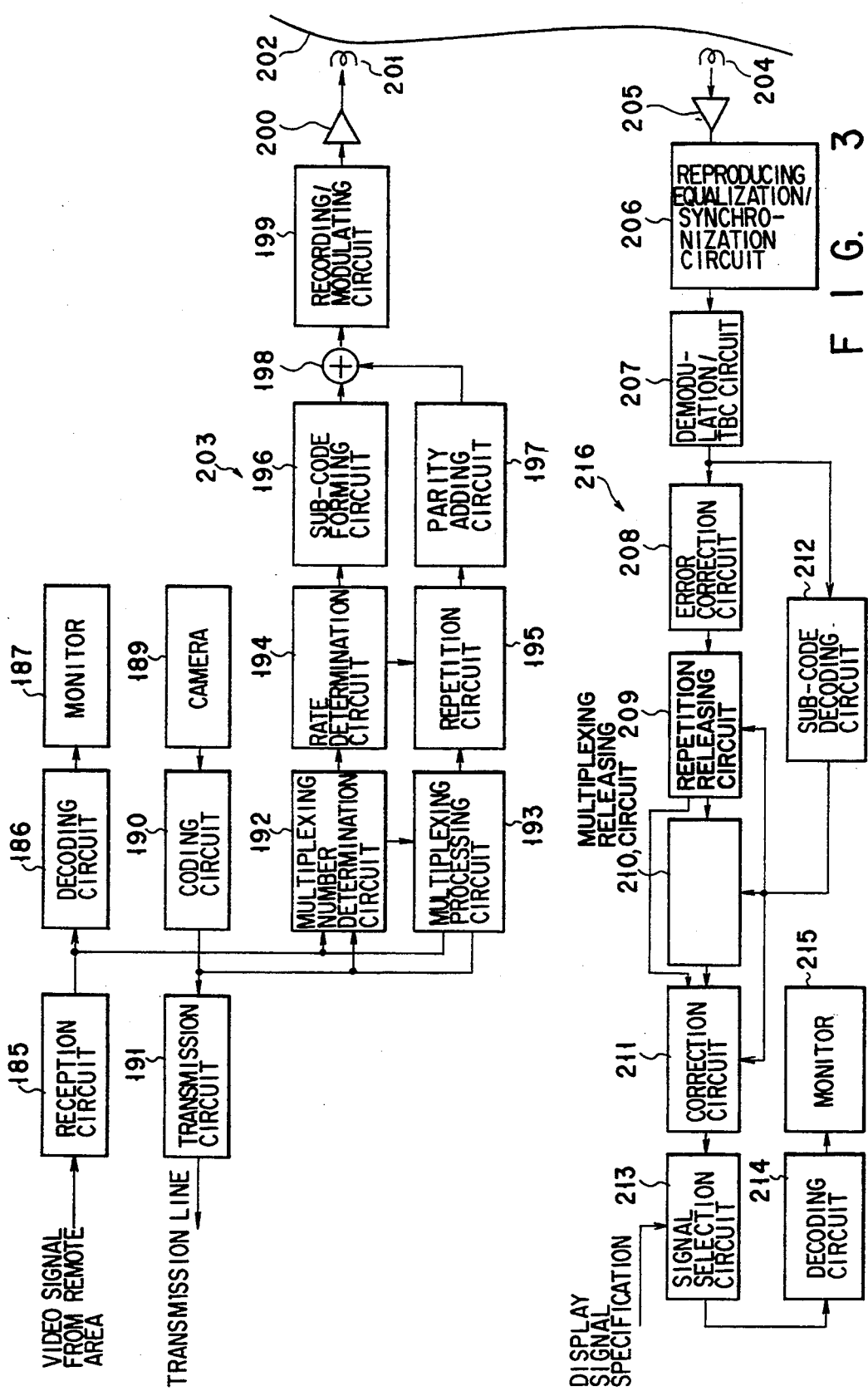
FIG. 3 is a block diagram showing another embodiment of this invention.

FIG. 3 is a block diagram showing a video data recording/reproducing apparatus according to another embodiment of this invention. This embodiment is made to be suitable for a TV conference.

A camera 189 photographs the state of conference to be photographed and supplies a video signal to a coding circuit 190. The coding circuit 190 effects a preset low bit rate coding process to reduce the data rate and then outputs the data to a transmission circuit 191, multiplexing number determination circuit 192 and multiplexing processing circuit 193. The transmission circuit 191 transmits the video data to a remote area (not shown) via a transmission path (not shown).

On the other hand, a signal from a camera in the remote area (not shown) is subjected to the low bit rate coding process and then input to a reception circuit 185 via a transmission path (not shown) such as ISDN. The reception circuit 185 receives the transmission signal and supplies the received signal to a decoding circuit 186, multiplexing number determination circuit 192 and multiplexing processing circuit 193. The decoding circuit 186 effects an inverted process of the coding operation in the remote area so as to decode the received data and supplies the decoded data to a monitor 187 for display.

In FIG. 3, only one reception system and one transmission system are shown, but a plurality of reception systems and transmission systems may be used.

In this embodiment, a coded signal is multiplexed and recorded in the recording system 203 without being restored to the base band signal. That is, the multiplexing number determination circuit 192 of the recording system 203 determines the number of inputs to be multiplexed at the time of recording operation. The multiplexing processing circuit 193 is supplied with transmission data from the reception circuit 185 and data of video images photographed by the camera 189 from the coding circuit 190 and is controlled by an output of the multiplexing number determination circuit 192 to effect the multiplexing operation according to the number of inputs.

A rate determination circuit 194 determines the transmission rate, derives the total rate after the multiplexing processing operation based on the determination result of the multiplexing number determination circuit 192, and determines the number of times by which data is repeatedly recorded by taking the tolerance of the recording medium into consideration. For example, if the number of input data items is 4, the transmission rate is 1 Mbps and the recording rate is 30 Mbps, then the number of repetition times is set to 7. A repetition circuit 195 arranges data so that the input data can be repetitively recorded by the number of times equal to the number of repetition times determined by the rate determination circuit 194. An output of the repetition circuit 195 is supplied to a parity adding circuit 197. The parity adding circuit 197 adds an error correction flag to the output of the repetition circuit 195 and supplies the thus obtained data to an adder circuit 198.

A sub-code forming circuit 196 forms a sub-code indicating the contents of the multiplexing and repetition processes based on the output of the rate determination circuit 194 and outputs the same to the adder circuit 198. The adder circuit 198 multiplexes the sub-code on data to which a parity code is added and outputs the thus obtained data to a recording/modulating circuit 199. The recording/modulating circuit 199 converts the received data to a signal suitable for recording and supplies the same to a recording amplifier 200. The recording amplifier 200 amplifies and supplies recording data to a video head 201 so as to be magnetically recorded on a tape 202.

In a reproducing system 206, a video head 204 reproduces data recorded on the tape 202. A reproducing amplifier 205 amplifies a reproduced signal from the head 204 to a reproducing equalization/synchronization circuit 206, and the reproducing equalization/synchronization circuit 206 equalizes the waveform of the reproduced signal, extracts and supplies a synchronizing signal to a demodulation/TBC circuit 207. The demodulation/TBC circuit 207 effects an inverted process of the operation effected by the recording/modulating circuit 199 to demodulate the reproduced signal and supplies the same to an error correction circuit 208 and sub-code decoding circuit 212 after correcting the time base.

The error correction circuit 208 corrects the error caused in the recording/reproducing process and supplies the same to a repetition releasing circuit 209. The sub-code decoding circuit 212 decodes a sub-code contained in the reproduced signal to supply data of the repeating method and multiplexing method to the repetition releasing circuit 209, multiplexing releasing circuit 210 and correction circuit 211. The repetition releasing circuit 209 extracts only one of the reproduced data items which have been repeatedly recorded and outputs the extracted reproduced data to the multiplexing releasing circuit 210 and correction circuit 211, and the multiplexing releasing circuit 210 separates the multiplexed data items and then output the separated data to the correction circuit 211.

The correction circuit 211 is supplied with an output of the repetition releasing circuit 209 and extracts and corrects the error of the original signal by use of the other repetitive recording signal. An output of the correction circuit 211 is supplied to a signal selection circuit 213. The signal selection circuit 213 selects a signal to be displayed on a monitor 215 according to a display signal specifying input and supplies the same to a decoding circuit 214. The decoding circuit 214 decodes and supplies the input data to the monitor 215. The decoding circuit 186 and monitor 187 may also be used as the decoding circuit 214 and monitor 215, respectively.

Figures 4, 5, 6:
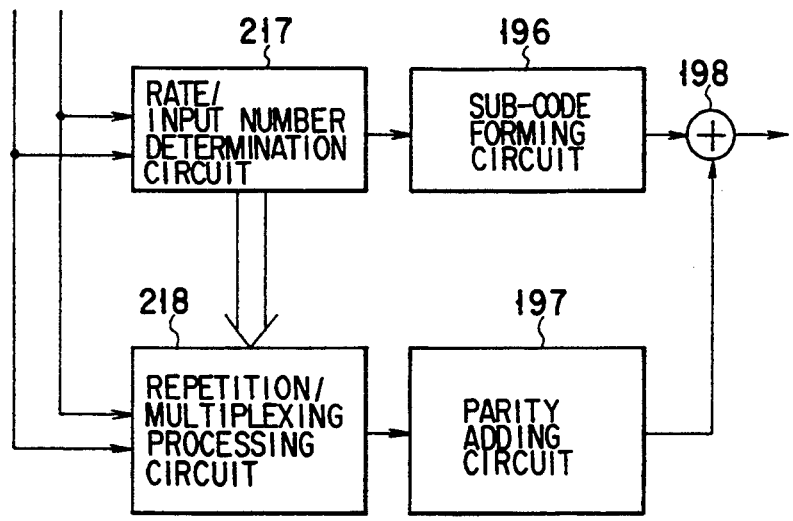
FIG. 4 is an explanatory diagram for illustrating the embodiment of FIG. 3.
FIG. 5 is a block diagram showing the modification of the embodiment of FIG. 3.
FIG. 6 is an explanatory diagram for illustrating the modification of the embodiment of FIG. 5.

Next, the operation of the embodiment with the above-described construction is explained with reference to FIG. 4. FIG. 4 is a diagram for illustrating the recording format on the tape 202.

A signal from the television camera in the remote area is transmitted to the reception circuit 185 after being subjected to the low bit rate coding process. A video image photographed by the camera 189 is subjected to the low bit rate coding process by the coding circuit 190 and output to the transmission circuit 191. In this embodiment, the reception data received in the reception circuit 185 and the transmission data transmitted from the transmission circuit 191 are recorded in a multiplexing manner in the recording system 203. That is, the outputs of the reception circuit 185 and the coding circuit 190 are supplied to the multiplexing number determination circuit 192 and multiplexing processing circuit 193.

The multiplexing number determination circuit 192 determines the number of inputs to be multiplexed and controls the multiplexing process of the multiplexing processing circuit 193. The rate determination circuit 194 determines the transmission rate and informs the repetition circuit 195 of the number of repetition times by which data is repeatedly recorded. For example, assume that data from another reception circuit (not shown) is input in addition to the outputs from the reception circuit 185 and coding circuit 190 and three data items IN1 to IN3 are input to the multiplexing processing circuit 193. In this case, the multiplexing number determination circuit 192 and rate determination circuit 194 cause the multiplexing processing circuit 193 and repetition circuit 195 to arrange the data such that the data items may be recorded in an order of IN1, IN2, IN3, IN1, IN2,—on one track as shown in FIG. 4, for example. The number of data repetition times in this case is determined by the number (3) of inputs, transmission rate and recording rate.

The sub-code forming circuit 196 forms a sub-code indicating the contents of the multiplexing and repetition processes and outputs the same to the adder circuit 198. An output of the repetition circuit 195 is supplied to the adder circuit 198 after a parity is added thereto in the parity adding circuit 197, and a sub-code is multiplexed on the recording signal in the adder circuit 198 and then output to the recording/modulating circuit 199. An output of the recording/modulating circuit 199 is amplified by the recording amplifier 200 and supplied to the tape 202 via the video head 201.

At the time of reproducing operation, a signal reproduced by the head 201 is demodulated by the reproducing amplifier 205, reproducing equalization/synchronization circuit 206 and demodulation/TBC circuit 207 and then supplied to the error correction circuit 208. The error correction circuit 208 corrects the error in the recording/reproducing operation and supplies the corrected data to the repetition releasing circuit 209 and sub-code decoding circuit 212.

The sub-code decoding circuit 212 decodes the sub-code in the reproduced signal and supplies information indicating the data repeating method and multiplexing method in the recording operation to the repetition releasing circuit 209, multiplexing releasing circuit 210 and correction circuit 211. The repetition and multiplexing of the reproduced data are cancelled by the repetition releasing circuit 209 and multiplexing releasing circuit 210 and data items IN1 to IN3 are separated and output. The correction circuit 211 detects an error from the output of the repetition releasing circuit 209 and corrects the same by taking into consideration that the possibility of an error to be left in the same position of the repetitively recorded data is extremely small.

The signal selection circuit 213 selects that signal of the output of the correction circuit 211 which is displayed on the monitor 215 according to the display signal specifying input and outputs the selected signal to the decoding circuit 214. Data decoded in the decoding circuit 214 is supplied to the monitor 215 for display.

Thus, in this embodiment, the outputs of the reception circuit 185 and coding circuit 190 are supplied to the multiplexing processing circuit 193 without being restored to the base band signal and the multiplexing processing circuit 193 determines the multiplexing process and the number of repetition times based on the number of multiplexing times and transmission rate and records the data on the tape in a multiplexing manner. Therefore, in the television conference, video images from a plurality of cameras can be simultaneously recorded by use of a single recording/reproducing apparatus.

FIG. 5 is a block diagram showing a modification of the above embodiment. In FIG. 5, the multiplexing number determination circuit 192 and rate determination circuit 194 in FIG. 3 are replaced by a rate/input number determination circuit 217 having substantially the same function of the circuits and the multiplexing processing circuit 193 and repetition circuit 195 are replaced by a repetition/multiplexing processing circuit 218 having substantially the same function of the circuits.

With the above construction, data can be repetitively recorded before multiplexing. That is, as shown in FIG. 6, data IN2 can be repeatedly recorded after data IN1 is repeatedly recorded. In FIG. 6, four or more data items are recorded in a multiplexing manner.

Figures 7A, 7B:
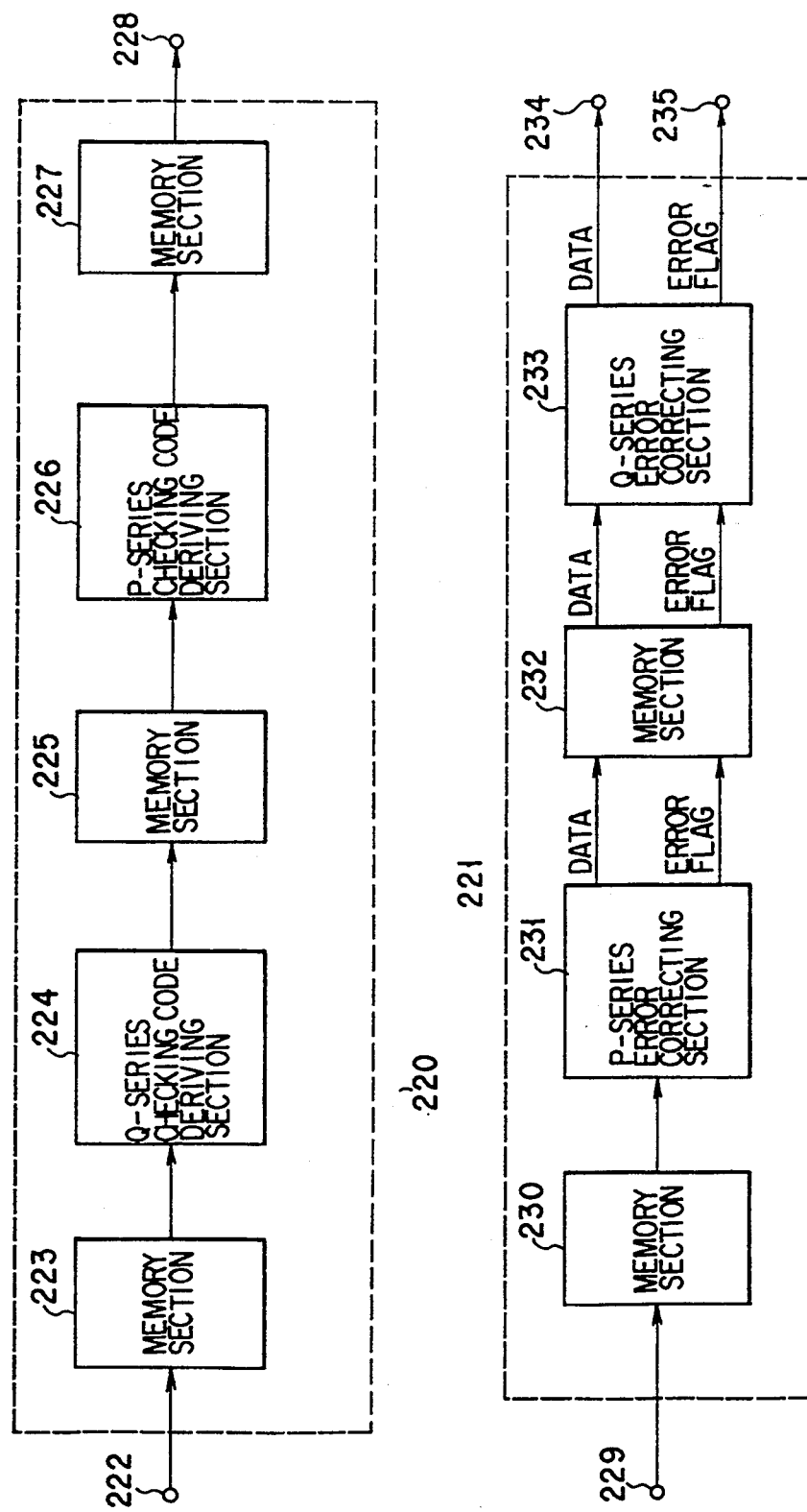
FIGS. 7A and 7B are block diagrams showing another embodiment of this invention.

FIGS. 7A and 7B are block diagrams showing an error correction circuit according to another embodiment of this invention and FIGS. 8A to 8C are diagrams for illustrating the operation of reading out data from memory sections shown in FIGS. 7A and 7B. This embodiment is applied to a case where three forms of signals for NTSC, EDTV and HDTV are recorded. In this case, the ratio of the amounts of recording data in NTSC, EDTV and HDTV is set to be 2:3:6.

This embodiment corresponds to the coding circuit 142, error correction circuit 159 and decoding circuit 161 of FIG. 1 and is constructed by a check code adding section 220 for adding an error correction check code to data at the time of recording operation and an error correction section 221 for correcting the error at the time of reproducing operation. In the check code adding section 220 which is the processing circuit in the recording system, input data from an input terminal 222 is written into a memory section 223. The memory section 223 outputs data in an order corresponding to the data series of Q series as shown in FIG. 8A. In this case, the valid input data amount varies according to the signal forms of NTSC, EDTV and HDTV, but it is not necessary to change the circuit operation even if invalid data is generated.

Data read out from the memory section 223 is supplied to a Q-series check code deriving section 224. The Q-series check code deriving section 224 derives a check code for every input Q series and supplies data and the check code to a memory section 225. The memory section 225 stores the input data and Q-series check code in an arrangement indicated by arrows in FIG. 8B. Data from the memory section 225 is read out according to the data series of P series indicated by arrows and supplied to a P-series check code deriving section 226. Also, in this case, it is not necessary to change the circuit operation even if invalid data is generated.

The P-series check code deriving section 226 derives a check code for every input series and outputs data and the check code to a memory section 227. The memory section 227 stores the input data and P-series check code in an arrangement indicated by arrows in FIG. 8C. Data is read out from the memory section 227 in an order corresponding to the order of series set at the time of recording operation.

An input terminal 229 of the error correction section 221 which is a processing circuit of the reproducing system is supplied with reproduced data. The reproduced data is written into a memory section 230, and data and a check code are read out from the memory section 230 according to the data series of P series and input to a P-series error correction section 231.

The P-series error correction section 231 detects and corrects the error for every input correction series. The P-series error correction section 231 adds an error flag to uncorrected data and check code and writes them into a preset address of a memory section 232. Data, check code and error flag read out from the memory section 232 according to the data series of Q series are output to a Q-series error correction section 233.

The Q-series error correction section 233 effects the correcting operation for every correcting series by use of the input data, check code and error flag, outputs data from an output terminal 234 and outputs the error flag from an output terminal 235. Like a case of the recording operation, it is not necessary to change the circuit operation irrespective of the recording data amount also in the error correcting operation.

Figure 28:
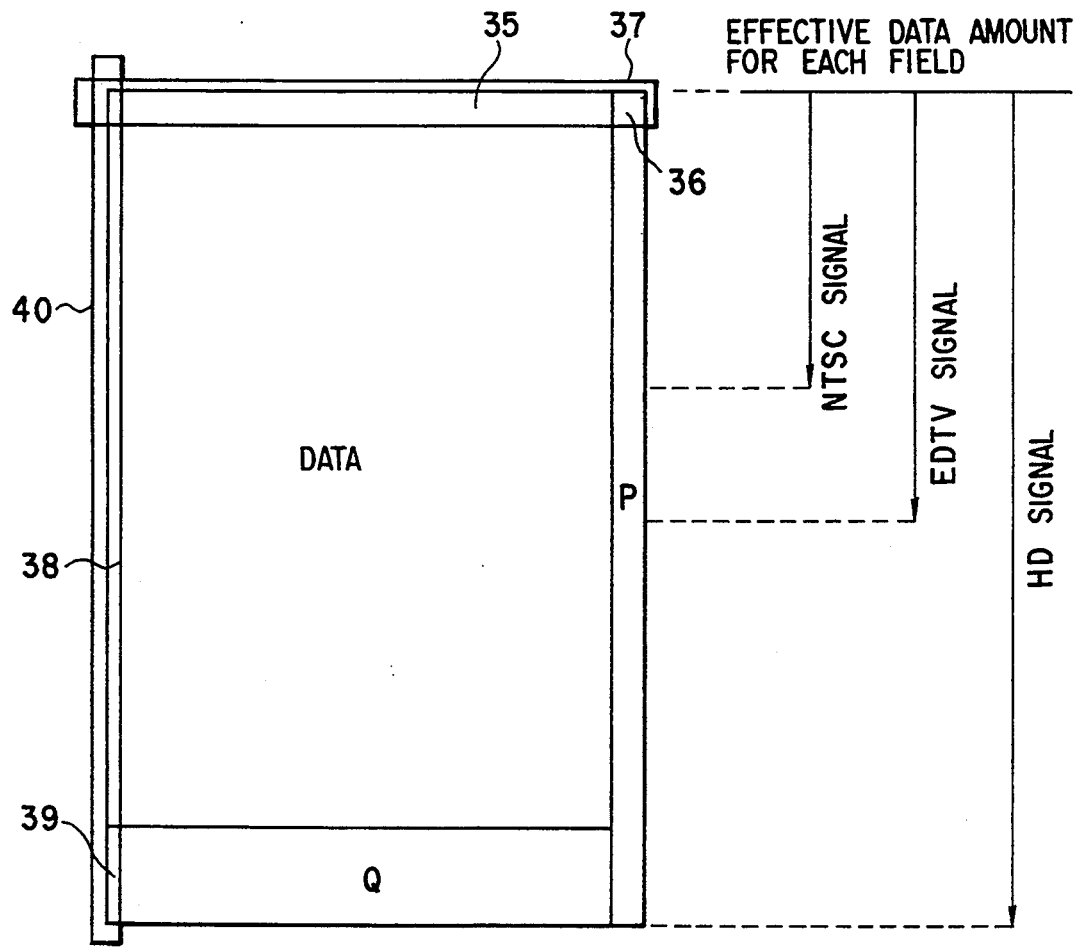
FIG. 28 is an explanatory diagram for illustrating another conventional case.

Next, the operation of the above embodiment with the above construction is explained with reference to FIGS. 28 and 29A to 29D. FIG. 28 shows the structure of an error correction code for data to be recorded. When the data amount at the time of HD recording operation in which the amount of recording data is largest is set to 1, the data mounts in NTSC and EDTV are respectively set to $\frac{1}{3}$ and $\frac{1}{2}$. Since the least common multiple of the reciprocals of the data amounts is 6, the code structure is made such that data of one track at the time of HD recording operation may be constructed by six error correction product code series of the same structure.

Coded data is input to the input terminal 222 of the check code adding section 220. The input data is written into the memory section 223 and read out therefrom according to the data series of Q series indicated by arrows shown in FIG. 8A. In this case, the valid input data amount varies according to the signal forms of NTSC, EDTV and HD, but it is not necessary to change the circuit operation even if invalid data is generated.

Data read out from the memory section 223 is supplied to the Q-series check code deriving section 224 and a check code is added thereto. The Q-series check code deriving section 224 derives a check code for every input series, and as shown in FIG. 8B, data series 1 to 6 have check codes of Q1 to Q6 added thereto. The data is written into the memory section 225 in an arrangement shown in FIG. 8B. Data is read out from the memory 225 according to the data series of P series and supplied to the P-series check code deriving section 226. Also, in this case, it is not necessary to change the circuit operation even if invalid data is generated.

The P-series check code deriving section 226 derives a check code for every input series, and as shown in FIG. 8C, check codes P1 to P6 are added to respective code blocks RS1 to RS6 and then output to the memory section 227. The memory section 227 stores the data and P-series check codes in an arrangement shown in FIG. 8C and data is read out therefrom in an order corresponding to the order of the series set at the time of recording operation is output from the output terminal 228.

Figure 29A:
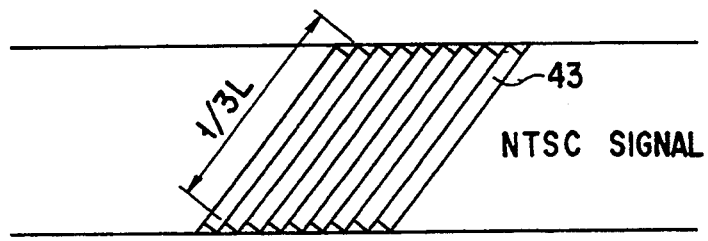
FIGS. 29A to 29D are explanatory diagrams for illustrating another conventional case.
Figure 29B:
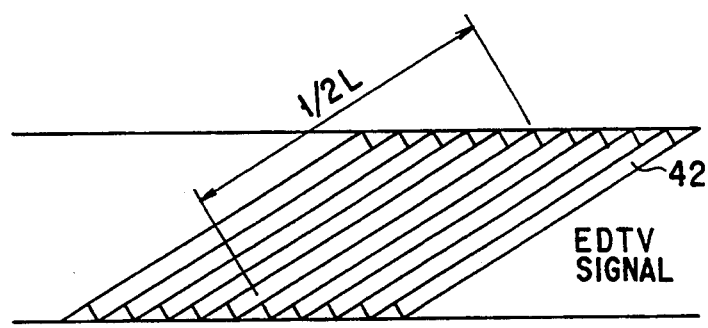
Figure 29C:
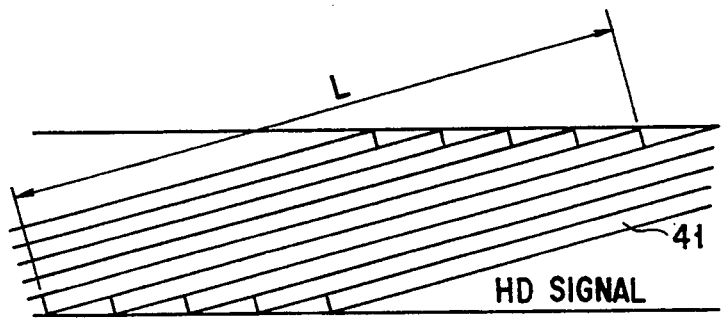
Figure 29D:
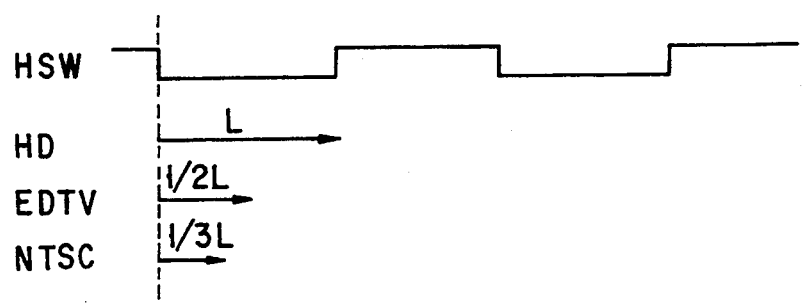
Figures 30, 32:
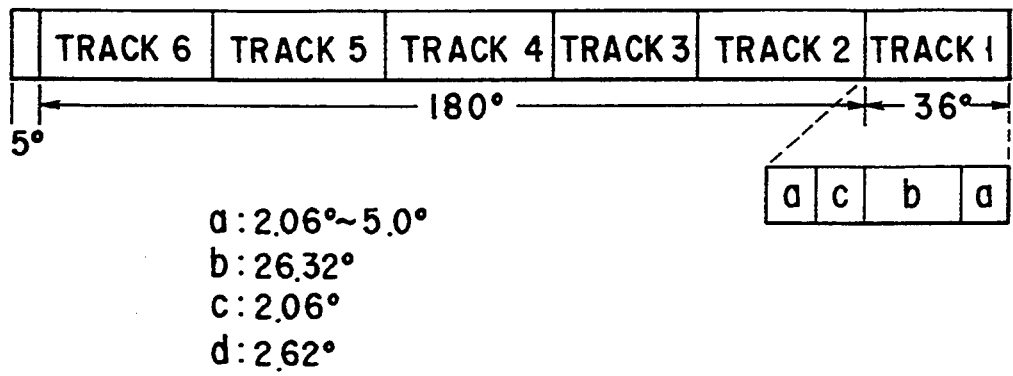
FIG. 30 is an explanatory diagram for illustrating another conventional case.
FIG. 32 is an explanatory diagram for illustrating another conventional case.
Figure 31:
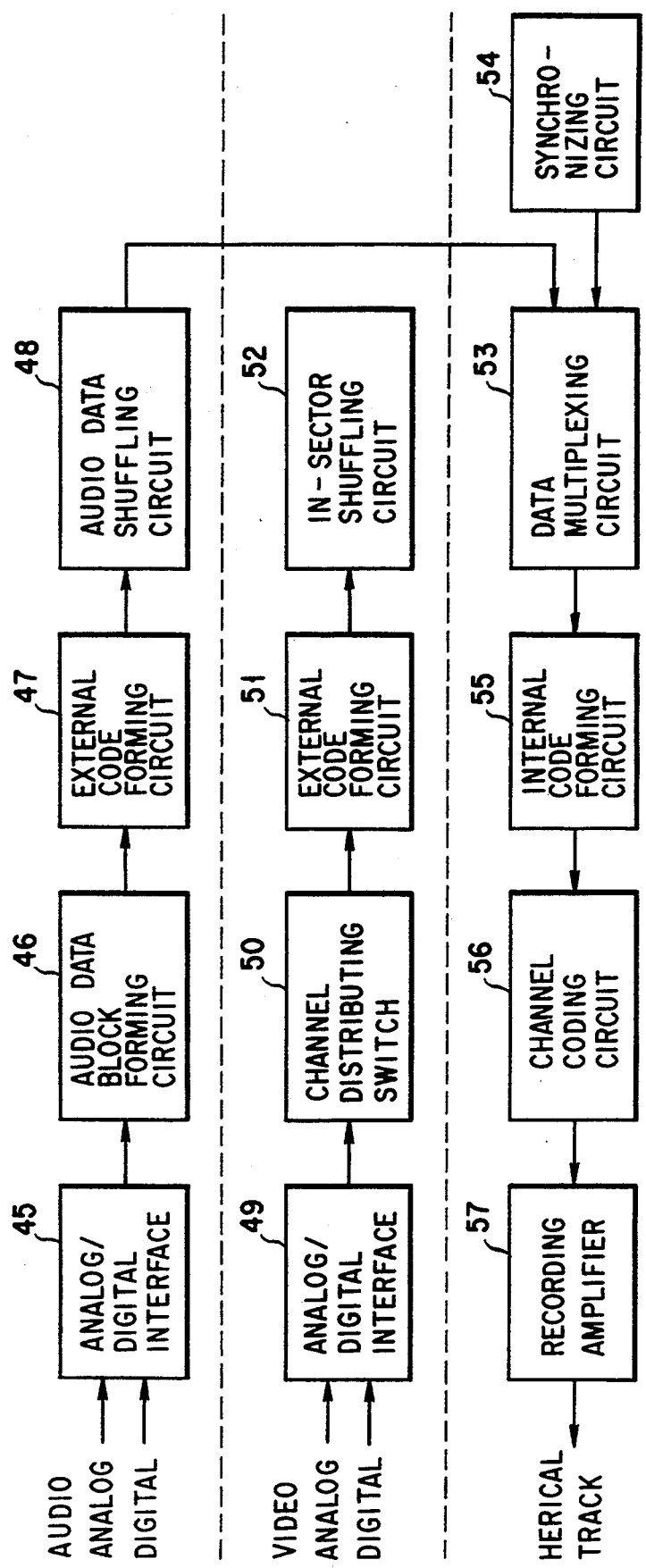
FIG. 31 is a block diagram showing another conventional case.
Figures 33A, 33B:
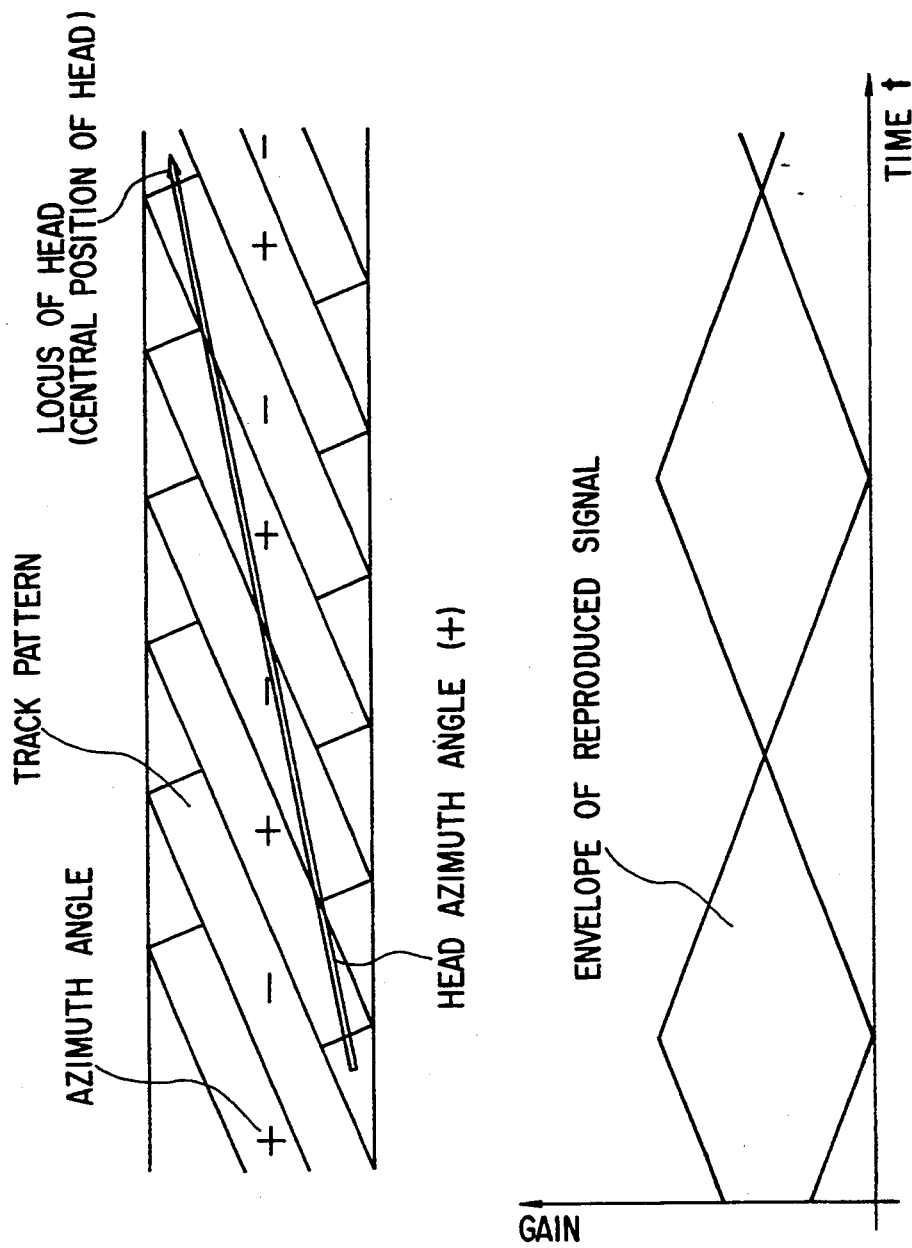
FIGS. 33A and 33B are explanatory diagrams for illustrating another conventional case.
Figure 34:
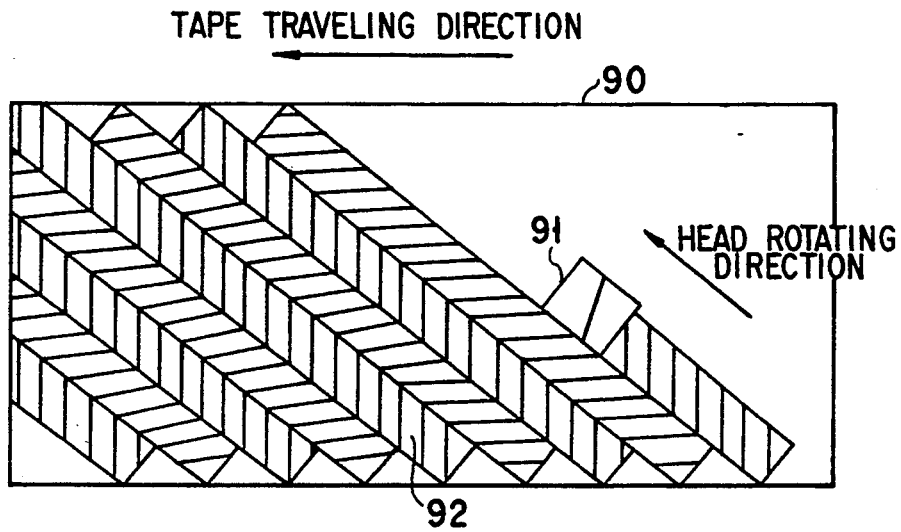
FIG. 34 is an explanatory diagram for illustrating the tracking control.
Figure 35:
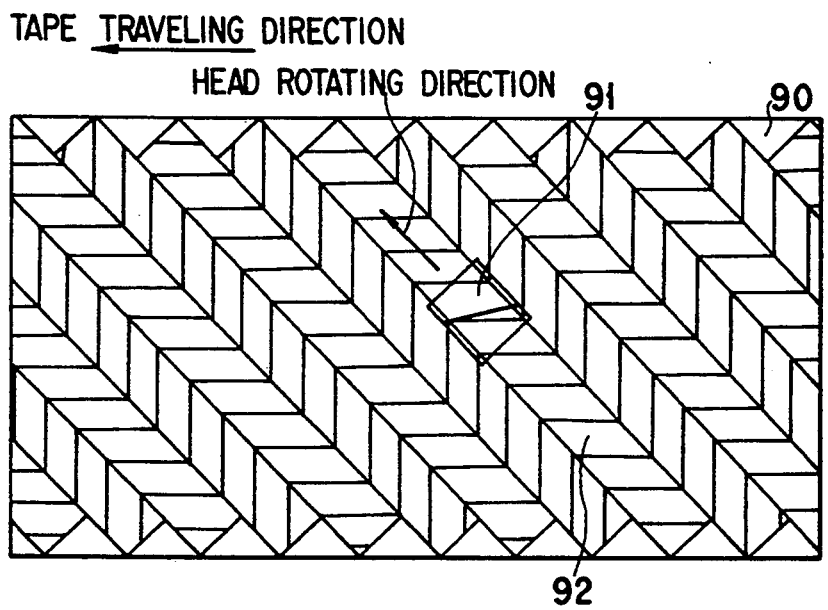
FIG. 35 is an explanatory diagram for illustrating the tracking control.
Figures 36A, 36B, 36C, 36D:
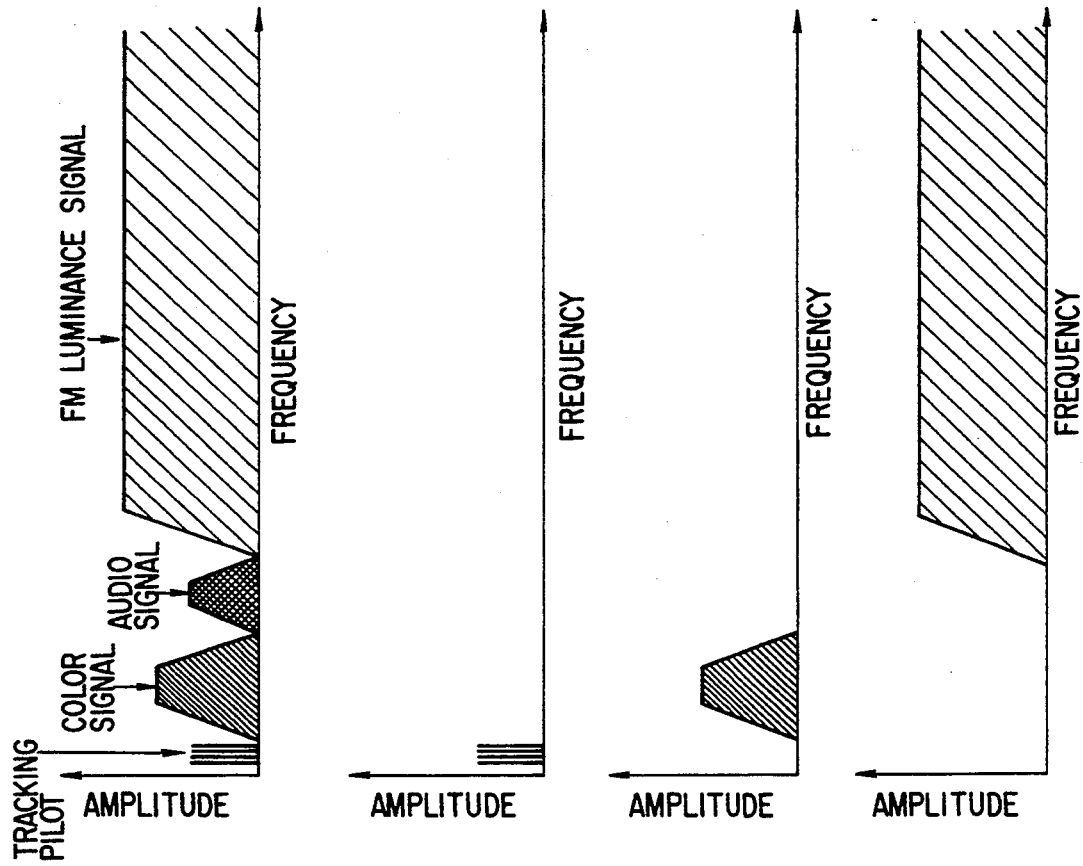
FIGS. 36A to 36D are explanatory diagrams for illustrating a method of multiplexing a pilot signal.
Figure 37:
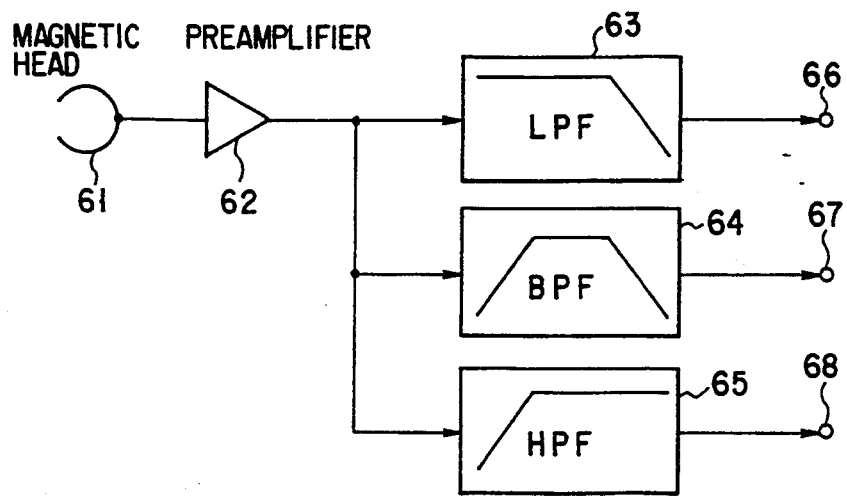
FIG. 37 is a block diagram showing another conventional case.

Thus, in the recording operation, the same circuit operation may be effected irrespective of the recording data amount. This is because time for the head to scan the track from the starting point of a track to the starting point of a next track is constant irrespective of the recording data amount. For example, as shown in FIG. 29A, when the track length is $\frac{1}{3}$ of the track length in the maximum length mode, the valid data amount becomes $\frac{1}{3}$ of the maximum data amount and the product code blocks RS1 and RS2 shown in FIG. 8C are recorded. The two product code blocks RS1 and RS2 are completed and the error correction can be effected by use of these product codes. In a period of time in which an invalid data section after the product code block RS3 is supplied to the output terminal 228, the head is kept apart from the tape and it is not necessary to inhibit the data output (refer to FIG. 29D).

At the time of reproducing operation, the reproduced data is input to the error correction section 221 via the input terminal 229. The reproduced data is written into the memory section 230 and the data and check code are read out therefrom according to the data series of P series and supplied to the P-series error correction section 231. The P-series error correction section 231 detects and corrects the error for every input correction series. An error flag is added to the data and check code whose error is only detected and is not corrected and the data and the like are written into a preset address of the memory section 232.

Next, data, check code and error flag are read out from the memory section 232 according to the data series of Q series and supplied to the Q-series error correction section 233. The Q-series error correction section 233 effects the error correction for each correction series by use of the input data, check code and error flag, outputs data from the output terminal 234 and outputs the error flag from the output terminal 235. Like a case of the recording operation, the same circuit operation can be effected irrespective of the recording data amount in the error correction operation. This is because the result of error correction operation in the invalid data section will not influence the valid data.

Thus, in this embodiment, the Q-series and P-series check codes are constructed for each product code block by determining the number of product code blocks to be recorded on one track based on the recording data amount and then controlling the write-in and readout operations of the memory sections 223, 224 and 227. Therefore, the data recording is completed irrespective of the amount of data to be recorded and the error correction can be effected with high reliability.

In this embodiment, a case wherein three signals having the recording data amounts set in the ratio of 1:½:⅓ are recorded and reproduced is explained, but it is clearly understood that the product code blocks of a number corresponding to the common multiple of reciprocals of the data amounts may be formed on one track even when the number of modes of the recording amount is increased. The correction ability for the burst error is enhanced by increasing the size of the product code block. Therefore, it is extremely effective to try to set the common multiple as small as possible when the recording mode is set because the correction ability for the burst error can be enhanced.

FIGS. 9A and 9B are block diagrams showing another embodiment of this invention. FIG. 9A shows the coding side and FIG. 9B shows the decoding side. This embodiment is suitable for a case wherein video and audio signals are recorded on the same track.

A video signal is compressed by a coding circuit (not shown), a parity code is added to the video signal and the video and audio signals are input to an input terminal 241 shown in FIG. 9A. The input signal is written into a memory 242. The memory 242 outputs data to a Q-series coding circuit 243 in an order based on an external parity (Q code) having a series in the vertical direction. The Q-series coding circuit 243 derives a Q code, adds the Q code to data and outputs the data to the memory 244 and a terminal b of a switch 246.

In this embodiment, a memory 244 outputs data to an R-series coding circuit 245 in an order based on an external parity (R code) having a series in the vertical direction. The R-series coding circuit 245 derives an R code of vertical direction series containing the Q-series code, adds the R code to data and outputs the data to a terminal a of the switch 246. The switch 246 is controlled by a control signal, and selects the terminal a only when an editing gap portion set between data items of respective channels is used as a parity and selects the terminal b in the other case.

Data from the switch 246 is supplied to a memory 247, and the memory 247 outputs data to a P-series coding circuit 248 in an order based on an internal code parity (P code) having a series in a horizontal direction. The P-series coding circuit 248 derives a P-series code, adds the code to data and outputs the data via a memory 249.

On the decoding side shown in FIG. 9B, data supplied via a memory 251 is input to a P-series decoding circuit 252. The P-series decoding circuit 252 decodes the P-series code, effects the error correction, and supplies data to an R-series decoding circuit 254 via a memory 253 and to the terminal b of the switch 256.

The R-series decoding circuit 254 decodes the R-series code, effects the error correction, and supplies data to the terminal a of the switch 256. The switch 256 selects the terminal a when an editing gap on the reproducing track is used as a parity and selects the terminal b in the other case.

Data from the switch 256 is supplied to a Q-series decoding circuit 258 via a memory 257. The Q-series decoding circuit 258 decodes Q-series code from the input data, effects the error correction and outputs data via a memory 259.

Next, the operation of the embodiment with the above construction is explained with reference to FIGS. 10 and 11.

A case wherein one track is divided into a plurality of blocks and the code structure of each block is made for two audio channels is explained. Assume that one frame is constructed by four tracks, one track is divided into 17 blocks and the code structure of each block is shown in FIG. 10. In FIG. 10, C1 indicates a parity of an internal code having a series in the horizontal direction and C2 indicates a parity of an external code having a series in the vertical direction.

Figure 10:
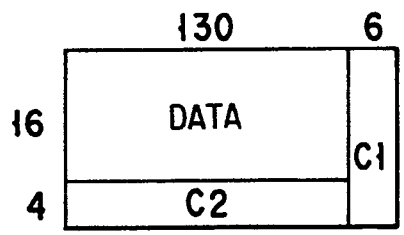
FIG. 10 is an explanatory diagram for illustrating the embodiment of FIGS. 9A and 9B.

With the above code structure, the audio data section is $130 \times 16 = 2080$ bytes as shown in FIG. 10. If the audio data section is constructed by two channels, the audio sampling frequency is 48 KHz and quantization is effected by use of 20 bits, then the number of bytes of audio data recorded on one track is $48000 \times 20 \times 2 \div 30 \div 4 \div 8 = 2000$ bytes/track. That is, in the code structure shown in FIG. 10, 2-channel data can be recorded in the audio data section. Further, in the code structure, 3-symbol correction can be effected in the C1 series and 4-loss correction can be effected in the C2 series. That is, if the symbol error rate before correction is $1/10^3$, the correction probability after correction is approx. 1/10 21 and thus a sufficiently high correction ability is attained.

Figure 11:
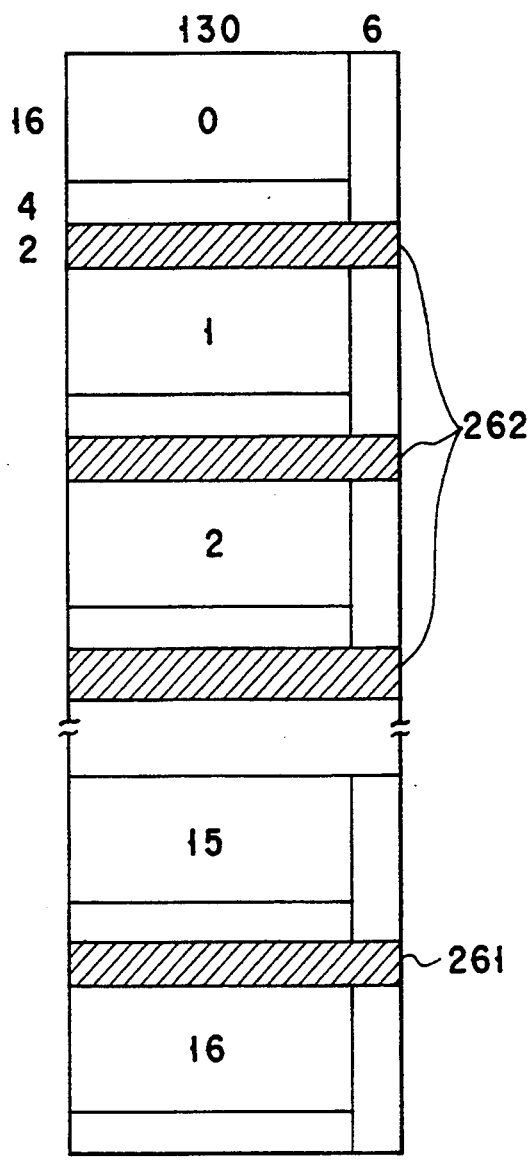
FIG. 11 is an explanatory diagram for illustrating the embodiment of FIGS. 9A and 9B.

FIG. 11 shows the whole construction of the track. In FIG. 11, hatched portions indicate editing gaps and the length of the gap corresponds to the length of two horizontal series. Numerals in the blocks indicate the block numbers and the editing gaps are indicated by hatched portions. Assume now that the block 16 is used as an audio block, an editing gap 261 between the blocks 15 and 16 is used as an editing gap as it is by adequately setting the switching position of the switch 246, and the other editing gaps 262 are used as parities. Therefore, one track is constructed by one audio block and a video block which is constructed by 16 audio blocks.

The data amount in the video section is $16 \times 130 \times 16 = 33280$ bytes. In a case where a component signal (4:2:2) formed of the luminance signal Y and color signals Cr and Cb is sampled at a sampling frequency 4 fsc (fsc is a color sub-carrier frequency) and the sampled signal is quantized by 8 bits, the data amount for each track is $768 \times 488 \times 2 \div 4 = 187392$ bytes/track. Therefore, video data obtained by compressing the component signal by 1/5.5 (2.84 bits/pixel) can be recorded in the video section.

Further, an editing gap 262 of ($2 \times 15 \times 136$ bytes) area which can be used as a parity is additionally provided in the video block and a third series of RS(32, 3) series can be added to ($20 \times 16 \times 136$ bytes) of the video data section and C1, C2 parity sections. The 3-loss correction can be effected by adding the code word and the burst correction ability of Ci series $\times 30$ (4080 bytes) can be attained.

Next, assume that audio data is recorded on the multi-track. All of the editing gaps are used as editing gaps as they are. Thus, a 17-track audio track can be formed. In this case, each block has the same code structure and has a sufficiently high correction ability as described before.

Assume that the compression factor of the compressed image recorded in the video section is 1/13.3 (1.2 bits/pixel). In FIG. 11, blocks 0 to 6 construct one video block, a block 7 constructs an audio block, blocks 8 to 14 construct another video block and a block 15 constructs another audio block.

In this case, the recording capacity of video data in one video block for each track is $16 \times 7 \times 130 = 14560$ bytes/track. When the compression factor is approx. 1/13.3 (1.2 bits/pixel), the data amount for each track is $187392 \div 13.3 = 14090$ bytes/track. $2 \times 6 \times 136$ bytes are provided in the video block as an area which can be used as a parity and a third series of RS(32, 3) series can be added to 20×16×136 bytes of the video data section and C1, C2 parity sections. The 3-loss correction can be effected by adding the code word and the burst correction ability of Ci series × 12 (1632 bytes) can be attained.

The same burst correction ability can be attained for the other video data. 2-channel audio data can be recorded for each video data and additional 2-channel audio data can be further recorded.

As described above, in this embodiment, the burst correction ability can be significantly enhanced by forming the common formats for the video and audio data, recording the video and audio data on the multi-track and using an editing gap between blocks of the multi-track as a parity. Further, since the format on the tape is kept unchanged irrespective of an input signal, information such as ID and sub-code may be reproduced in the searching operation or the like in the same manner as in a case wherein the same signal forms are recorded even if different formats such as video and audio data are recorded.

Figure 13:
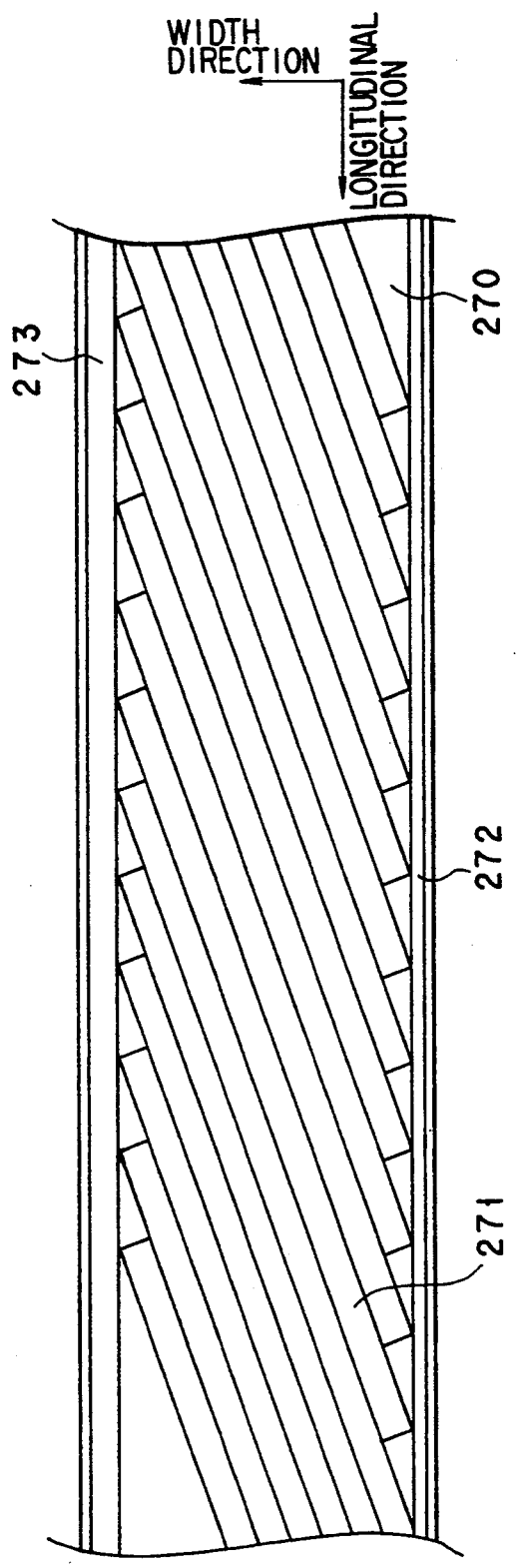
FIG. 13 is an explanatory diagram for illustrating the embodiment of FIG. 12.

FIG. 12 is a block diagram showing another embodiment of this invention and FIG. 13 is a diagram showing a recording format used in this embodiment. This embodiment makes it possible to attain the high-speed searching operation in the digital recording operation.

In this embodiment, as shown in FIG. 13, a control track 273 which is a linear track is formed on a tape 270 in addition to video signal tracks 271 on which data can be recorded by use of a rotating head and an audio signal track 272 on which data is recorded by use of a fixed head. Like the VISS (VHS:index search system), VASS (VHS:address search system) and the like which are used in the prior art, an index signal is recorded on the control track 273.

In FIG. 12, recording information such as the tape position, time and title is input to an input terminal of a recording system 274. The recording information is supplied to an index signal generator 276. The index signal generator 276 creates an index signal with a bandwidth of fs based on the recording information and outputs the index signal to a modulator 277, 1/10 frequency divider 278, 1/100 frequency divider 279 and 1/1000 frequency divider 280. The 1/10 frequency divider 278, 1/100 frequency divider 279 and 1/1000 frequency divider 280 divide the frequency of the index signal by 10, 100 and 1000 and supplies the frequency-divided signals to modulators 281, 282 and 283.

Oscillators 284 to 287 respectively generate signals having frequencies of fc, fc/10, fc/100 and fc/1000 and output the signals as carriers to the modulators 277 and 281 to 283, respectively. The modulators 277 and 281 to 283 modulate the index signal and the frequency-divided signals thereof according to the carriers supplied from the oscillators 284 to 287 and supply the modulated outputs to a mixer 288. The mixer 288 mixes the outputs from the modulators 277, 281, 282 and 283 to form an index signal having four frequency components and outputs the index signal to a recording amplifier 289. The recording amplifier 289 amplifies and supplies the input signal to a head 291 via a switch 290 so as to record the signal on the control track 273 of the tape 270.

In a reproducing system 292, an index signal reproduced from the control track 273 by the head 291 is supplied to a reproducing amplifier 293 via the switch 290. The reproducing amplifier 293 amplifies the reproduced signal and then outputs the amplified signal to a band pass filter (BPF) 294. The reproduced signal contains four spectrum components, that is, modulated signals of the index signal having carriers of fc/1000, fc/100, fc/10 and fc and the BPF 294 permits the signal of the frequency band containing frequencies near the frequency fc to be passed therethrough and supplied to a demodulator 295. The reproducing amplifier 293 is designed to compensate for the characteristic of the BPF 294. A signal passing through the BPF 294 is only a modulation signal having a carrier of fc.

The demodulator 295 reproduces an original index signal from the input modulation signal and supplies the same to an HPF 296. In order to remove fluctuation components caused by nonuniformity of tape speed or the like, the HPF 296 permits only components of frequencies higher than a preset frequency to be passed therethrough and supplies the components to an index decoder 297. The index decoder 297 decodes the index signal, restores the recording information to obtain information such as the tape position, time, title and the like.

Next, the operation of the embodiment with the above construction is explained with reference to FIGS. 14 and 15. FIG. 14 is a graph showing the bandwidth of an index signal, and the abscissa indicates a frequency and the ordinate indicates a gain, and FIG. 15 shows the frequency locations of a recording signal, and the abscissa indicates a frequency and the ordinate indicates a gain.

The index generator 276 creates an index signal based on recording information input via the input terminal 275. The bandwidth of the index signal is fs as shown in FIG. 14. The frequency-dividers 278, 279 and 280 divide the frequency of the index signal by 10, 100 and 1000 and supplies the frequency-divided signals to the modulators 281, 282 and 283. The index signal is also input to the modulator 277 and the modulators 277 and 281 to 283 are supplied with index signals with the bandwidths of fc, fc/10, fc/100 and fc/1000, respectively.

The modulators 277 and 281 to 283 are respectively supplied with carriers from the oscillators 284 to 287 and modulate the carriers by the index signals of respective bandwidths. The modulation signals from the modulators 277 and 281 to 283 are mixed in the mixer 288, amplified by the recording amplifier 289 and supplied to the head 291 via the switch 290. The head 291 records the signal on the control track 273 (FIG. 13) on the tape 270. As shown in FIG. 15, four spectrum components 301, 302, 303 and 304 are recorded on the control track 273.

Assume now that a normal reproducing operation is effected. In this case, a recording signal reproduced from the control track 23 by the head 291 is supplied to the reproducing amplifier 293 via the switch 290, amplified and output to the BPF 294. The BPF 294 has a pass band characteristic as shown by broken lines in FIG. 15. That is, only the spectrum component 304 among the four spectrum components 301 to 304 of the reproduced signal is permitted to pass through the BPF 294 and is supplied to the demodulator 295. The demodulator 295 demodulates the component 304 to reproduce the index signal. The index signal is supplied to the index decoder 297 after the fluctuation component thereof caused by nonuniformity of tape speed is removed in the HPF 296, and is restored to the recording information. Thus, information such as the tape position, time, title and the like is output from the output terminal 298.

Next, assume that the searching operation of 10-times speed is effected. In this case, since the tape speed is increased to ten times that in the recording operation, the relative speed between the tape 270 and the head 291 is also increased by ten times and the bandwidth of signals to be reproduced is also increased by ten times. The carrier of each of the spectrum components of the recording signal is increased by ten times and the signal bandwidth thereof is also increased by ten times. That is, as shown in FIG. 15, the spectrum component 303 is shifted to the frequency band of the spectrum component 304 and the signal bandwidth thereof is increased by ten times and becomes fs. As a result, the spectrum component 303 is permitted to pass through the BPF 294. At the same time, the spectrum component 304 is shifted to a frequency band outside the pass band of the BPF 294. Since the spectrum component 303 which is permitted to pass through the BPF 294 has the same signal bandwidth as that of a component obtained in the normal reproducing operation, the succeeding process is effected in the same manner as in the normal reproducing operation.

In the searching operation of 100-times or 1000-times speed, spectrum component 302 or 301 is permitted to pass through the BPF 294. Also, in this case, the bandwidth of the signal which is permitted to pass through the BPF 294 is fs and is the same as that of a component obtained in the normal reproducing operation, and the index signal can be easily reproduced in the demodulator 295.

If an interval between the carriers is set to be sufficiently larger than the bandwidth of the index signal and the bandwidth of the BPF 294 is set wider, the index signal may be reproduced even when the searching speed is continuously increased.

Thus, in this embodiment, the index signal can be reproduced even in the ultrahigh-speed searching operation by narrowing the bandwidth of the index signal by means of the frequency-dividers 278 to 280, modulating and recording the index signal by use of a plurality of carriers having different frequencies and selectively supplying one spectrum component corresponding to the reproducing speed to the demodulator 295 by means of the BPF 294 which permits a preset band to pass in the reproducing operation.

In VISS and VASS, it is assumed to effect the searching operation up to approx. 100 to 200-times speed, and for this purpose, a signal processing system having an extremely wide bandwidth is provided. In contrast, in this embodiment, even when the ultrahigh-speed searching operation mode of 1000 to 10000-times speed is set, the index signal can be reproduced by adequately setting the characteristic of the BPF of the reproducing circuit. Further, the noise bandwidth can be limited and the SN ratio can be improved by setting the bandwidth of the BPF narrower than the increased speed range of the searching speed. In this embodiment, it is not necessary to change the rotation speed of the drum and detect the state in which data can be reproduced, and the circuit and time required for effecting these operations can be omitted.

Figure 16:
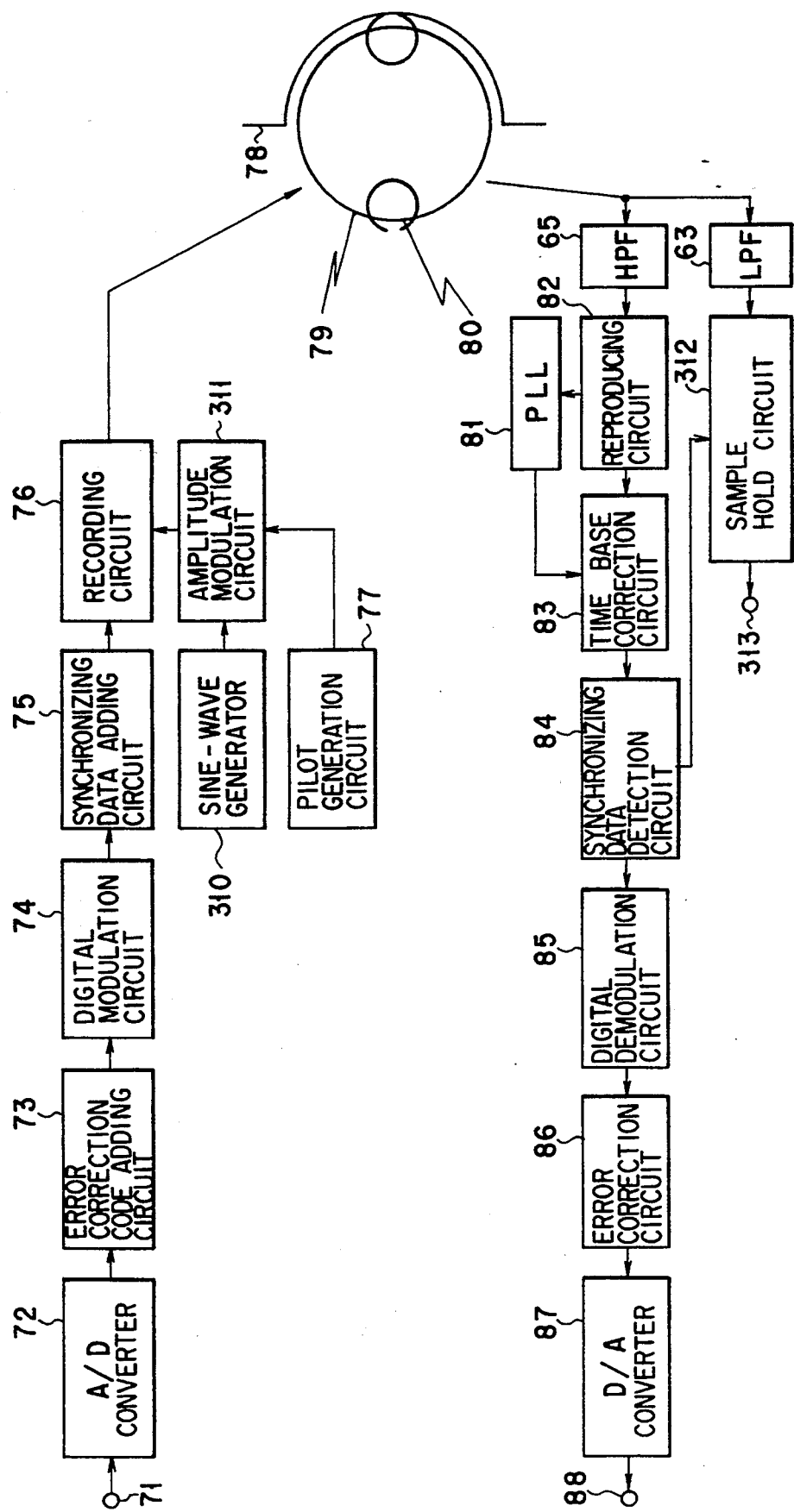
FIG. 16 is a block diagram showing another embodiment of this invention.
Figure 38:
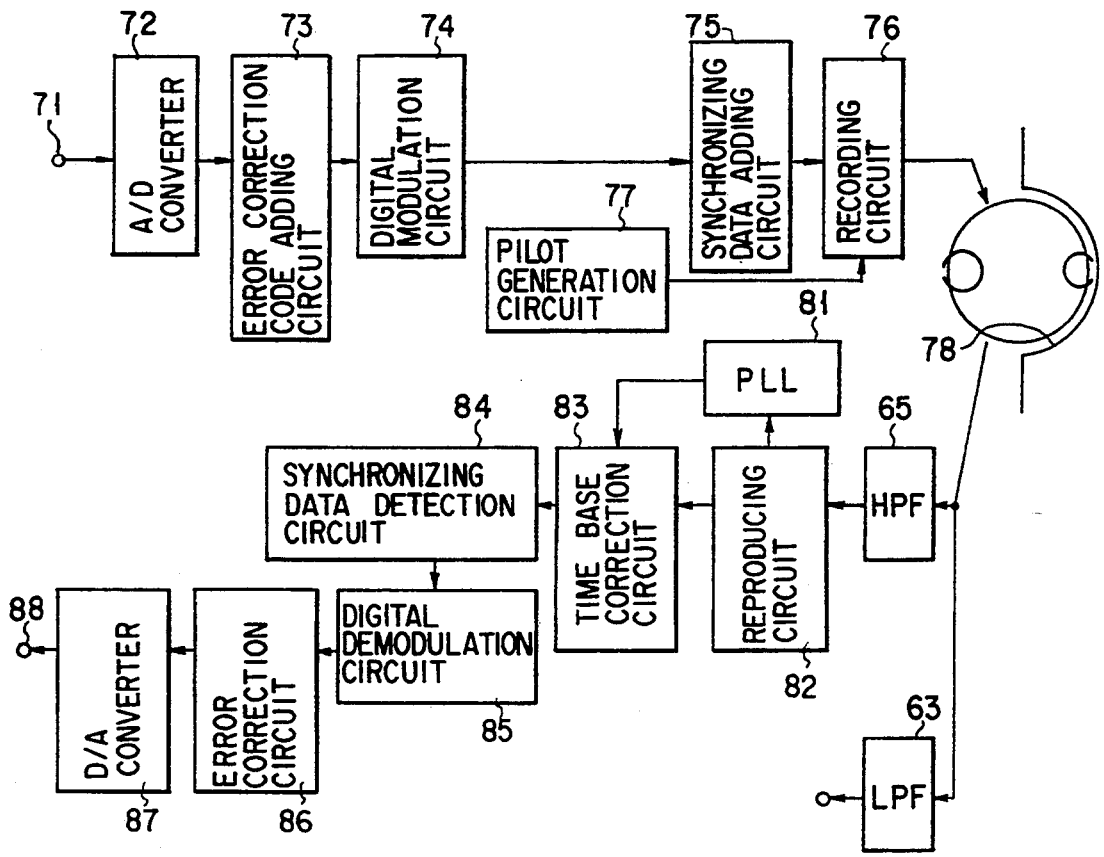
FIG. 38 is a block diagram showing another conventional case.
Figure 39A:
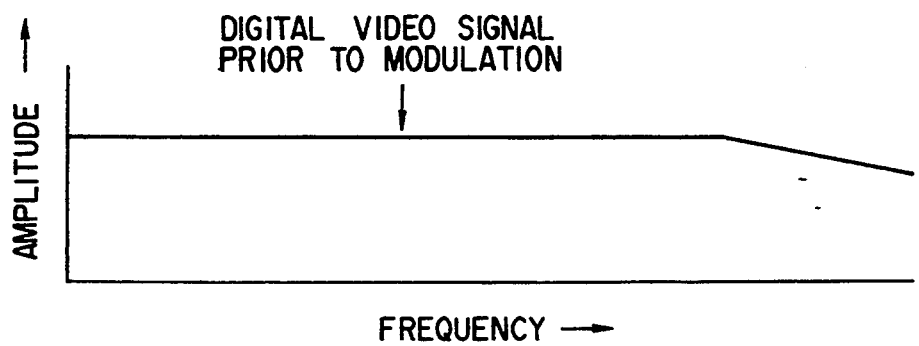
FIGS. 39A and 39B are explanatory diagrams for illustrating another conventional case.
Figure 39B:
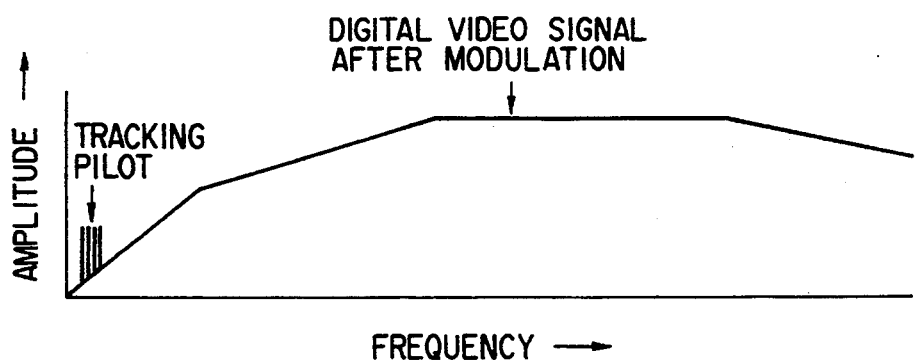
Figure 40:
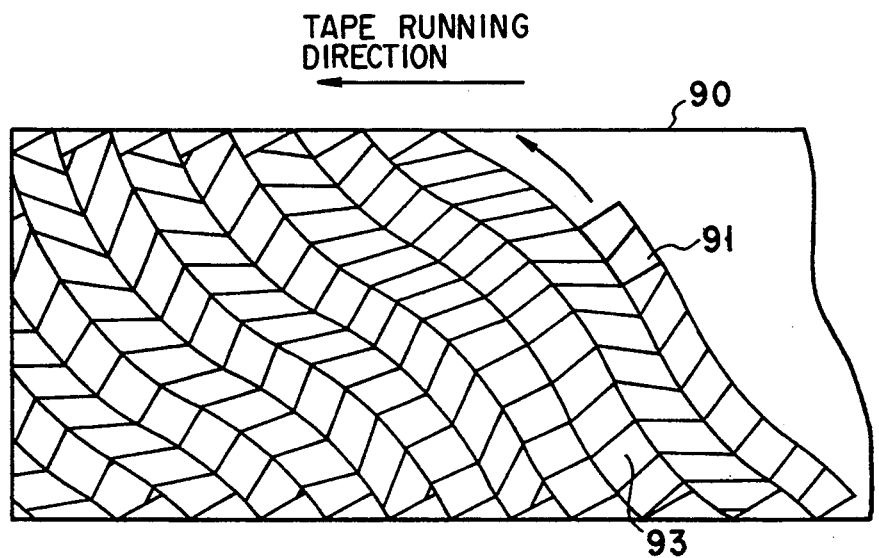
FIG. 40 is an explanatory diagram for illustrating the bend of a track.
Figure 41:
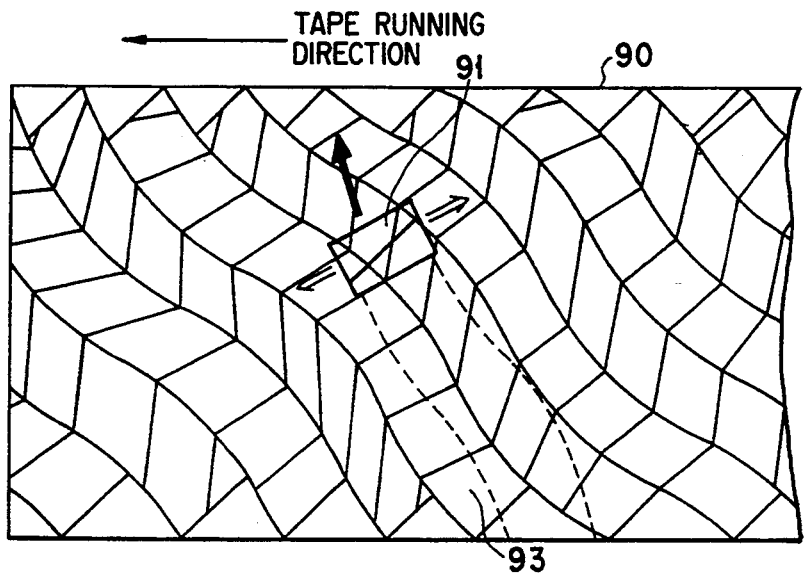
FIG. 41 is an explanatory diagram for illustrating the bend of a track.

FIG. 16 is a block diagram showing another embodiment of this invention. In FIG. 16, portions which are the same as those of FIG. 38 are denoted by the same reference numerals. This embodiment is intended to make it possible to correctly detect the synchronizing data and a case wherein this embodiment is applied to the digital VTR of the helical scanning system is explained.

In FIG. 16, a video signal input via an input terminal 71 is supplied to an A/D converter 72. The A/D converter 72 converts the input video signal to a digital signal and outputs the same to an error correction circuit 73. The error correction circuit 73 adds a parity code for detecting a recording data error caused in the reproducing operation. As the parity code, a Reed-Solomon code having extremely high correction ability is used, for example. The recording data having the parity added thereto is input to a digital modulation circuit 74. The digital modulation circuit 74 effects the rearranging process in which the D.C. component is set to 0. For example, in the 8-10 modulation system used in DAT, 8-bit input data is selectively assigned so as to control the D.C. component for each block unit and set the total sum of the D.C. components in a limited period of time to 0. The 8-10 modulation system is also used in this embodiment.

The recording data subjected to the digital modulation is input to a synchronizing data adding circuit 75. The synchronizing data adding circuit 75 adds synchronizing data to the recording data in a preset period. As the synchronizing data, a pattern which can be distinguished from the main signal data at the time of detection is selected and the synchronizing data adding circuit 75 inserts the synchronizing data into the modulated data at a timing of a synchronizing data inserting signal from a timing generation circuit (not shown). A sine-wave generation circuit 310 generates a sine-wave which crosses the 0 point in an insertion period of the synchronizing data, for example, a sine-wave of a period twice the synchronizing data insertion period. The sine-wave is input to an amplitude modulation circuit 311. A pilot signal generation circuit 77 supplies a tracking pilot signal to the amplitude modulation circuit 311. The tracking pilot signal is selected to have a low frequency in which the azimuth loss effect is small since the reproduced pilot signals of adjacent tracks are compared to adjust the tracking in the reproducing operation. Like a case of the 8-mm VTR system, in this embodiment, a 4-frequency pilot system in which pilot signals of four different frequencies are selectively recorded is used.

The amplitude modulation circuit 311 AM-modulates the input pilot signal by the sine-wave and outputs the modulated signal to a recording circuit 76. The recording circuit 76 adds a pilot signal which is AM-modulated by the sine-wave to the recording data having synchronizing data inserted therein in such a phase that the amplitude in the position of the synchronizing data will be set to 0. Further, the recording circuit 76 sets the added data to a preset recording level and supplies the data to a magnetic head 80 on a rotating drum 79 via a rotary transformer (not shown) so as to record the data on a tape 78.

At the time of reproducing operation, a signal recorded on the tape 78 is reproduced by the magnetic head 80. The reproduced signal is supplied to a preamplifier (not shown) via a rotary transformer (not shown) and amplified and then supplied the HPF 65 and LPF 63. The HPF 65 removes an unnecessary low-frequency component of a frequency band outside the recording signal frequency band of the reproduced signal and outputs the thus processed reproduced signal to a reproducing circuit 82. The reproducing circuit 82 reproduces the signal as a digital signal after correcting the frequency characteristic set at the time of recording/reproducing operation of the electromagnetic conversion system and then outputs the digital signal to a PLL 81 and time base correction circuit 83.

The PLL circuit 81 reproduces a clock based on the reproduced data and supplies the same to the time base correction circuit 83. The time base correction circuit 83 is supplied with the clock containing the time base variation component of the reproduced data from the PLL circuit 81, writes the reproduced data into a memory (not shown) in synchronism with the clock, reads out the data by use of a stable clock, thus removing the time base variation component caused at the time of recording/reproducing operation, and then outputs the data to a synchronizing data detection circuit 84.

The synchronizing data detection circuit 84 compares the reproduced data with the synchronizing pattern used at the time of recording operation and detects the same pattern or a pattern which is considered to be within a preset tolerance by taking the error caused at the time of recording operation into consideration and determines the pattern as the synchronizing section.

The synchronizing data detection circuit 84 extracts the main signal data according to the detected synchronizing data and outputs the data to a digital demodulation circuit 85. The digital demodulation circuit 85 effects an inverted process of the modulating operation effected at the time of recording operation so as to convert 10-bit data to 8-bit data and outputs the thus converted data to an error correction circuit 86. The error correction circuit 86 detects and corrects the error of data by use of the parity added at the time of recording operation. The corrected video signal data is supplied to a D/A converter 87 which in turn converts the input data to an analog signal and outputs the analog signal from an output terminal 88.

The LPF 63 removes the high-frequency component in a frequency band outside the pilot signal frequency band from the reproduced signal and supplies the thus processed signal to a sample/hold circuit 312. The sample/hold circuit 312 is supplied with the synchronizing data detected by the synchronizing data detection circuit 84, generates a sample/hold pulse in the intermediate phase of the synchronizing data and samples and holds the reproduced pilot signal at the pulse timing. That is, the sample/hold circuit 312 samples and holds the maximum value of the amplitude of the reproduced pilot signal and outputs the sampled signal to a tracking control circuit (not shown) via a terminal 313.

Next, the operation of the embodiment with the above construction is explained with reference to the timing chart shown in FIG. 17. (a) of FIG. 17 indicates main signal data input from the input terminal 71, (b) of FIG. 17 indicates the synchronizing data inserting phase, (c) of FIG. 17 indicates recording data, (d) of FIG. 17 indicates a sine-wave signal, (e) of FIG. 17 indicates a pilot signal from the pilot generation circuit 77, (f) of FIG. 17 indicates a recording pilot from the amplitude modulation circuit 311, and (g) of FIG. 17 indicates a sample/hold pulse.

A video signal input via the input terminal 71 is converted into a digital signal by the A/D converter 72 and supplied to the error correction code adding circuit 73. For example, the error correction code adding circuit 73 adds a parity code such as the Reed-Solomon code to the received signal and outputs the same to the digital modulation circuit 74. The digital modulation circuit 74 modulates the recording data by use of the 8–10 modulation system, for example, and outputs the modulated data to the synchronizing data adding circuit 75. The recording data modulated in a digital form and shown in (a) of FIG. 17 is input to the data adding circuit 75 and synchronizing data is added thereto at a timing determined by the synchronizing data inserting signal shown in (b) of FIG. 17. Thus, as shown in (c) of FIG. 17, recording data having synchronizing data (hatched portion) inserted therein in a preset period is supplied to the recording circuit 76.

Figure 17:
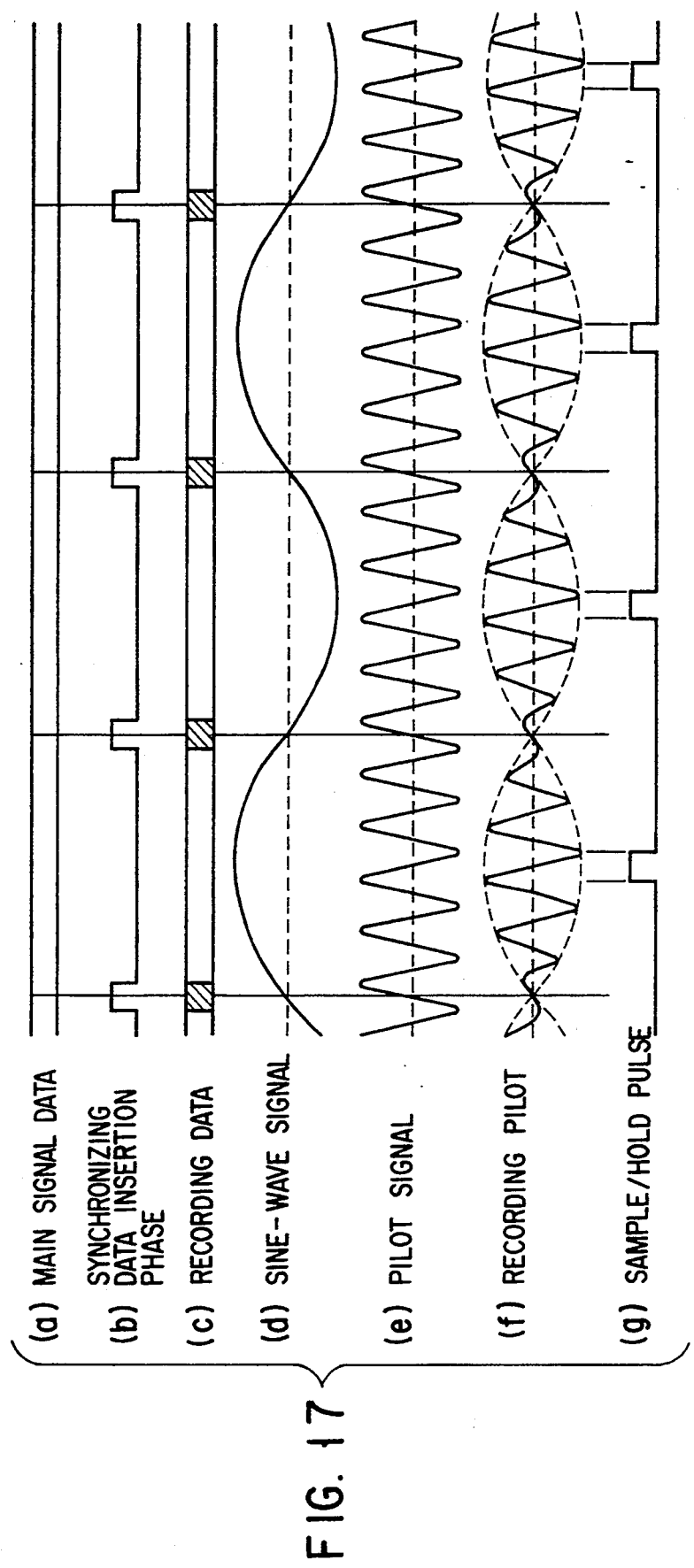
FIG. 17 is an explanatory diagram for illustrating the embodiment of FIG. 16.

The sine-wave generation circuit 310 generates a sine-wave signal shown in (d) of FIG. 17 and outputs the same to the amplitude modulation circuit 311. The pilot signal generation circuit 77 supplies a tacking pilot signal shown in (e) of FIG. 17 to the amplitude modulation circuit 311. The amplitude modulation circuit 311 AM-modulates the pilot signal by the sine-wave signal to supply a recording pilot shown in (f) of FIG. 17 to the recording circuit 76. The amplitude of the recording pilot is set to 0 in the synchronizing data inserting phase.

The recording circuit 76 adds the recording data and recording pilot together to set a preset recording level and supplies the same to the magnetic head 80 via a rotary transformer (not shown).

At the time of reproducing operation, a signal reproduced by the magnetic head 80 is output via the rotary transformer and supplied to the HPF 65 and LPF 63 after being amplified by a preamplifier (not shown). The HPF 65 removes an unnecessary low-frequency component of a frequency band outside the recording signal band and outputs the thus processed signal to the reproducing circuit 82. The reproducing circuit 82 reproduces the signal as a digital signal after correcting the frequency characteristic set at the time of recording/reproducing operation of the electromagnetic conversion system and then outputs the digital signal to the PLL 81 and time base correction circuit 83.

The PLL circuit 81 reproduces a clock based on the reproduced data and the time base correction circuit 83 corrects the time base of the reproduced data based on the clock from the PLL 81. Then, the reproduced signal is supplied to the synchronizing data detection circuit 84 and compared with the synchronizing pattern used at the time of recording operation. The synchronizing data detection circuit 84 determines the same pattern or substantially the same pattern as the synchronizing data section and extracts the main signal data portion. As described before, no error correction code is added to the synchronizing data, but since the amplitude of the pilot signal of the synchronizing data section is controlled to 0 at the time of recording operation, degradation in the reproducing SN ratio of the synchronizing data can be suppressed. Therefore, like a case where no pilot signal is recorded, in the synchronizing data detection circuit 84, the synchronizing data can be precisely detected.

The main signal data is demodulated by the digital demodulation circuit 85 and supplied to the A/D converter 87 after being subjected to the error correction in the error correction circuit 86. The D/A converter 87 converts the digital signal into an analog signal and outputs the same from the output terminal 88.

The LPF 63 removes the high-frequency component of a frequency band outside the pilot signal band from the reproduced signal and outputs the thus processed signal to the sample/hold circuit 312. The sample/hold circuit 312 holds the maximum amplitude of the reproduced pilot signal at a timing of the sample/hold pulse shown in (g) of FIG. 17 and outputs the same to the output terminal 313. A tracking control circuit (not shown) controls the tracking so as to set the amplitude of the reproduced pilot signal of the adjacent tracks.

Thus, in this embodiment, the pilot signal is AM (amplitude modulation)-modulated by a sine-wave whose amplitude is set to 0 in the synchronizing data inserting position and then recorded, thereby making it possible to prevent the reproducing SN (signal-noise) ratio of the synchronizing signal from being degraded by the presence of the pilot signal.

In order to further enhance the SN ratio in the synchronizing data section, the frequency of the pilot signal may be set so that the pilot signal may cross zero point at the synchronizing data insertion timing like the AM-modulated signal. Further, if the phases of the synchronizing data sections in the adjacent tracks are set to coincide with each other by taking the influence by the cross-talk of the pilot signals from the adjacent tracks into consideration, the pilot signal can be prevented from being reproduced from the adjacent track while the synchronizing data is being reproduced and reduction in the reproducing SN ratio in the synchronizing data section can be further suppressed.

In this embodiment, the digital recording VTR is explained as an example, but this embodiment can be applied to an apparatus in which synchronizing data is added to digital information signal and then the information signal is recorded or reproduced and the information signal may be a signal other than the video signal. Further, a plurality of signals can be recorded and the recording medium is not necessarily a magnetic tape.

Figure 42:
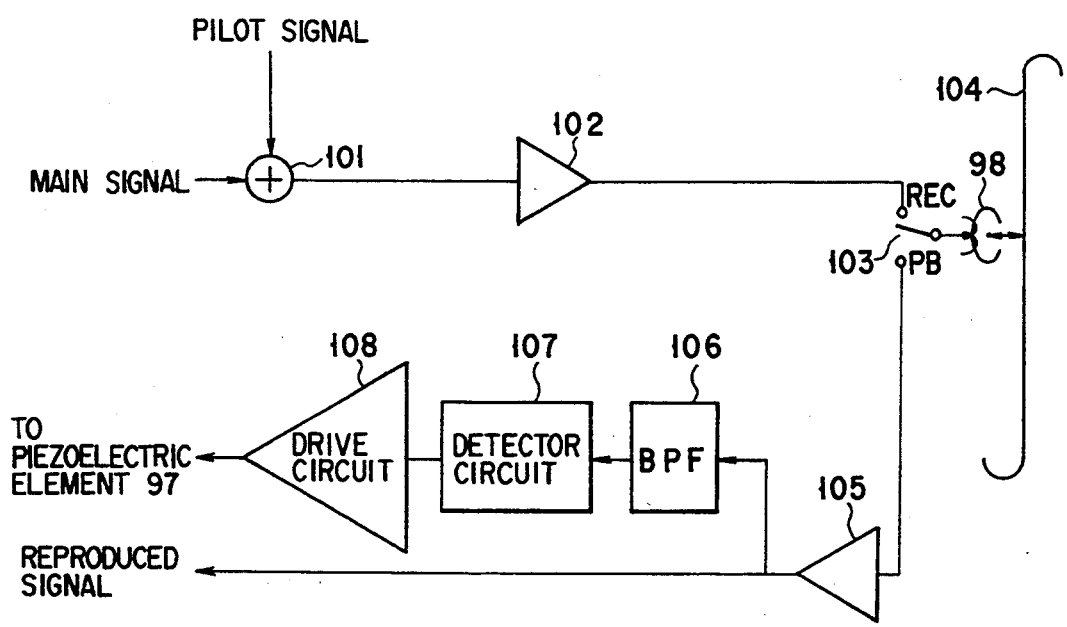
FIG. 42 is a block diagram showing another conventional case.
Figure 43:
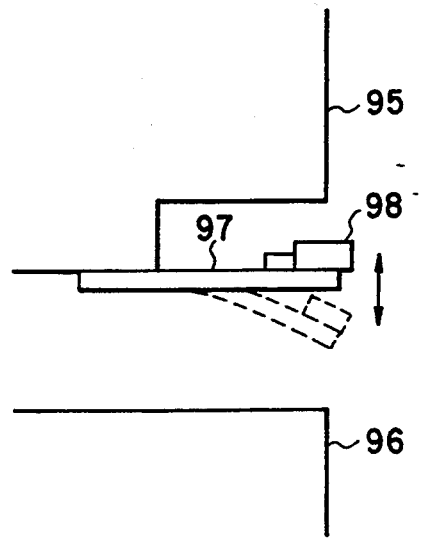
FIG. 43 is an explanatory diagram for illustrating a head portion shown in FIG. 42.
Figure 44:
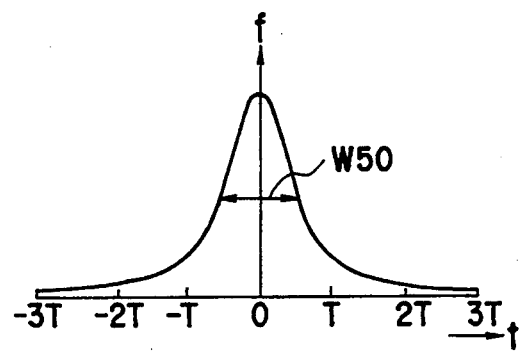
FIG. 44 is a waveform diagram showing a solitary reproduced waveform.
Figure 45:
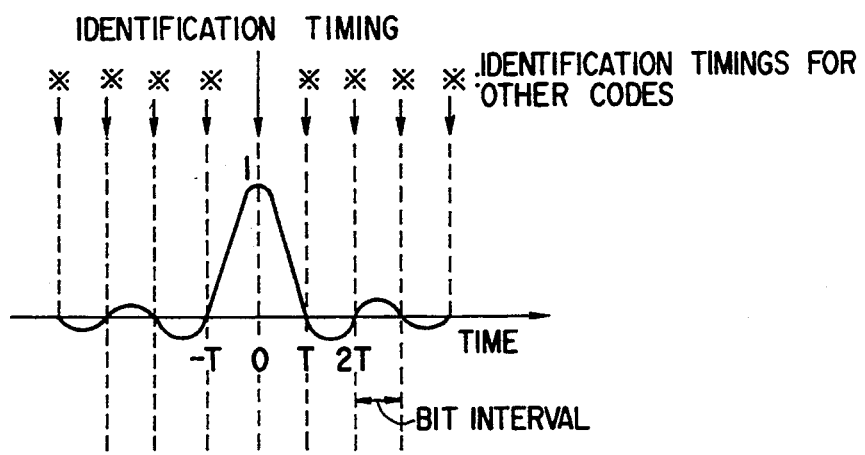
FIG. 45 is an explanatory diagram for illustrating the waveform equalization of the solitary reproduced waveform.
Figure 46:
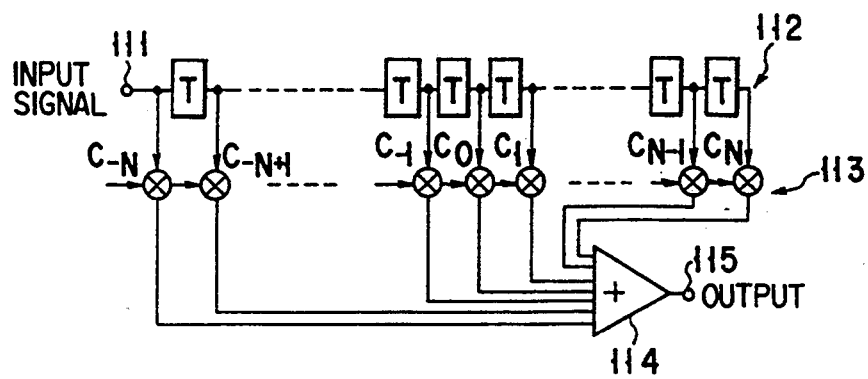
FIG. 46 is a block diagram showing the construction of a transversal filter.

FIG. 18 is a block diagram showing another embodiment of this invention. In FIG. 18, portions which are the same as those of FIG. 42 are denoted by the same reference numerals. This embodiment is made to permit the pilot signal to be efficiently separated from the reproduced signal so as to prevent the error rate from being degraded.

The construction of the recording system is the same as that of the conventional case. That is, a main signal to be recorded is input to an adder 101. The adder 101 is also supplied with a pilot signal and adds the pilot signal to the main signal and outputs the result of addition to a recording amplifier 102. The recording amplifier 102 amplifies a recording signal and supplies the amplified signal to a rotating head 98 via a switch 103. The head 98 magnetically records the recording signal on a tape 104.

In the reproducing system, a reproduced signal from the head 98 is supplied to a preamplifier 105 via a switch 103. The preamplifier 105 amplifies the reproduced signal and supplies the amplified signal to a subtracter circuit 320 and BPF 321. The BPF 321 has a pass band corresponding to the frequency band of the pilot signal and permits a signal of the pass band to be output to a PLL 322. The PLL 322 is also supplied with an output of a voltage-controlled oscillator (VCO) 323 and supplies a difference output corresponding to a difference between the oscillation frequency of the VCO 323 and the frequency of the pilot signal from the BPF 321 to the VCO 323 so as to lock the oscillation frequency of the VCO 323 to the frequency of the pilot signal which is now reproduced. The VCO 323 outputs an output of the reproduced signal frequency to a (voltage-controlled amplifier) VCA 324.

An output of the preamplifier 105 is also supplied to a pilot signal level variation extracting circuit 325 which supplies an output corresponding to the level variation in the reproduced signal to the VCA 324. The pilot signal at the time of recording operation is set at a constant level, but the amplitude of the reproduced pilot signal is changed. An output of the BPF 321 contains a component of the main signal in the pilot frequency band in addition to the pilot signal. For this reason, even if the output of the BPF 321 is detected, an output quite different from variation in the pilot signal will be derived. Therefore, in this embodiment, for example, it is intended to derive an output approximated to variation in the pilot signal caused in the recording-/reproducing operation by detecting the envelope of the reproduced signal. Thus, the pilot signal level variation extracting circuit 325 supplies an output as a variation component of the pilot signal caused at the time of recording/reproducing operation to the VCA 324.

The VCA 324 controls the level of a signal of pilot frequency from the VCO 323 according to an output of the pilot signal level variation extracting circuit 325 and supplies the level-controlled signal to a subtracter 320. As a result, a signal having a level variation approximated to the reproduced pilot signal is supplied from the VCA 324 to the subtracter 320. The subtracter 320 subtracts an output of the VCA 324 from an output of the preamplifier 105 to remove the pilot signal component from the reproduced signal and output only the main signal. An output of the subtracter 320 is supplied to a reproducing circuit (not shown).

Next, the operation of the embodiment with the above construction is explained with reference to FIGS. 19A to 19D and 20A to 20C. FIGS. 19A to 19D show respective signal waveforms at the time of recording operation, FIG. 19A showing a pilot signal, FIG. 19B showing a main signal component of pilot frequency band, FIG. 19C showing a recording signal of pilot frequency band, and FIG. 19D showing a recording signal of entire frequency band. FIGS. 20A to 20C show respective signal waveforms at the time of reproducing operation, FIG. 20A showing a reproduced pilot signal, FIG. 20B showing a component of the reproduced signal of pilot frequency band, and FIG. 20C showing a reproduced signal of entire frequency band.

A main signal to be recorded is added to a pilot signal of constant amplitude shown in FIG. 19A and then supplied to the recording amplifier 102. The recording amplifier 102 amplifies an input signal and supplies the amplified signal to the head 98 via the switch 103 so as to record the signal on the tape 104. As shown in FIG. 19B, the main signal contains a component of pilot signal frequency band and a component of the recording signal of pilot frequency band takes a waveform obtained by adding the waveforms of FIGS. 19A and 19B (FIG. 19C). As shown in FIG. 19D, the recording signal of entire frequency band is set at a constant amplitude.

At the time of reproducing operation, the reproduced signal from the head 98 is supplied to the preamplifier 105 via the switch 103 and amplified. Part of an output of the preamplifier 105 is supplied to the BPF 321 and only a signal of pilot frequency is supplied to the PLL 322. The PLL 322 supplies a difference signal used for setting the output of the VCO 323 equal to the reproduced pilot signal frequency to the VCO 323. Thus, a signal of constant amplitude having a reproduced pilot frequency is output from the VCO 323 to the VCA 324.

As shown in FIG. 20A, the amplitude of a pilot signal in the reproduced signal varies in the recording/reproducing operation. In the drawing, broken lines indicate the amplitude at the time of recording operation and the hatched portion indicates variation in the recording/reproducing operation. Further, FIG. 20B shows a component of the reproduced signal in the pilot frequency band, and variation in the component of the reproduced signal in the pilot frequency band is quite different from variation in the pilot signal as is clearly understood by comparing FIG. 20A with FIG. 20B. Therefore, as described before, in this embodiment, variation in the pilot signal is derived by detecting the envelope (solid line in FIG. 20C) of the reproduced signal of entire frequency band. That is, the reproduced signal from the preamplifier 105 is also supplied to the pilot signal level variation extraction circuit 325 and variation in the recording/reproducing operation is extracted.

An output of the pilot signal level variation extraction circuit 325 is supplied to the VCA 324 to control the gain thereof. As a result, a signal of reproduced pilot signal frequency which is changed by a level approximated to variation in the pilot signal is output from the VCA 324. An output of the VCA 324 is supplied to the subtracter 320 and is subtracted from an output of the preamplifier 105. As a result, a reproduced signal having a pilot signal removed therefrom is output from the subtracter 320.

Thus, in this embodiment, a signal of reproduced pilot signal frequency is generated at the time of reproducing operation and an approximated reproduced pilot signal containing no main signal component is derived by changing the level of the above signal according to variation in the envelope of the reproduced signal and the pilot signal is removed from the reproduced signal so that the error rate can be reduced without influencing the phase and frequency band of the reproduced signal.

FIG. 21 is a block diagram showing still another embodiment of this invention. This embodiment corresponds to the recording modulation circuit 146, recording amplifier 149, heads 150 and 152, tape 151 and preamplifier 154 of FIG. 1 and is suitable for recording and reproducing of data on a vertical orientation recording medium. FIG. 21 shows the construction of a reproducing system and the construction of a recording system is the same as that of FIG. 47. In FIG. 21, portions which are the same as those of FIG. 48 are denoted by the same reference numerals.

Figure 22:
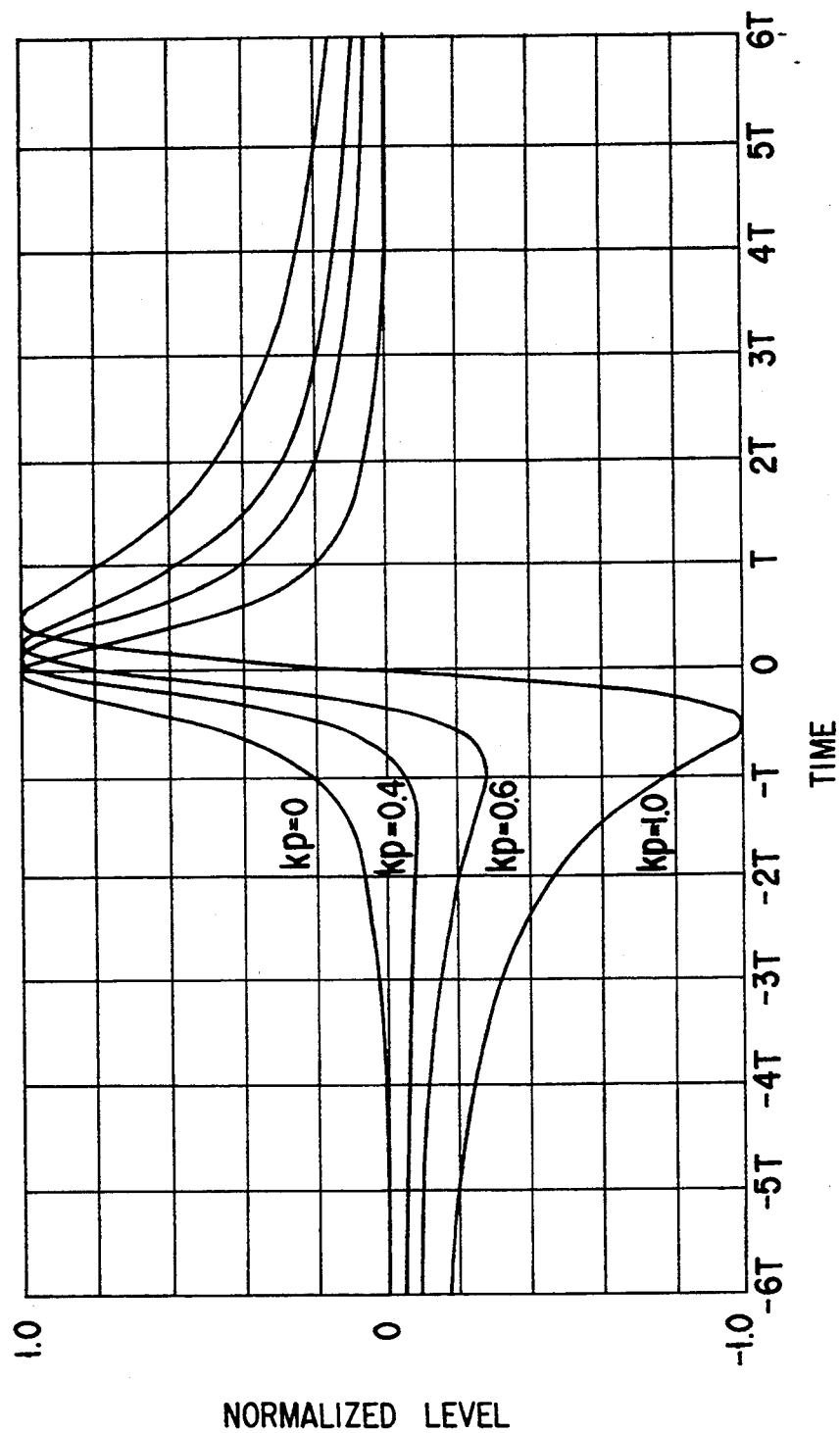
FIG. 22 is an explanatory diagram for illustrating the embodiment of FIG. 21.

First, the outline of this embodiment is explained with reference to FIGS. 22 and 23. FIG. 22 is a graph which shows variation in a solitary reproduced waveform caused when kp is changed and in which the abscissa indicates time and the ordinate indicates a normalized level. FIG. 23 is a waveform diagram for illustrating equalization of the solitary reproduced waveform.

As described above, when a signal is recorded and reproduced on the vertical orientation recording medium by use of the ring head, the reproduced waveform becomes asymmetrical. As is disclosed in the reference document 1 described before, the solitary reproduced waveform can be given by the following equation (4).

$$f(t) = \{(1-kp) \cdot a/a(a^2+t^2)\} + \{kp \cdot t/(a^2+t^2)\} \quad (4)$$

where a is a pulse width coefficient and kp is a vertical component coefficient. The longitudinal recording mode is set when kp=0 and the perfect vertical recording mode is set when kp=1. In order to attain the high density recording, it is desired to use the tape in a condition substantially equal to the condition that kp=1.

As shown in FIG. 22, as kp becomes larger, a second peak occurring immediately before the main peak becomes more significant and the amplitude thereof becomes larger, thereby making the degree of asymmetry larger. In the case of using an in-plane orientation tape, the solitary reproduced waveform is equalized so as to be 0 at the adjacent identification point, but in the case of using a vertical recording tape having kp=1, the above equalization is difficult. Therefore, in this embodiment, in order to reduce the equalization amount of the solitary reproduced waveform, the equalization is effected to create a waveform having peaks of −1 and 1 with a bit interval of T.

That is, the solitary reproduced waveform having kp=1 shown in FIG. 23A is so equalized as to have two peaks occurring at an interval equal to the bit interval T. In the case of kp=1, the magnitudes of the main peak and second peak of the solitary reproduced waveform are equal to each other and the waveform becomes symmetrical with respect to the origin. Therefore, the solitary reproduced waveform can be substantially approximated by the sum of waveforms A and B which are each symmetrical with respect to a vertical line as indicated by solid lines in FIG. 23B. The waveforms A and B can be each considered as a solitary reproduced waveform having a bit interval of T/2 and kp=0 and can be equalized to waveforms A' and B' of FIG. 23D by equalizing them by the T/2 bit interval by use of the equalizing circuit 124 in the conventional circuit shown in FIG. 48. That is, after the equalization, a waveform as shown in FIG. 23C is obtained.

The waveform after the equalization has peak values of −1 and 1 occurring with the bit interval T as shown in FIG. 23C, and reproduced data can be derived from the solitary reproduced waveform by determining a point at which a change from −1 to 1 or 1 to −1 occurs as "1" and determining the other case as "0".

In FIG. 21, a ring head 122 reproduces a recording signal from a vertical orientation tape 121 and supplies the reproduced signal to a preamplifier 123. The preamplifier 123 amplifies and supplies the reproduced signal to an equalizing circuit 330. The equalizing circuit 330 equalizes the solitary reproduced waveform to a waveform shown in FIG. 23C and supplies the equalized waveform to a three-value comparator 125.

The three-value comparator 125 subjects a signal of the equalized waveform to three-value detection. That is, the three-value comparator 125 generates an identification signal of "−1", "0" or "1" according to the level of an input signal and supplies the signal to an identifying circuit 127 and PLL 126. The PLL 126 extracts a clock from the identification signal and supplies the clock to the identifying circuit 127, and the identifying circuit 127 identifies the level of the identification signal at a clock timing and outputs identifying data which becomes "1" when the identification signal of "1" or "−1" is identified and becomes "0" when the identification signal of "0" is identified.

In this embodiment, the identification data is supplied to a 1-bit delay circuit 331 and AND circuit 332. The 1-bit delay circuit 331 delays the identification data by one bit and supplies the delayed data to the AND circuit 332. The AND circuit 332 derives the logical product of identification data items with 1-bit time delay set therebetween and supplies an output to a demodulation circuit (not shown).

Figure 24:
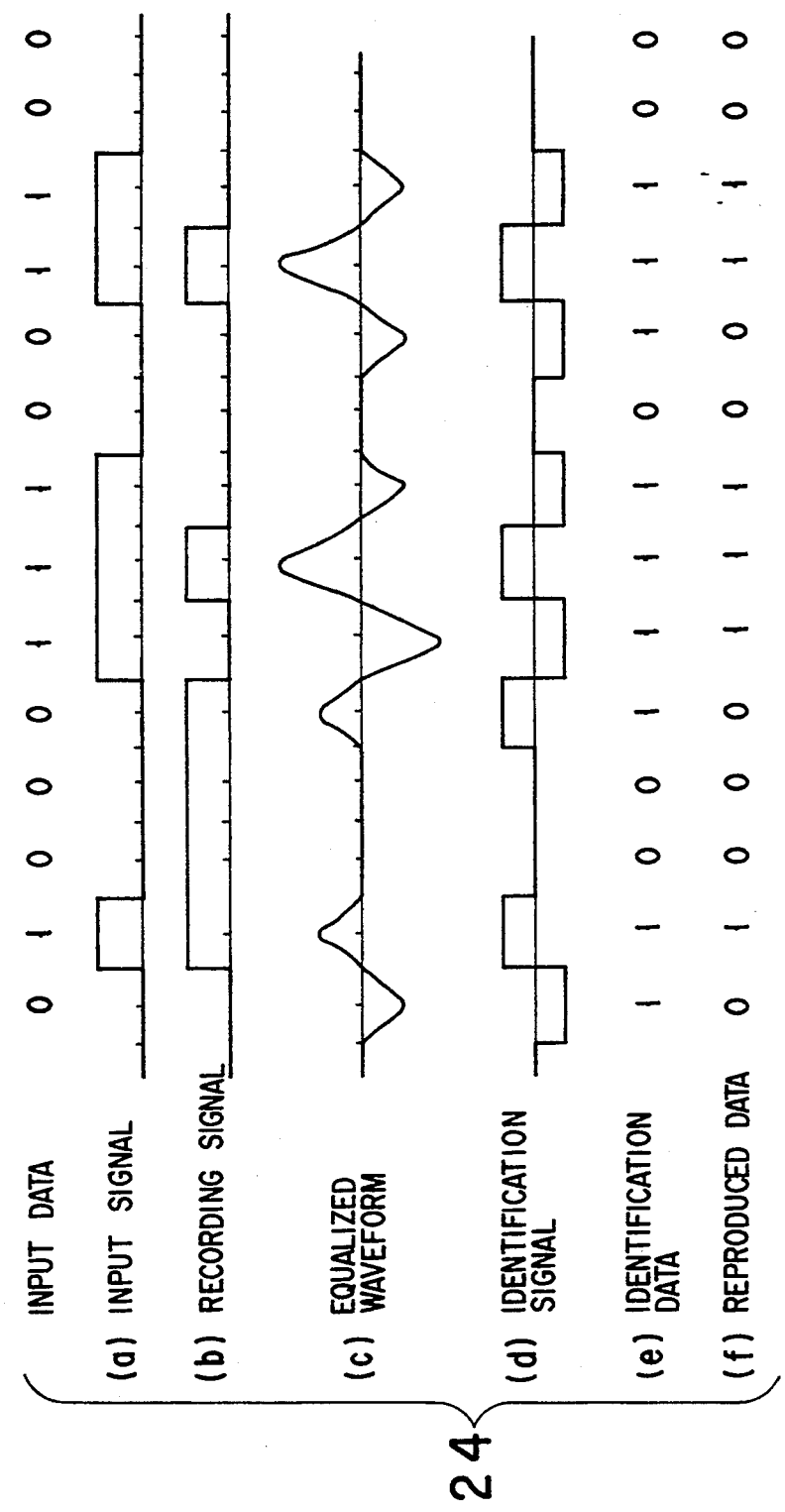
FIG. 24 is an explanatory diagram for illustrating the embodiment of FIG. 21.
Figure 25:
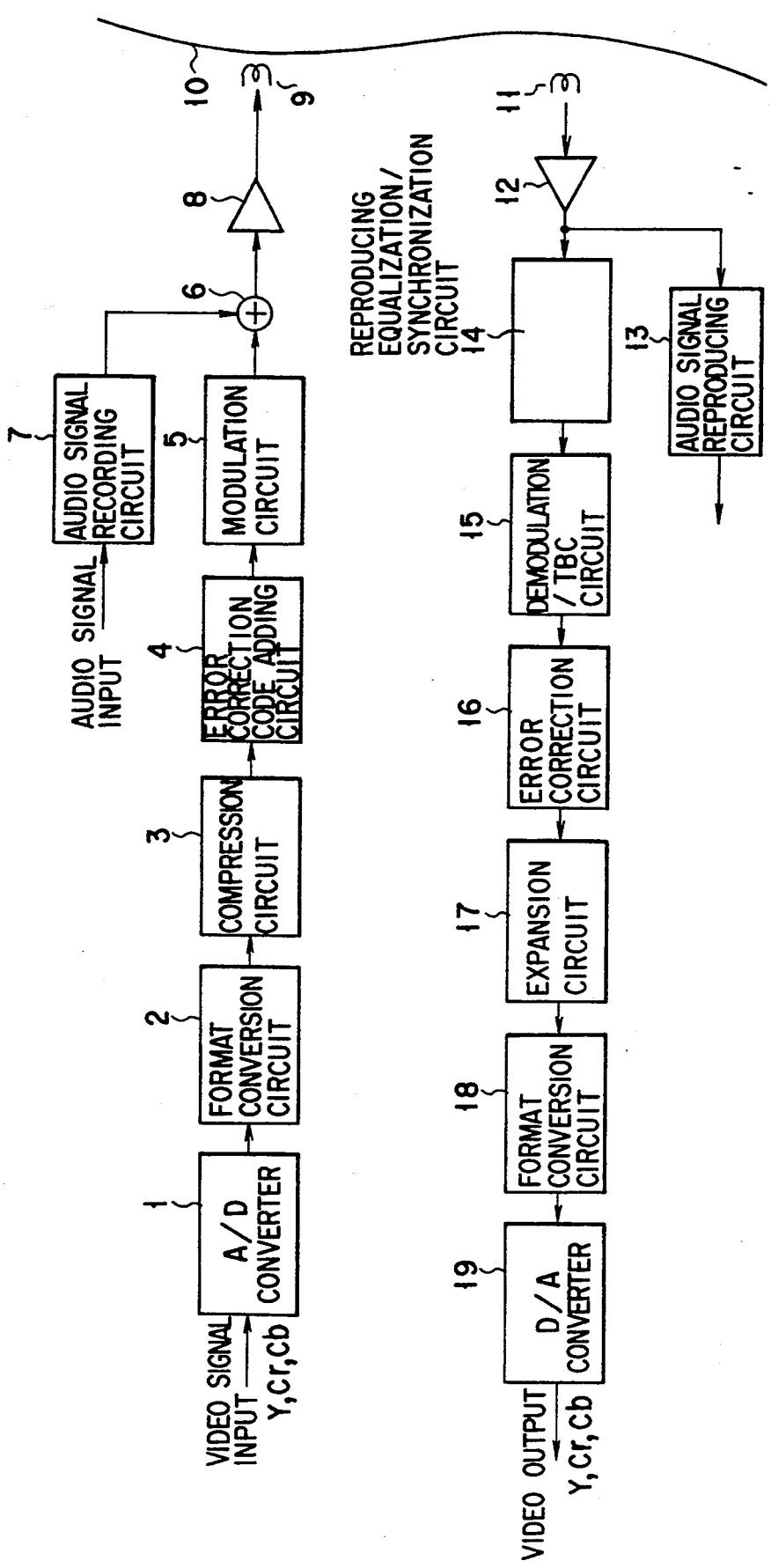
FIG. 25 is a block diagram showing the conventional video data recording/reproducing apparatus.
Figure 26:
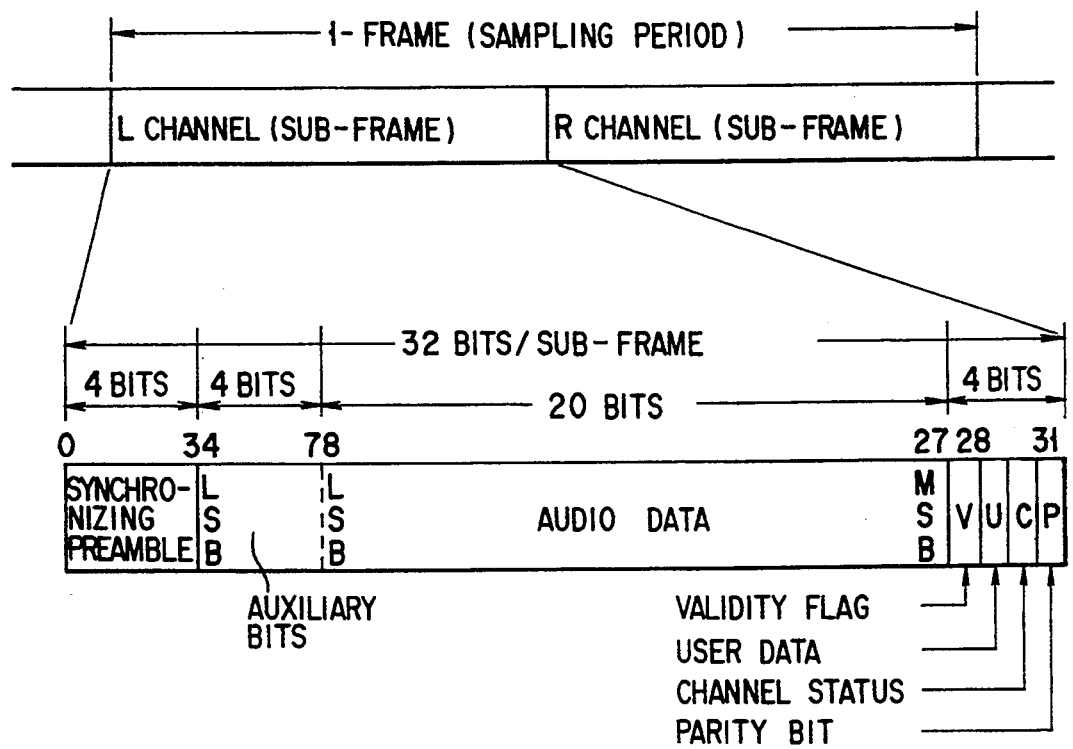
FIG. 26 is an explanatory diagram for illustrating the conventional case.
Figure 27:
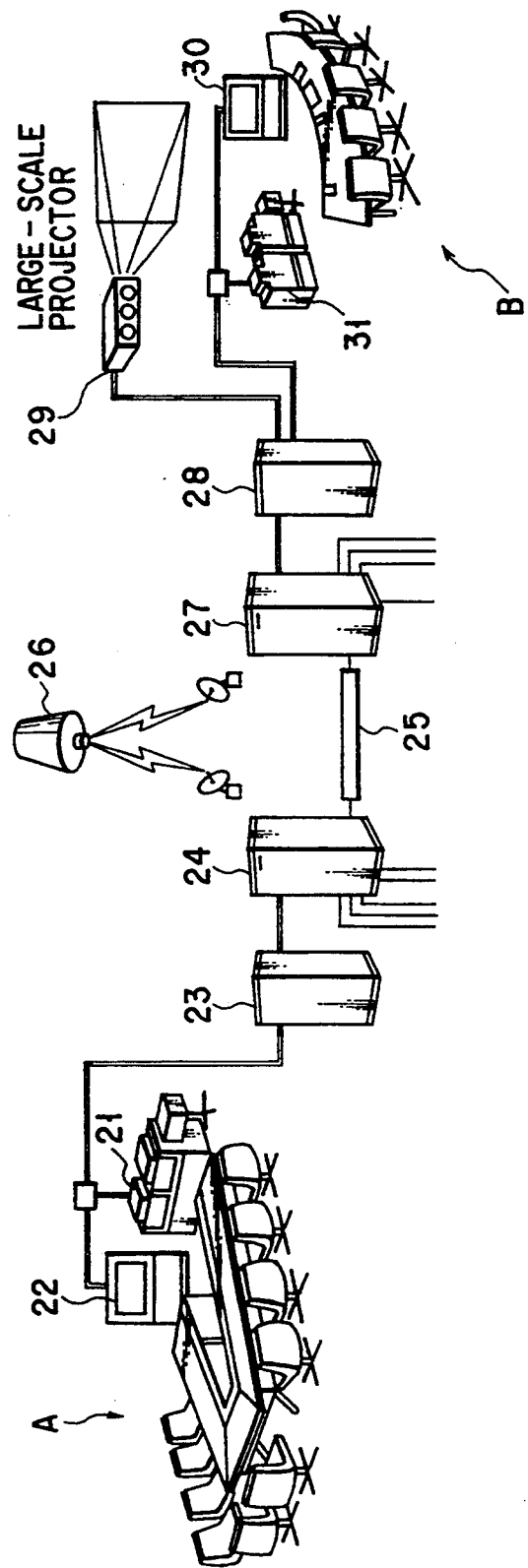
FIG. 27 is a block diagram showing another conventional case.

Next, the operation of the embodiment with the above construction is explained with reference to the timing chart of FIG. 24. (a) of FIG. 24 indicates an input signal, (b) of FIG. 24 indicates a recording signal, (c) of FIG. 24 indicates an equalized waveform, (d) of FIG. 24 indicates an identification signal, (e) of FIG. 24 indicates identification data, and (f) of FIG. 24 indicates reproduced data.

Figure 47:
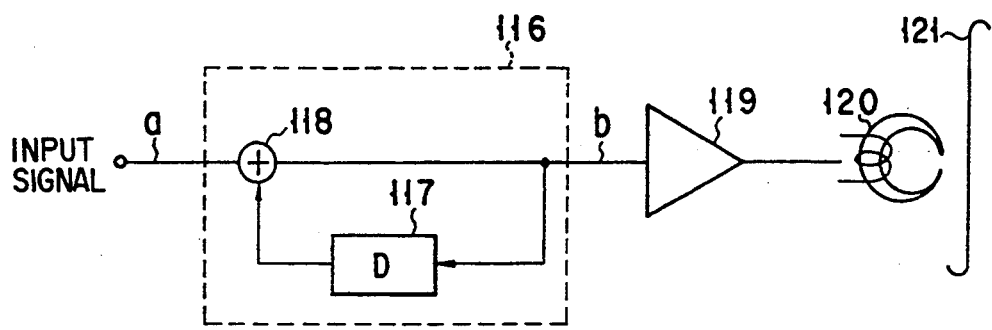
FIG. 47 is a block diagram showing another conventional case.
Figure 48:
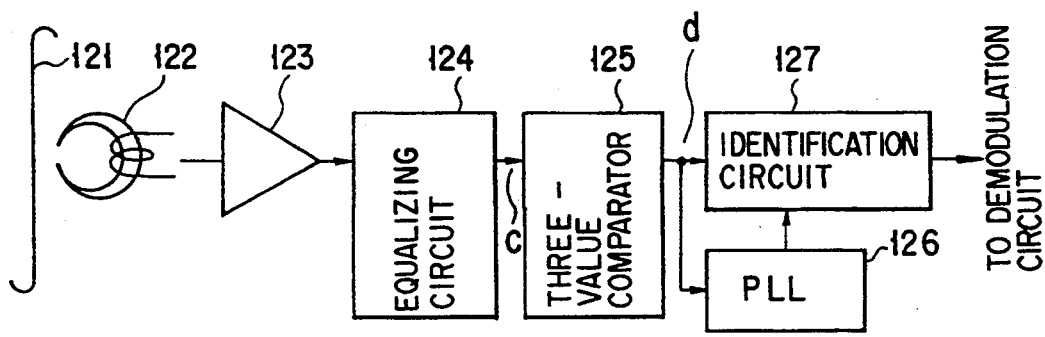
FIG. 48 is a block diagram showing another conventional case.
Figure 49:
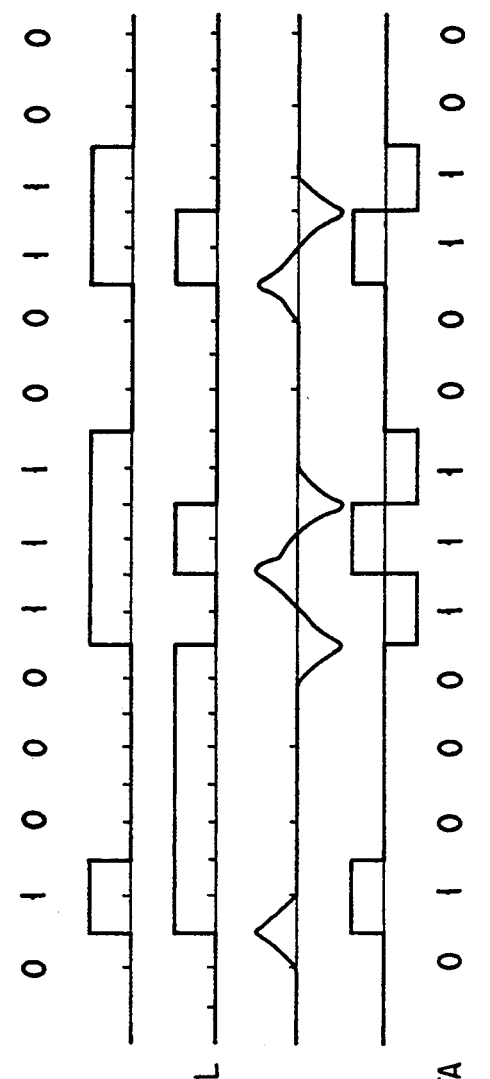
FIG. 49 is a timing chart for illustrating the operations of the conventional devices.
Figure 50:
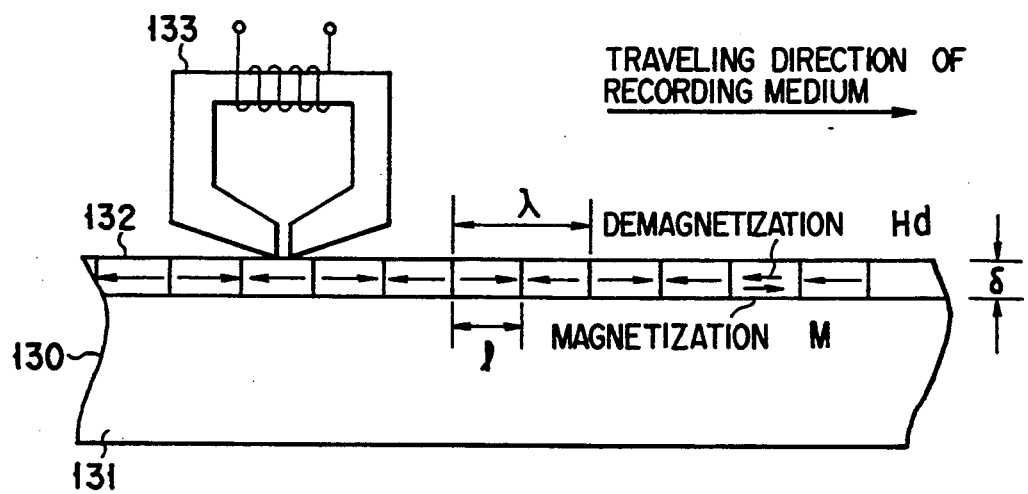
FIG. 50 is an explanatory diagram for illustrating the longitudinal recording operation.
Figure 51:
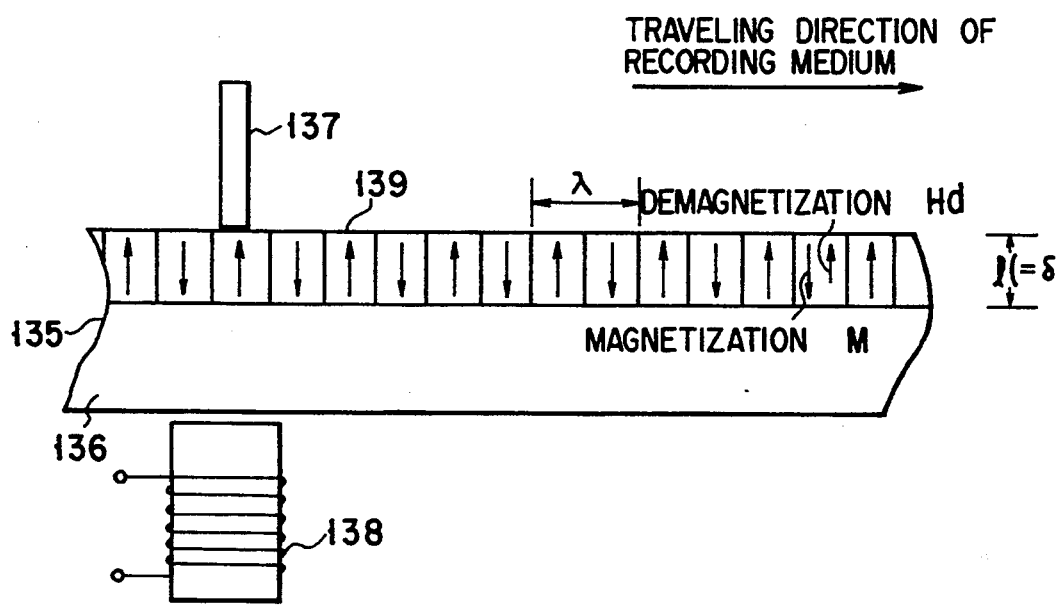
FIG. 51 is an explanatory diagram for illustrating the vertical recording operation.

Like the PR(1, −1) system, in the recording system, after the pre-coding by the operation of mod2 with respect to the input signal together with the 1-bit delay code is effected, a thus obtained signal is recorded on the vertical orientation recording tape 121 via the recording amplifier 2 and ring head 3 (FIG. 47). As a result, the input signal shown in (a) of FIG. 24 is converted to a recording signal shown in (b) of FIG. 24 and recorded.

At the time of reproducing operation, recording data on the vertical orientation tape 121 is reproduced by the ring head 7 and is amplified by the preamplifier 123. The reproduced signal takes a solitary reproduced waveform having two peaks which are symmetrical with respect to the origin as shown in FIG. 23A. The equalizing circuit 330 effects the waveform equalization by the bit interval T/2 to convert the solitary reproduced waveform of FIG. 23A to a waveform of FIG. 23C and outputs the waveform to the three-value comparator 125 ((c) of FIG. 24). In this case, as shown in (b) and (c) of FIG. 24, the amplitude of the minimum magnetization inversion interval (maximum recording frequency) portion of the recording signal is twice that of the other portion since the peaks of the solitary reproduced waveform are added together. As described before, the maximum recording frequency portion is subject to space loss or other losses and is a portion in which identification errors are most liable to occur. Therefore, since the amplitude of the equalized waveform in this portion becomes twice that of the other portion, occurrence of the identification error may be reduced and this is extremely suitable for the high density recording.

The equalized waveform is supplied to the three-value comparator 125 and subjected to the three-value determination. An identification signal shown in (d) of FIG. 24 is supplied from the three-value comparator 125 to the identification circuit 127 and PLL 126. The identification circuit 127 creates identification data shown in (e) of FIG. 24 based on a clock extracted from the identification signal and supplies the identification data to the 1-bit delay circuit 331 and AND circuit 332. The AND circuit 332 is supplied with identification data items with 1-bit time delay set therebetween. As a result, the AND circuit 332 detects a point at which the equalized waveform is changed from "1" to "−1" or from "−1" to "1", that is, a zero cross point, and thus, it can reproduce the input signal as shown in (f) of FIG. 24.

Thus, in this embodiment, the equalizing circuit 330 equalizes the solitary reproduced waveform by the bit interval T/2 and detects the zero cross point of the equalized signal so as to derive reproduced data.

Since the solitary reproduced waveform can be equalized with a small equalization amount and the amplitude of the equalized waveform in the maximum recording frequency becomes larger, this embodiment is suitable for the high density recording.

As described above, according to this invention, since the same error correction system as that constructed on the transmission side is also constructed on the reception side, the recording error can also be corrected by use of an error correction code from the transmission side.

According to this invention, a plurality of low bit rate coding signals can be simultaneously recorded by use of a single apparatus.

According to this invention, even if the recording capacity of one track is made variable, the product code can be constructed to complete the correction series in the same format according to signals of a plurality of systems.

According to this invention, the error correction ability for the video signal can be enhanced and a plurality of different types of signals can be recorded.

According to this invention, a preferable SN ratio can be attained for increased searching speeds of wide range.

According to this invention, even when the tracking pilot signal is frequency-multiplexed on the main signal and recorded, the SN ratio of the synchronizing data can be prevented from being degraded and occurrence of errors in the reproduced main signal data can be prevented from being increased.

According to this invention, only the pilot signal can be removed without influencing the reproduced signal of frequency band near the pilot frequency and the phase of the reproduced signal.

According to this invention, even when data is recorded in a vertical direction on the vertical orientation recording medium by the ring head, the waveform equalization amount of the reproduced signal can be reduced and the identification can be simplified.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A video data recording apparatus comprising:
   receiving means for receiving more than one coded data item, for reducing a data rate of said coded data items received, and for generating at least one output signal corresponding to said reduced rate coded data items;
   determining means for determining both a data transmission rate and a number of said coded data items received from said receiving means output signal, and for determining a number of coded data items to be multiplexed and a number of repetitions of coded data items to be arranged based on said determination of said transmission rate and said number of coded data items received in accordance with a changeable relationship between said transmission rate and said number of data items received, and said data to be arranged;
   multiplexing processing means for generating a signal which indicates an arrangement of said coded data items based on both said number of coded data items to be multiplexed and said number of repetitions determined by said determination means;

sub-code forming means for forming a sub-code based on said number of coded data items to be multiplexed and said number of repetitions determined by said determination means;

adding means for adding said sub-code to said signal generated by said multiplexing processing means; and recording means for recording an output from said adding means on a predetermined recording medium.

2. The video data recording apparatus according to claim 1, wherein said determination means comprises:

a multiplexing number determination circuit for determining said number of coded data items to be multiplexed; and a rate determination circuit for calculating a total rate based on said transmission rate of coded data items and said number of coded data items, and for determining said number of repetitions of coded data items to be arranged based on said determination of said total rate and a recording rate of said recording medium.

3. The video data recording apparatus according to claim 1, wherein said multiplexing processing means comprises:

a multiplexing processing circuit for multiplexing said coded data items based on said number of coded data items to be multiplexed; and a repetition circuit for arranging said coded data items multiplexed by said multiplexing processing circuit based on said number of repetitions of said coded data items to be arranged which is determined by said determination circuit.

4. The video data recording apparatus according to claim 1, wherein said multiplexing processing means includes means for arranging said coded data items so that said coded data items are repeatedly arranged before being added by said adding means.

5. The video data recording apparatus according to claim 1, further comprising parity adding means for adding an error correction parity signal to said multiplexing processing means output signal and for supplying said added signal to said adding means.

6. The video data recording apparatus according to claim 1, wherein said apparatus is adapted to record in a video conference, said apparatus further comprising:

a camera for videotaping one party of the video conference and for outputting a video signal corresponding to said videotaping;

coding means for subjecting the output video signal from said camera to a predetermined low bit rate coding process to produce a first coded data and for supplying the first coded data to said receiving means;

transmitting means for transmitting the first coded data from said coding means to another party of said video conference;

means for receiving a second coded data from another party of said video conference and for supplying said second coded data to said receiving means;

decoding means for receiving coded data and for outputting decoded data to be displayed; and a monitor for displaying said decoded data which is output by said decoding means.

7. A video data reproducing apparatus comprising:

reproducing means for generating signals which correspond to video data recorded on a predetermined recording medium in a predetermined format, said video data recorded on said predetermined recording medium including both a plurality of multiplexed coded data items which is repeatedly recorded, which correspond to a plurality of video signals, and which is arranged based on both a number of coded data items multiplexed and a number of repetitions of said multiplexed coded data items, and a sub-code representing both said number of coded data items multiplexed and said number of repetitions;

sub-code decoding means for decoding said sub-code from said video data signals and for determining both said number of multiplexed coded data items and said number of repetitions of said multiplexed coded data items from said decoded sub-code;

releasing means for extracting more than one coded data item from said video data based on said number of multiplexed coded data items and said number of repetitions of said multiplexed coded data items in accordance with a changeable relationship between said number of multiplexed coded data items, said number of repetition of said multiplexed coded data items and said coded data items in said video data;

correcting means for correcting an error within each of said coded data items extracted by said releasing means based on said repeated coded data items reproduced from a same position within said predetermined recording medium by said reproducing means; and decoding means for selectively decoding said coded data items after said correcting means has corrected said error.

8. The video data reproducing apparatus according to claim 7, wherein said releasing means comprises:

a repetition releasing circuit for releasing at least, one group of reproduced coded data items from the video data signals generated by said reproducing means based on said number of repetitions of said multiplexed coded data items determined by said sub-code decoding means, and for extracting a data component from each of said coded data items; and a multiplexing releasing circuit for releasing at least one data item from said groups of coded data items released by said repetition releasing circuit based on said number of multiplexed coded data items determined by said sub-code decoding means, and for separating said data components from each other.

9. The video data reproducing apparatus according to claim 7, wherein said releasing means comprises:

a repetition releasing circuit for releasing at least one group of reproduced coded data items from the video data signals generated by said reproducing means based on said number of repetitions of said multiplexed coded data items determined by said sub-code decoding means, and for extracting a data component from each of said coded data items; and a multiplexing releasing circuit for releasing at least one data item from said groups of coded data items released by said repetition releasing circuit based on said number of multiplexed coded data items determined by said sub-code decoding means, and for separating said data components from each other, and wherein said correcting means comprises a correcting circuit for comparing said data component extracted by said repetition releasing circuit with said data components released by said multiplexing releasing circuit at the location of said extracted data component, and for extracting and correcting an error occurring in said coded data items.

10. The video data reproducing apparatus according to claim 7, wherein said decoding means comprises:
   a signal selecting circuit for selecting at least one of said corrected coded data items when a designated display signal is received; and
   a decoding circuit for decoding said corrected coded data items selected by said signal selecting circuit.

11. The video data reproducing apparatus according to claim 7, where said apparatus is used in a video conference, and where said apparatus further comprises monitor means for displaying said coded data items selectively decoded by said decoding means.

12. A video data recording/reproducing system comprising:
   a recording system including:
   a) receiving means for receiving more than one coded data item, for reducing a data rate of said coded data items received, and for generating at least one output signal corresponding to said reduced rate coded data items;
   b) determining means for determining both a data transmission rate and a number of said coded data items received from said receiving means output signal, and for determining a number of coded data items to be multiplexed and a number of repetitions of coded data items to be arranged based on said determination of said transmission rate and said number of coded data items received in accordance with a changeable relationship between said transmission rate, said number of data items received, and said data to be arranged;
   c) multiplexing processing means for generating a signal which indicates an arrangement of said coded data items based on both said number of coded data items to be multiplexed and said number of repetitions determined by said determination means;
   d) sub-code forming means for forming a sub-code based on said number of coded data items to be multiplexed and said number of repetitions determined by said determination means;
   e) adding means for adding said sub-code to said signal generated by said multiplexing processing means; and
   f) recording means for recording an output from said adding means on a predetermined recording medium, and
   a reproducing system including:
   a) reproducing means for generating signals which correspond to video data recorded on a predetermined recording medium in a predetermined format, said video data recorded on said predetermined recording medium including both a plura multiplexed coded data items which is repeatedly recorded, will correspond to a plurality of video signals, and which is arranged based on both a number of coded data items multiplexed and a number of repetitions of said multiplexed coded data items, and a sub-code representing both said number of coded data items multiplexed and said number of repetitions;
   b) sub-code decoding means for decoding said subcode from said video data signals and for determining both said number of multiplexed coded data items and said number of repetitions of said multiplexed coded data items from said decoded sub-code;
   c) releasing means for extracting more than one coded data item from said video data based on said number of multiplexed coded data items and said number of repetitions of said multiplexed coded data items in accordance with a changeable relationship between said number of multiplexed coded data items, said number of repetition of said multiplexed coded data items and said coded data items in said video data;
   d) correcting means for correcting an error within each of said coded data items extracted by said releasing means based on said repeated coded data items reproduced from a same position within said predetermined recording by said reproducing means; and
   e) decoding means for selectively decoding said coded data items after said correcting means has corrected said error.

13. The system according to claim 12, wherein said determination means comprises:
   a multiplexing number determination circuit for determining said number of coded data items to be multiplexed; and
   a rate determination circuit for calculating a total rate based on said transmission rate of coded data items and said number of coded data items, and for determining said number of repetitions of coded data items to be arranged based on said determination of said total rate and a recording rate of said recording medium.

14. The system according to claim 12, wherein said determination means comprises:
   a multiplexing processing circuit for multiplexing said coded data items based on said number of coded data items to be multiplexed; and
   a repetition circuit for arranging said coded data items multiplexed by said multiplexing processing circuit base on said number of repetitions of said coded data items to be arranged which is determined by said determination circuit.

15. The system according to claim 12, wherein said multiplexing processing means include means for arranging said coded data items so that they are repeatedly arranged before being added by said adding means.

16. The system according to claim 12, wherein said recording system further comprises parity adding means for adding an error correction parity signal to said multiplexing processing means output signal and for supplying said added signal to said adding means.

17. The system according to claim 12, wherein said system is adapted to record in a video conference, said recording system further comprising:
   a camera for videotaping one party of the video conference and for outputting a video signal corresponding to said videotaping;
   coding means for subjecting the output video signal from said camera to a predetermined low bit rate coding process to produce a first coded data and for supplying the first coded data to said receiving means;

transmitting means for transmitting the first coded data from said coding means to another party of said video conference;

means for receiving a second coded data from another party of said video conference and for supplying said second coded data to said receiving means;

decoding means for receiving coded data and for outputting decoded data to be displayed; and a monitor for displaying said decoded data which is output by said decoding means.

18. The system according to claim 12, wherein said releasing means comprises:

a repetition releasing circuit for releasing at least one group of reproduced coded data items from the video data signals generated by said reproducing means based on said number of repetitions of said multiplexed coded data items determined by said sub-code decoding means, and for extracting a data component from each of said coded data items; and a multiplexing releasing circuit for releasing at least one data item from said groups of coded data items released by said repetition releasing circuit based on said number of multiplexed coded data items determined by said sub-code decoding means, and for separating said data components from each other.

19. The system according to claim 17, wherein said releasing means comprises:

a repetition releasing circuit for releasing at least one group of reproduced coded data items from the video data signals generated by said reproducing means based on said number of repetitions of said multiplexed coded data items determined by said sub-code decoding means, and for extracting a data component from each of said coded data items; and a multiplexing releasing circuit for releasing at least one data item from said groups of coded data items released by said repetition releasing circuit based on said number of multiplexed coded data items determined by said sub-code decoding means, and for separating said data components from each other, and wherein said correcting means comprises a correcting circuit for comparing said data component extracted by said repetition releasing circuit with said data components released by said multiplexing releasing circuit at the location of said extracted data component, and for extracting and correcting an error occurring in said coded data items.

20. The system according to claim 12, wherein said decoding means comprises:

a signal selecting circuit for selecting at least one of said corrected coded data items when a designated display signal is received; and a decoding circuit for decoding said corrected coded data items selected by said signal selecting circuit.

* * * * *